(12) United States Patent
Sheldon-Coulson et al.

(10) Patent No.: US 12,234,799 B2
(45) Date of Patent: Feb. 25, 2025

(54) HYDROGEN PRODUCTION AND CONVEYANCE SYSTEM

(71) Applicant: LONE GULL HOLDINGS, LTD., Portland, OR (US)

(72) Inventors: Garth Alexander Sheldon-Coulson, Portland, OR (US); Brian Lee Moffat, Portland, OR (US); Daniel William Place, Portland, OR (US); Ivar Lee Thorson, Portland, OR (US)

(73) Assignee: Lone Gull Holdings, Ltd., Portland, OR (US)

( * ) Notice: Subject to any disclaimer, the term of this patent is extended or adjusted under 35 U.S.C. 154(b) by 192 days.

(21) Appl. No.: 17/812,844

(22) Filed: Jul. 15, 2022

(65) Prior Publication Data
US 2022/0349374 A1 Nov. 3, 2022

Related U.S. Application Data

(63) Continuation of application No. 17/320,541, filed on May 14, 2021, now Pat. No. 11,391,261.
(Continued)

(51) Int. Cl.
*F03B 13/14* (2006.01)
*B63B 25/08* (2006.01)
(Continued)

(52) U.S. Cl.
CPC .............. *F03B 13/14* (2013.01); *B63B 25/08* (2013.01); *B63B 27/24* (2013.01); *B63B 79/40* (2020.01);
(Continued)

(58) Field of Classification Search
CPC ....... Y02E 10/20; Y02E 10/30; Y02E 10/727; Y02E 60/30; Y02E 60/32; Y02E 60/34;
(Continued)

(56) References Cited

U.S. PATENT DOCUMENTS

| 4,850,190 A | * | 7/1989 | Pitts | ......................... F03B 13/10 60/495 |
| 7,228,812 B2 | * | 6/2007 | Morse | ......................... B63J 3/04 114/382 |

(Continued)

FOREIGN PATENT DOCUMENTS

| DE | 102018114132 A1 | * | 12/2018 | ............. F03D 13/25 |
| GB | 2480155 A | * | 11/2011 | ............. B63B 27/24 |

(Continued)

*Primary Examiner* — Ajay Vasudeva
(74) *Attorney, Agent, or Firm* — Fulwider Patton LLP

(57) ABSTRACT

A system and method by which energy from ocean waves is converted into hydrogen, and that hydrogen is used to manifest electrical and mechanical energies by an energy consuming device. A portion of the generated electrical power is communicated to water electrolyzers which produce oxygen and hydrogen from water as gases. At least a portion of the generated hydrogen gas is transferred to a transportation ship via a hose-carrying, remotely operated (or otherwise unmanned) vehicle, and subsequently transferred to an energy-consuming module or infrastructure, where a portion of the hydrogen is consumed in order to manifest a generation of electrical energy, a mechanical motion, and/or a chemical reaction.

34 Claims, 46 Drawing Sheets

Related U.S. Application Data

(60) Provisional application No. 63/026,670, filed on May 18, 2020, provisional application No. 63/060,145, filed on Aug. 3, 2020, provisional application No. 63/186,709, filed on May 10, 2021.

(51) Int. Cl.
| | | |
|---|---|---|
| *B63B 27/24* | (2006.01) | |
| *B63B 79/40* | (2020.01) | |
| *B63G 8/00* | (2006.01) | |
| *B63G 8/08* | (2006.01) | |
| *B67D 7/04* | (2010.01) | |
| *B67D 9/00* | (2010.01) | |
| *C25B 1/04* | (2021.01) | |

(52) U.S. Cl.
CPC .............. *B63G 8/001* (2013.01); *B63G 8/08* (2013.01); *B67D 7/04* (2013.01); *B67D 9/00* (2013.01); *C25B 1/04* (2013.01); *B63G 2008/004* (2013.01); *B63G 2008/007* (2013.01)

(58) Field of Classification Search
CPC .......... Y02E 60/36; Y02E 70/30; Y02P 70/50; B63B 25/08; B63B 2025/087; B63B 25/12; B63B 25/14; B63B 27/24; B63B 27/30; B63B 27/34; B63B 2035/006; B63B 2035/007; B63B 2035/008; B63B 2035/4433; B63B 2035/446; B63B 2035/4466; B63B 2035/4473; B63B 2035/448; B63B 2035/4486; B63B 2209/14; B63B 2209/20; B63G 8/001; B63G 2008/002; B63G 2008/004; B63G 2008/005; B63G 2008/007; B63G 8/08; C25B 1/02; C25B 1/04; C25B 15/08; B67D 7/04; B67D 9/00; B67D 9/02; F03B 13/12; F03B 13/14; F03B 13/145; F03B 13/16; F03D 9/19; F03D 13/25; F03D 13/256

See application file for complete search history.

(56) References Cited

U.S. PATENT DOCUMENTS

| | | | | |
|---|---|---|---|---|
| 7,453,164 | B2* | 11/2008 | Borden | F03D 13/25 |
| | | | | 123/3 |
| 7,872,363 | B2* | 1/2011 | Morse | F03B 17/025 |
| | | | | 290/53 |
| 11,391,261 | B2* | 7/2022 | Sheldon-Coulson | F03D 9/19 |
| 2002/0182946 | A1* | 12/2002 | Tanaka | F03D 9/11 |
| | | | | 440/6 |
| 2007/0228739 | A1* | 10/2007 | Kraczek | F03D 9/255 |
| | | | | 290/53 |
| 2011/0067618 | A1* | 3/2011 | Dempster | B63G 8/001 |
| | | | | 114/321 |
| 2012/0242275 | A1* | 9/2012 | Kokusho | H02S 20/00 |
| | | | | 136/246 |

FOREIGN PATENT DOCUMENTS

| | | | | |
|---|---|---|---|---|
| JP | 2003072675 A | * | 3/2003 | |
| JP | 2005135650 A | * | 5/2005 | |
| JP | 2005145218 A | * | 6/2005 | |
| JP | 2005220946 A | * | 8/2005 | |
| JP | 2015063313 A | * | 4/2015 | |
| JP | 5921647 B1 | * | 5/2016 | |
| WO | WO-2019204857 A1 | * | 10/2019 | ............. B63B 35/44 |

* cited by examiner

HYDROGEN PRODUCTION AND CONVEYANCE SYSTEM

CROSS-REFERENCES TO RELATED APPLICATIONS

This Continuation is based on U.S. Ser. No. 17/320,541, filed May 14, 2021, which claims priority to U.S. Ser. No. 63/026,670, filed May 18, 2020; U.S. Ser. No. 63/060,145, filed Aug. 3, 2020; and U.S. Ser. No. 63/186,709, filed May 10, 2021, the content of each of which is incorporated by reference herein in their entirety.

BACKGROUND

The present disclosure addresses and solves multiple long-felt needs, including, but not limited to: the cost-effective extraction of energy from ocean waves; the transmission of energy extracted from the ocean to an energy consumer (especially a land-based energy consumer); and the distribution of substantial amounts of energy to a great plurality of energy consumers.

Many have recognized the abundant amounts of energy present in the ocean, and especially in waves moving across the surface of the ocean. However, prior to the present disclosure, the cost-effective harvesting, collection, capture, conversion, and/or extraction of that energy has not been possible. Wave energy conversion (WEC) devices of the prior art typically rely upon a variety of impractical designs, and tend to incorporate a variety of impractical elements, including, but not limited to: structural members moving in response to wave motion, such structural members tending to break during storms, flexible membranes that flex in response to the passage of waves, such membranes tending to fracture and/or fail in response to fatigue, and inefficient mechanisms that move and/or rotate in response to wave motion, such mechanisms tending to be expensive and to require frequent maintenance.

What has been needed is a device, and/or a technology, that captures and converts wave energy at a low cost, e.g., producing inexpensive electrical power or chemical fuels.

Prior to the present disclosure, the utilization of energy harvested, collected, captured, converted, and/or extracted from ocean waves has typically relied upon the transmission of wave-generated electrical power through subsea and terrestrial power cables. However, subsea power cables tend to be expensive to deploy and tend to limit the deployment of WEC devices to relatively shallow waters very near a shoreline. This has tended to prevent the deployment of such devices to deep-water portions of the sea, far from shore, where waves tend to be most vigorous.

What has been needed, and what the prior art has failed to provide, is a technology and/or a method for transmitting energy from WEC devices to energy consumers, e.g., on land, wherein that energy transmission technology and/or method does not require or utilize either subsea or terrestrial electrical power cables.

Prior to the present disclosure, the utilization of energy harvested, collected, captured, converted, and/or extracted from ocean waves has typically been limited to energy consumers located adjacent to a shoreline bounding a body of water from which the energy of waves has been extracted (e.g., within 100 miles of such bodies of water). Inland energy consumers located relatively far from an ocean characterized by significant wave motion have often, if not typically, been excluded from the benefit of consuming wave-generated energy and have instead been forced to consume energy derived from other sources, e.g., fossil fuels, wind, and sun. Some of these alternate energy sources are toxic, e.g., fossil fuels and nuclear fission. Others are intermittent and unreliable, e.g., wind and solar.

What has been needed is a technology and/or a method that would permit the transmission of energy from WEC devices operating in a sea, to energy consumers located anywhere in the world, regardless of their proximity to a shoreline.

Disclosed are embodiments of mechanisms, technologies, apparatuses, systems, and methods which permit rich, and currently under-utilized, natural, and renewable marine wave energy resources to be efficiently harvested far from shore, and for the extracted energy to be efficiently collected, and to subsequently be efficiently transported to energy consumers anywhere on Earth. The present disclosure thereby enables energy consumers to apply ocean wave energies to good purpose, thereby tending to promote the supplantation of toxic and intermittent energy sources with inexpensive renewable and reliable deep-sea wave energies.

SUMMARY OF THE INVENTION

Embodiments of the systems, apparatuses, and methods disclosed herein comprise, at least in part, a novel wave energy conversion (WEC) device; a novel hydrogen collection and transportation vessel (i.e. a hydrogen vessel); and a novel device and/or mechanism (i.e. a self-propelled hydrogen hose) that enables a hydrogen vessel to fluidly and/or flexibly connect to a WEC device in order to remove from it a portion of a supply, repository, and/or reservoir of hydrogen gas generated and/or synthesized by the WEC device, and to replenish a supply of freshwater to the WEC device to enable and/or facilitate the future generation of additional supplies of hydrogen gas.

The following summary description pertains to at least one, but not necessarily all, embodiments of the present disclosure. It is to be understood that not all embodiments of the present disclosure contain all elements or exhibit all features described in this brief summary. Further, it should be understood that no limitation on the scope of the present invention(s) is intended by the provision of this brief summary. The reader is advised to consult the detailed figure descriptions and claims to understand the scope of the disclosure.

The novel WEC device disclosed herein is comprised of an at least partially hollow buoy and at least one (and possibly more) nominally approximately vertical water tube (s). The water tube includes a constriction an an uppermost end. An upper mouth of the water tube is positioned within the hollow buoy from which the water tube depends. A lowermost end of the water tube is positioned beneath the buoy and includes a lower mouth through which water flows between the interior of the water tube and the water on which the device floats. A reservoir of water (i.e., a first water reservoir or water ballast) within the hollow buoy tends to increase the inertia of the device, and due to a pocket of compressed and/or pressurized air within the buoy, the water within the buoy's first water reservoir tends to be pressurized as well.

When floating at the surface of a body of water over which waves pass, the disclosed WEC device will tend to be moved and/or oscillated vertically by those passing waves such that water within the device's water tube will tend to be pushed down by the water tube's constriction. The inertia of the device, and its first water reservoir/water ballast tends to be substantial, and when the device is falling from a wave crest toward an approaching wave trough, it tends to apply a substantial downward force to any water located within the constricted portion of the water tube, thereby causing the water within the WEC device's water tube to be pressurized and accelerated downward (at least in part). Subsequently, when the WEC device is rising from a wave trough toward an approaching wave crest, the water within the water tube tends to slow its descent and then accelerate upward in a rebounding and/or elastic fashion toward the constriction from a position far below the water's equilibrium level within the water tube. When the upwardly moving water within the water tube reaches and/or collides once again with the downwardly moving constriction (within the downwardly moving WEC device as it falls from a wave crest), the water within the constricted portion of the water tube tends to be pressurized and a portion of that water erupts from, is ejected by, and/or flows out of, the upper mouth of the water tube and is thereby deposited within the pressurized first water reservoir within the device's hollow buoy. Pressurized water from the WEC device's internal first water reservoir flows out of the device through an effluent aperture and/or pipe in which is positioned a water turbine, magnetohydrodynamic generator, or other means of governing the rate of flow (e.g. an apparatus that maintains a pressure drop from the first water reservoir to the body of water outside the buoy). In embodiments using a water turbine, the water turbine extracts energy from the outflowing effluent and the resulting rotations of the water turbine cause an operably connected generator to produce electrical power.

A portion of the electrical power produced by the water turbine and generator of the disclosed WEC device is transmitted to a water electrolyzer positioned within a second water reservoir, with the second water reservoir preferably containing water free of dissolved ions and/or other solutes. The water electrolyzer tends to convert liquid water molecules into gaseous molecules of oxygen and hydrogen. A portion of the electrolysis-generated hydrogen gas is captured and/or trapped within the WEC device and stored within a hydrogen reservoir (which in some embodiments is contained within the same tank as the second water reservoir).

The WEC device includes a hydrogen port, which incorporates, comprises, utilizes, and/or includes, a passively and/or manually actuated female hydrogen hose connection valve. The female hydrogen hose connection valve is fluidly connected to the hydrogen reservoir of the WEC device by a hydrogen effluent pipe, channel, hose, and/or tube. The flow of hydrogen gas through the hydrogen effluent pipe is additionally controlled, restricted, adjusted, and/or enabled, by an actuated hydrogen-release valve, through which, when the valve is opened or open, the device's reservoir of trapped hydrogen gas is able to flow from the hydrogen reservoir to the female hydrogen hose connection valve, and therethrough out of the WEC device. By contrast, when the actuated hydrogen-release valve is closed and not open the device's reservoir of trapped hydrogen gas is and/or remains trapped within the hydrogen reservoir and is unable to flow out of, and/or escape, the hydrogen reservoir.

The WEC device utilizes water effluent flowing out of its first water reservoir, and away from its water turbine, in order to generate a thrust which tends to move the WEC device in a direction opposite that of the effluent outflow. A rudder outside the effluent aperture allows the WEC device's controller to steer the WEC device in any desirable direction across the surface of the body of water on which it floats, and/or toward any desirable location thereon.

The hydrogen vessel disclosed herein incorporates and depends upon a plurality of pressure vessels, tanks, canisters, and/or chambers, to both store hydrogen gas retrieved from WEC devices and to provide structural strength to the vessel. While the hydrogen vessel may energize its propulsion, and/or its propulsors, e.g., propellers, ducted fans, etc., with a portion of the hydrogen that it collects and transports, it may also incorporate a chamber, tank, and/or reservoir of a fuel that is not hydrogen, e.g., diesel fuel.

The hydrogen vessel is equipped with a flexible hose and/or cable (i.e. a hydrogen transfer hose) through which it is draws, removes, and/or transfers hydrogen gas from a WEC device to itself. At a distal end of the hydrogen transfer hose is a hose connection "remotely-operated vehicle" (ROV) which propels the hose through a body of water as well as secures an end of the hose to a WEC device.

Upon reaching an appropriate, suitable, acceptable, and/or sufficient proximity to a WEC device, the hydrogen vessel (autonomously and/or through an operator thereon) releases and/or unwinds its hydrogen transfer hose thereby allowing the hydrogen transfer hose, and the hose connection ROV attached thereto, to enter the body of water on which the hydrogen vessel floats. Upon entering the water, the hose connection ROV at the distal end of the hydrogen transfer hose generates, adjusts, produces, and/or controls thrust with, and/or generated by, its propulsors, e.g., propellers, so as to approach, move toward, and contact the outer surface of the proximate WEC device.

In one embodiment, the hull of the WEC device is metallic and attracted to and/or by magnetic fields (e.g., the hull is ferromagnetic or paramagnetic). With respect to such an embodiment, upon reaching a position adjacent to the metallic hull of the WEC device, e.g., wherein the metallic hull is ferromagnetic or paramagnetic, the hose connection ROV energizes an electromagnet with a first current and voltage so as to generate a magnetic field of a first magnetic field strength, holding the hose connection ROV against the hull with sufficient normal force to enable said ROV to move circumferentially and/or tangentially about the hull's surface.

Engraved within a portion of the hull surrounding the hydrogen port of the WEC device are a plurality of guide grooves radially arrayed about the WEC device's hydrogen port. In one embodiment of the hose connection ROV, a camera and a laser illuminator of the hull surface beneath the hose connection ROV allow the hose connection ROV's controller (not shown) to detect the engraved guide grooves and to use them to locate the hydrogen port of the respective WEC device.

Upon detecting and/or locating guide grooves on a WEC device, the hose connector ROV moves itself parallel to one or more of those grooves. Because the guide grooves are arrayed in a radial fashion, the gaps between portions of adjacent guide grooves tend to be proportional to the distance of those portions and/or spots from the hydrogen port from which the guide grooves radiate. Therefore, if, after an initial movement parallel to, and/or following, one or more guide grooves, the hose connection ROV controller determines that the separation between an adjacent pair of grooves is increasing, then the hose connection ROV controller will reverse the course of the course hose connection ROV and move it toward the hydrogen port of the WEC device to which it is loosely attached by magnetic forces. On the other hand, if, after an initial movement parallel to, and/or following, one or more guide grooves, the hose connection ROV controller determines that the separation between an adjacent pair of grooves is decreasing, then the hose connection ROV continues following the guide grooves toward the hydrogen port of the WEC device until it arrives at a position directly over the hydrogen port.

This, or any number of potential alternate homing behaviors that may be manifested by alternate embodiments of a hose connection ROV will eventually cause a hose connection ROV to position itself directly above the hydrogen port of the WEC device to which it is loosely attached.

When positioned above the hydrogen port of the WEC device, the hose connection ROV then actuates, and/or extends, a penetrating portion of its male hydrogen hose connection valve, thereby pushing that penetrating portion of the male hydrogen hose connection valve into the complementary female, receiving, mating, and/or complementary orifice on and/or in the female hydrogen hose connection valve of the hydrogen port. When the male hydrogen hose connection valve and the complementary female hydrogen hose connection valve are joined and/or interconnected, the hydrogen transfer hose of the hydrogen vessel is fluidly connected to the hydrogen effluent pipe of the respective WEC device.

After the hydrogen transfer hose is fluidly connected to the hydrogen effluent pipe, the hydrogen vessel signals the WEC device, e.g., by an encoded radio signal, instructing the controller of the WEC device to open the electrically-actuated secondary hydrogen-release valve which controls the flow of hydrogen gas between the hydrogen reservoir and the hydrogen effluent pipe of the WEC device, thereby allowing hydrogen gas from the hydrogen reservoir to flow from the hydrogen reservoir to the hydrogen vessel through the channel created by the unobstructed union and/or connection of the hydrogen reservoir, hydrogen effluent pipe, female hydrogen hose connection valve, male hydrogen hose connection valve, and hydrogen transfer hose.

The pressure of the hydrogen gas trapped within the hydrogen reservoir of a WEC device may be sufficient to passively cause, force, push, drive, and/or propel, a portion of that hydrogen gas from the WEC device to the hydrogen vessel, through the connecting hydrogen transfer hose, where the hydrogen gas is then captured within a pressurized hydrogen tank on and/or in the hydrogen vessel. If not sooner, then when the pressure of the hydrogen gas within the hydrogen reservoir of the WEC device falls to, and/or below, a threshold pressure, a pump on the hydrogen vessel actively pumps, pulls, sucks, and/or draws, additional hydrogen gas from the hydrogen reservoir of the WEC device and deposits that hydrogen gas into the pressurized hydrogen tank on and/or in the hydrogen vessel.

After a requisite, sufficient, target, adequate, and/or maximal, portion and/or amount of hydrogen gas has been transferred from the hydrogen reservoir of a WEC device to a hydrogen tank on and/or in the hydrogen vessel via the hose connection ROV and the hydrogen hose fluidly connected thereto, the hydrogen vessel pumps freshwater, e.g., deionized, distilled and/or solute-free water, through the hydrogen transfer hose and into the fluidly connected hydrogen reservoir, which is fluidly connected to the second water reservoir (wherein the water electrolyzer of the WEC device is positioned and wherein the water electrolyzer splits the water molecules so as to create, and/or to continue the creation of, gases of oxygen and hydrogen).

While the hydrogen gas created by the water electrolyzer is trapped within the hydrogen reservoir, the oxygen gas is vented to the compressed air pocket of the hollow buoy thereby tending to continually increase the pressure of the compressed air therein. However, and in complementary fashion, the pressure of the gas within the compressed air pocket inside the hollow buoy may be continuously and/or periodically reduced through the actuation of an electrically-controlled air pocket gas release valve. In this way, the pressure of the gases in the compressed air pocket can be increased, decreased, and/or otherwise adjusted, without the expenditure of significant amounts of electrical energy.

The ability of the WEC device to continually adjust and/or regulate the pressure of the gases within its compressed air pocket has utility. Some of the gases within the compressed air pocket may be absorbed by, and removed from the WEC device along with, the water in the first water reservoir, e.g., by dissolving in the water within the first water reservoir and then flowing out of the WEC device with that water. The ability of the WEC device to replenish its compressed air pocket using only and/or primarily the waste product (i.e., oxygen) of the water electrolyzer avoids the need to expend additional electrical energy powering a pump to draw additional atmospheric air into the compressed air pocket in order to replenish the pressure of that air pocket.

Furthermore, the ability of the WEC device to continually adjust and/or regulate the pressure of the gases within its compressed air pocket permits the WEC device controller (e.g., the computer and associated sensors and actuators that control operations and processes within and/or of the WEC device) to adjust the volume, mass, and/or inertia of the water within the first water reservoir (greater air-pocket pressure tends to expel water from the WEC device more quickly and thereby reduce the volume and mass of water within the first water reservoir), thereby giving the controller the ability to adjust the draft of the WEC device, with changes in the draft of the WEC device tending to alter the waterplane area and buoy hull surface area exposed to the ambient waves, thereby tending to alter the WEC device's adsorption of energy from those waves.

Disclosed herein are apparatuses and methods by which the energy in ocean waves may be converted into electrical power, the generated electrical power used to electrolyze water into hydrogen gas and oxygen gas, the hydrogen gas collected and stored and gathered to a vessel which may then transfer, carry, and/or transport that hydrogen gas to another ship, a port, a UAV, an AUV, and/or any other mechanism, location, recipient, apparatus, vessel, and/or process, and the hydrogen gas consumed in order to achieve a useful result, process, and/or product. The collection of hydrogen gas by a vessel is, in some embodiments, facilitated by a self-propelled and self-connecting hose thereby reducing the risk associated with bringing two vessels close to one another in energetic wave conditions.

A novel ship-to-WEC interconnection and hydrogen-transfer apparatus and method are herein disclosed in which a hose adapted for the removal of hydrogen gas from a WEC device, and/or for the provision of freshwater to the WEC device, is pulled toward, and connected to, the hull and hydrogen port of a target WEC device by means of a hose connection ROV attached to a distal end of a hydrogen-harvesting ship's hydrogen transfer hose, thereby eliminating the need for a hydrogen-harvesting ship, i.e. a hydrogen vessel, to directly moor itself to a WEC device, especially at a close and/or small distance, and/or separation which could create a potentially dangerous situation in seas characterized by the kinds of energetic wave climates in which the WEC devices would typically be deployed and/or towards which they would typically propel themselves (autonomously and/or by remote instruction).

The scope of the present disclosure is not limited by the precise geometry of any of its components, parts, and/or pieces; nor by the materials from which those components, parts, and/or pieces are made. The scope of the present disclosure is not limited by the sizes, relative or absolute, of the entire WEC device, the hydrogen vessel, and the hose connection ROV, nor of any other components, parts, and/or pieces disclosed herein.

The scope of the present disclosure is not limited to specific geometries, designs, architectures, materials of fabrication, of the WEC devices, hydrogen (transport) vessels, chemical fuel transfer mechanisms, methods, and/or devices.

The scope of the present disclosure extends to, and/or includes, any mechanism, device, system, and/or method, by which energy is harvested from water waves, converted to a chemical fuel, transported to an energy-consuming mechanism, device, and/or system, and thereby consumed.

The scope of the present disclosure is not limited to specific mechanisms and/or types of intermediate alternate energies and/or powers generated from the wave energies absorbed and/or consumed, mechanisms, methods, and/or devices, by which intermediate alternate energies and/or powers are generated, including, but not limited to, those of water turbines and generators.

The scope of the present disclosure is not limited to specific type(s) of chemical fuels synthesized, mechanisms and/or methods by which those chemical fuels are generated, synthesized, produced, and/or created, mechanisms and/or methods with which those chemical fuels are captured, stored, cached, and/or accumulated.

The scope of the present disclosure is not limited to specific mechanisms and/or methods by which generated and/or synthesized chemical fuels are transferred, transported, and/or transmitted to energy consumers.

The scope of the present disclosure is not limited to specific mechanisms and/or methods by which generated and/or synthesized chemical fuels are utilized and/or consumed.

The scope of the present disclosure includes embodiments that incorporate, include, and/or utilize, chemical-fuel synthesizing WEC devices wherein the WEC devices are characterized by:
  hollow buoys of any size, diameter, included volume, displacement, waterplane area, draft, shape with respect to any cross-sectional plane, as well as those fabricated of any material or combination of materials;
  hollow buoys having, enclosing, trapping, and/or containing any number of internal pressurized air pockets characterized by any pressure of gas, whether positive, atmospheric, or negative, any volume of gas, any mass of gas, any maximum gas pressure (which the walls of the hollow buoys and/or air-pocket chambers, are engineered to enclose without structural failure), and incorporating, including, and/or comprising any gas or combination of gases, including, but not limited to: atmospheric air, oxygen, nitrogen, carbon dioxide, hydrogen, and ammonia;
  hollow buoys having, enclosing, trapping, and/or containing any number of internal ballasts, and/or any number of first water reservoirs, wherein the ballasts and/or first water reservoirs, are characterized by any volume, any mass, any weight, any specific gravity, any shape, any size, and wherein the ballasts incorporate, include, and/or utilize any type of ballast material, substance, and/or compound, and any combination of ballast materials, including, but not limited to: water, seawater, rocks, bricks, gravel, sand, cement, cementitious material, iron, steel, and/or metal; and
  hollow buoys incorporating, including, and/or utilizing any mechanism, device, apparatus, system, component, means, and/or method by which the pressure of the gas within their respective pressurized air pockets may be increased, decreased, stabilized, adjusted, and/or controlled, including, but not limited to: valves, electrically actuated valves, valves actuated passively and/or autonomously in response to threshold pressure differences across the valves, pumps, chillers or air conditioners (for cooling gases), heaters, tanks of pre-pressurized gases (from which additional gas may be released into an air pocket), and hollow tubes fluidly connecting an air pocket to the body of water on which an embodiment floats and wherein an upper mouth of such a hollow tube is positioned in the midst of an air pocket, and a lower mouth of such a hollow tube is positioned within the body of water on which an embodiment floats at a depth characterized by a head pressure equal to the maximum desirable pressure of gas within a respective pressurized air pocket.

The scope of the present disclosure includes embodiments that incorporate, include, and/or utilize, chemical-fuel synthesizing WEC devices wherein the WEC devices are characterized by:
  any number of water tubes, including, but not limited to: water tubes containing any number of constrictions, any degrees of constriction (relative or absolute), any number, magnitude, absolute and/or relative variations and/or alterations in the cross-sectional areas with respect to section planes normal to a longitudinal and/or fluid-flow axis of respective water tubes;
  water tubes incorporating, including, comprising, and/or utilizing, constricted portions characterized and/or defined by any angularity, any rate of constriction (with respect to longitudinal position), any degree of continuity in the rate of constriction, ranging from smooth and/or linear, to halting, erratic, uneven, and/or varied or variable;
  water tubes of any length relative to a respective diameter and/or width of a respective hollow buoy; water tubes of any length relative to a respective diameter and/or width of the respective water tubes; water tubes characterized by any nominal draft with respect to a respective WEC device floating in a body of water; water tubes of any absolute length; water tubes of any enclosed volume;
  water tubes incorporating, including, comprising, and/or utilizing, any material of fabrication; and
  water tubes incorporating, including, and/or utilizing a lower mouth and/or aperture of any cross-sectional area, size, and/or shape; water tubes incorporating, including, and/or utilizing an upper mouth and/or aperture of any cross-sectional area, size, and/or shape; and, water tubes incorporating, including, and/or utilizing an upper or lower mouth and/or aperture defined by a tube edge of any shape, including, but not limited to, those which are smooth and/or defined by a cross-sectional plane normal to a longitudinal tube axis, and those which are jagged and/or defined by edge variations spanning a range of longitudinally separated cross-sectional planes.

The scope of the present disclosure includes embodiments that incorporate, include, and/or utilize, chemical-fuel synthesizing WEC devices wherein the WEC devices are characterized by:
  any number of water turbines; water turbines of any size, swept turbine area, diameter, blade design, blade configuration, blade orientation, nominal blade angle of attack, number of blades, number of sets of counter-rotating blades, nominal upstream/downstream pressure differential, material of fabrication, nominal rate of rotation, nominal and/or maximal energy extraction efficiency and/or efficiency of converting pressure and/or kinetic energy of a fluid flow into a mechanical energy such as rotational kinetic energy;

water turbines incorporating, including, comprising, and/or utilizing hubs to which turbine blades are attached wherein hubs, and the blades attached thereto, rotate in response to fluids flowing through the blades thereon, nominally causing the rotation of respective attached turbine shafts; water turbines incorporating, including, comprising, and/or utilizing hubless designs with turbine blades attached to annular and/or cylindrical structures which rotate in response to fluids flowing through the blades thereon;

water turbines fluidly connected to a respective first water reservoir and positioned anywhere in a respective WEC device or outside a WEC device (e.g., outside an effluent port or aperture of a respective first water reservoir and immersed in the body of water on which a respective WEC device floats); water turbines fluidly connected to the water tube of a respective WEC device; water turbines that rotate in a single direction; water turbines that rotate in two directions and/or counter-rotate; water turbines incorporating, including, comprising, and/or utilizing bidirectional and/or rotating turbine blades; water turbines positioned in effluent apertures, pipes, channels, and/or ports gated by valves thereby permitting water flow to a respective water turbine to be obstructed or unobstructed actively by a respective WEC device's controller and/or to be obstructed or unobstructed passively by a pressure actuated mechanism; and, water turbines incorporating, including, comprising, and/or utilizing magnets positioned on and/or within a central hub, or on and/or within a rotating annular or cylindrical structure (hubless turbine blade runner), so as to induce electrical currents and/or voltages within complementary electrical conductors (e.g., thereby obviating the need for a separate and/or mechanically-linked generator); and any type of water turbine, including, but not limited to those characterized as: Impulse turbines, Pelton wheels, Turgo wheels, Crossflow turbines, Impulse turbines with guide vanes, Reaction turbines, Propeller turbines, Bulb turbines, Tube turbines, Kaplan turbines, Francis turbines, and/or any other water-flow-to-mechanical-energy or water-flow-to-electrical-energy conversion machine.

The scope of the present disclosure includes embodiments that incorporate, include, and/or utilize, chemical-fuel synthesizing WEC devices wherein the WEC devices are characterized by:

any number of generators; generators of any size, nominal electrical output (e.g., in kilowatts), nameplate capacity, type of electrical output, including, but not limited to: alternating current, three-phase alternating current, and direct current; generators of any type, design, category, style, and/or model of generator, including, but not limited to: alternators, generators, and/or any other electrical power generating device including, but not limited to a magnetohydrodynamic generator (which can be unconnected to a turbine, but merely operated by a flow of water through it) and a homopolar generator;

any device, machine, module, and/or system, that generates electrical power, pressurized hydraulic fluid, compressed air, and/or performs some other useful work or produces some other useful product in response to an input of mechanical energy;

any generator, alternator, or other mechanism, device, and/or component, that converts energy from one form to another, including, but not limited to, any mechanism, device, and/or component, that converts the rotary motion of a water turbine's shaft or the repeated motion of some other component into electrical power;

any mechanism, device, and/or component, in which the amount, degree, and/or magnitude, of a resistive torque imparted to a respective operably-connected water turbine may be actively controlled by the controller of a WEC device so as to control, adjust, change, alter, and/or optimize the rate at which energy is extracted from the water flowing through a respective water turbine; and a generator positioned anywhere in a respective WEC device or outside a WEC device (e.g., outside an effluent port or aperture of a first water reservoir and immersed in the body of water on which a respective WEC device floats).

The scope of the present disclosure includes embodiments that incorporate, include, and/or utilize, chemical-fuel synthesizing WEC devices wherein the WEC devices are characterized by:

any number of water electrolyzers; water electrolyzers of any size, nominal input electrical voltage, nominal input electrical current, relationship between electrolyzer and/or hydrogen-generation efficiency and input electrical voltage and/or current, and nominal rate of hydrogen generation and/or output;

water electrolyzers incorporating, including, comprising, and/or utilizing any type of cathode, cathodes incorporating and/or fabricated of any material, compound, element, mineral, and/or type of molecule; water electrolyzers incorporating, including, comprising, and/or utilizing any type of anode, anodes incorporating and/or fabricated of any material, compound, element, mineral, and/or type of molecule;

water electrolyzers incorporating, including, comprising, and/or utilizing any mechanical, electrical, and/or structural design, configuration, architecture, and/or arrangement;

water electrolyzers incorporating, including, comprising, and/or utilizing any complementary, associated, and/or fluidly connected, second water reservoir; water electrolyzers incorporating, including, comprising, and/or utilizing any number of fluidly connected second water reservoirs, as well as second water reservoirs of any volume, design, shape, size, and/or fabricated of any material; water electrolyzers incorporating, including, comprising, and/or utilizing fluidly connected second water reservoirs having any relative and/or absolute position within a respective WEC device, including second water reservoirs positioned outside a WEC device such that they are immersed within the body of water on which a respective WEC device floats; water electrolyzers which are rigidly, and those which are flexibly, connected to a respective WEC device and/or to a respective second water reservoir; and water electrolyzers incorporated and/or embedded within detachable vessels, including autonomous self-propelled vessels, thereby facilitating the removal of the hydrogen generated by such a water electrolyzer from a respective WEC device and the retrieval of such generated hydrogen by a respective hydrogen vessel, as well as the inspection, testing, maintenance, and/or replacement of the water electrolyzer and/or of anodes, cathodes, and/or other components therein.

The scope of the present disclosure includes embodiments that incorporate, include, and/or utilize, chemical-fuel synthesizing WEC devices wherein the WEC devices are characterized by:

any number of hydrogen reservoirs; hydrogen reservoirs of any size, any volume, any shape, and/or fabricated of any material;

hydrogen reservoirs enclosed and/or defined by vessels, chambers, enclosures, and/or tanks which are shared by, and/or common to, both the hydrogen reservoirs and the second water reservoirs of their respective, associated, and/or complementary water electrolyzers; hydrogen reservoirs enclosed and/or defined by vessels, chambers, enclosures, and/or tanks which are not shared by, and/or common to, a second water reservoir, e.g., but are instead fluidly connected to a second water reservoir by a pipe, tube, hose, channel, and/or conduit;

hydrogen reservoirs that trap, cache, store, and/or enclose hydrogen at any nominal gas pressure, and/or over any range of gas pressures; hydrogen reservoirs which are fluidly connected to pumps which pull hydrogen from respective water electrolyzers and force that hydrogen into the respective pressurized hydrogen reservoirs, thereby compressing it; hydrogen reservoirs that trap, cache, store, and/or enclose hydrogen passively, e.g., by allowing hydrogen gas to bubble away from a respective water electrolyzer and thereby to be passively captured and incrementally compressed within the respective fluidly connected hydrogen reservoir;

hydrogen reservoirs having any relative and/or absolute position within a respective WEC device and/or with respect to the respective water electrolyzers and/or second water reservoirs to which they are fluidly connected, including hydrogen reservoirs positioned outside a WEC device such that they are immersed within the body of water on which a respective WEC device floats; hydrogen reservoirs which are rigidly, and those which are flexibly, connected to a respective WEC device and/or to a respective second water reservoir and/or water electrolyzer; and hydrogen reservoirs incorporated and/or embedded within detachable vessels, including autonomous self-propelled vessels, thereby facilitating their removal from a respective WEC device and their retrieval by a respective hydrogen vessel.

The scope of the present disclosure includes embodiments that incorporate, include, and/or utilize, chemical-fuel synthesizing WEC devices wherein the WEC devices are characterized by:

any number of controllers; controllers capable of, tasked with, and/or responsible for, any number, type, category, degree, and/or range of operational tasks, processes, actions, procedures, objectives, milestones, and/or events; controllers capable of, tasked with, and/or responsible for, any number, type, category, degree, and/or range of strategic and/or planning tasks, processes, actions, procedures, objectives, milestones, and/or events; controllers capable of, tasked with, and/or responsible for, any number, type, category, degree, and/or range of forecasting and/or predictive tasks, processes, actions, procedures, objectives, milestones, and/or events; controllers capable of, tasked with, and/or responsible for, any number, type, category, degree, and/or range of analysis and/or analytical tasks, processes, actions, procedures, objectives, milestones, and/or events; controllers capable of, tasked with, and/or responsible for, any number, type, category, degree, and/or range of diagnostic and/or problem-solving tasks, processes, actions, procedures, objectives, milestones, and/or events;

controllers incorporating, including, comprising, and/or utilizing computational circuits, hardware, components, peripherals, processors, assemblies, and/or networks, of any type, category, architecture, and/or design; controllers incorporating, including, comprising, and/or utilizing memory and/or data-storage circuits, hardware, components, peripherals, processors, assemblies, and/or networks, of any type, category, architecture, and/or design; controllers incorporating, including, comprising, and/or utilizing data sharing and/or data transmission circuits, hardware, components, peripherals, processors, assemblies, and/or networks, of any type, category, architecture, and/or design;

controllers housed within enclosures, chambers, shells, boxes, and/or cabinets, fabricated and/or made of any material, utilizing any manner, type, and/or degree of thermal cooling, conduction, convection, and/or dissipation, including, but not limited to: thermally conductive enclosure walls, proximity to water within and/or without the WEC device, proximity to air, gas, and/or atmosphere, within and/or without the WEC device, phase-change materials, passive heat exchangers, active heat exchangers, heat exchangers incorporating, including, comprising, and/or utilizing, water has a heat exchanging medium; and controllers linked to, communicating with, and/or receiving encoded and/or analogue signals from one or more sensors providing the controllers with measurements, values, data, readings, and/or input, related to and/or specifying operational, conditional, and/or states of physical and/or environmental qualities and/or characteristics including, but not limited to: temperature, pressure, vibration, torsion, sound, electromagnetic radiation, capacitance, orientation, absolute position, relative position, speed, acceleration, voltage, current, resistance, magnetic field strength, electrostatic field strength, density, and salinity.

The scope of the present disclosure includes embodiments that incorporate, include, and/or utilize, chemical-fuel synthesizing WEC devices wherein the WEC devices are characterized by:

any number of energy-storage devices; energy-storage devices, mechanisms, apparati, systems, components, means, and/or methods, including, but not limited to: batteries, Li-ion batteries, lead-acid batteries, capacitors, super-capacitors, induction coils, fly wheels, and fuel cells;

energy-storage devices located and/or positioned anywhere within or without a WEC device; and the scope of the present disclosure includes embodiments of WEC devices that do not incorporate, include, and/or utilize, any energy storage devices other than, and/or apart from, the chemical fuels that they synthesize.

The scope of the present disclosure includes embodiments that incorporate, include, and/or utilize, chemical-fuel synthesizing WEC devices wherein the WEC devices are characterized by:

any number of communication devices; communication devices, mechanisms, apparati, systems, components, means, and/or methods, including, but not limited to, those communicating by means of encoded or analogue signals embedded within transmissions of radio, light, electromagnetic waves, Wi-fi, and semaphores;

communication devices that transmit and/or receive signals which include, but is not limited to data that encodes ASCII characters, binary codes, operational codes, geospatial coordinates, WEC-device status codes, diagnostic codes, hazard warnings, weather forecasts, encrypted data, data encrypted with public and/or private keys, data encrypted with symmetric encryption keys, data encrypted with one-time look-up tables, blockchain hash codes, blockchain nonce values, computational tasks to be executed on a WEC device, and results of computational tasks executed on a WEC device;

communication devices that transmit signals to, and/or receive signals from, remote transceivers, radios, antennas, and/or computing devices, incorporated in, and/or located on, satellites, terrestrial relay stations, land masses, oceans, seas, ships, planes, submarines, autonomous vessels, AUVs, UAVs, UUVs, outer space, and/or space stations;

communication devices that transmit and/or receive signals through antennas of any type, category, size, range, length, and nominal orientation;

communication devices that transmit and/or receive signals through parasitic antennas including, but not limited to: Yagi-Uda antennas, Quad antennas, wire antennas, loop antennas, dipole antennas, half-wave dipole antennas, odd multiple half-wave dipole antennas, short dipole antennas, monopole antennas, electrically small loop antennas, electrically large loop antennas, log periodic antennas, bow-tie antennas, endfire arrays consisting of multiple antenna elements in a line of which only one is a driven element (i.e., connected to a transmitter or receiver), and log periodic dipole arrays;

communication devices that transmit and/or receives signals through travelling wave antennas including, but not limited to: helical antennas, and Yagi-Uda antennas;

communication devices that transmit and/or receive signals through microwave antennas including, but not limited to: rectangular micro-strip antennas, and planar inverted-F antennas;

communication devices that transmit and/or receive signals through reflector antennas including, but not limited to: corner reflector antennas, parabolic reflector antennas, multi-band antennas, and separate transmission and receiving antennas;

communication devices that transmit and/or receive signals through one or more types of antenna arrays including, but not limited to, driven arrays of helical antennas;

communication devices that transmit and/or receive signals through one or more types of broadside antenna arrays including, but not limited to, collinear arrays;

communication devices that transmit and/or receive signals through one or more types of planar antenna arrays including, but not limited to, those composed of uni-directional antennas;

communication devices that transmit and/or receive signals through one or more types of reflective antenna arrays including, but not limited to: half-wave dipole antennas in front of a reflecting screen, curtain arrays, and microstrip antennas (e.g., comprised of arrays of patch antennas);

communication devices that transmit and/or receive signals through one or more types of phased antenna arrays including, but not limited to: those with analog and/or digital beamforming, those with crossed dipoles, passive electronically scanned arrays, active electronically scanned arrays, low-profile and/or conformal arrays, smart antennas, reconfigurable antennas, and/or adaptive arrays in which a receiving array that estimates the direction of arrival of the radio waves and electronically optimizes the radiation pattern adaptively to receive it, synthesizing a main lobe in that direction; and communication devices that transmit and/or receive signals by means of radios, cellular-phone electromagnetic channels, lasers, quantum-encoded channels, and/or any and all other communication modalities.

The scope of the present disclosure includes (but is not limited to) embodiments that incorporate, include, and/or utilize, chemical-fuel synthesizing WEC devices wherein the WEC devices are characterized by:

waterplane areas of between 10 and 10,000 square meters;

drafts of between 10 and 350 meters;

water tubes having average cross-sectional areas (with respect to sectional planes normal to longitudinal axes, and/or fluid-flow axes, of the respective water turbines) that are between 3 and 2,000 square meters;

water tubes having lengths (along axes parallel to longitudinal axes, and/or fluid-flow axes, of the respective water tubes) that are between 10 and 300 meters;

first water reservoirs having volumes that are between 50 and 40,000 cubic meters;

first water reservoirs having masses of ballast therein that are between 50 thousand and 40 million kilograms;

first water reservoirs having relative masses of ballast therein equal to between 100% and 10,000% of the masses of the respective "dry" portions of the respective WEC device embodiments (i.e., of the masses of those parts of the respective WEC device embodiments that are rigid and/or not comprised of water, such as structural components);

hydrogen reservoirs capable of holding hydrogen gas at pressures including, but not limited to: 1, 2, 3, 5, 7, 9, 15, 25, 50, 90, 100, 150, 200, 250, 300, 400, 500, and 700 atmospheres;

hydrogen reservoirs capable of holding amounts of hydrogen gas having masses including, but not limited to: 10, 20, 50, 100, 500, 1000 (or 1 k), 5 k, 10 k, 20 k, 50 k, 100 k, 150 k, 200 k, 300 k, 500 k, and 1,000 k kilograms; and, the ability to generate between 0.5 kW and 10 MW of electrical power when buffeted by ocean waves having significant wave heights of 1.0 or more meters, and dominant or significant wave periods of 5 or more seconds.

The scope of the present disclosure includes embodiments that incorporate, include, and/or utilize, chemical-fuel synthesizing WEC devices wherein the WEC devices are able to propel themselves, at least in part, by means of: rigid sails, flexible sails, Flettner rotors, keel-shaped tube chambers, rudders, ducted fans, propellers, propeller-driven underwater thrusters, directed out-flows from water tubes or air tubes supplied with pressurized water or air by a hydrodynamic pumping action or a driven motor of the embodiment, water jets, submerged wave-heave-driven flaps, submerged tethered airplane-like kites and/or drones, inflatable water-filled bags, and sea anchors and/or drogues.

The scope of the present disclosure includes embodiments that incorporate, include, and/or utilize, chemical-fuel synthesizing WEC devices wherein the WEC devices are characterized by:
- any number of hydrogen ports per WEC device, any arrangement of hydrogen ports within and/or without a WEC device, any position relative and/or absolute of hydrogen ports on a WEC device, any size of hydrogen port, any type of valve, any category of valve, any type of actuated valve, any type of passively opened or closed valve, any number of valves, and any number of valve assemblies and/or subassemblies;
- hydrogen ports that incorporate, include, and/or utilize, any type of linkage, connector, design, any number of constituent male and/or female connectors (or connectors not characterized by male or female designations);
- hydrogen ports that incorporate, include, and/or utilize, any type of male dry disconnect, and any type of female dry disconnect; and,
- hydrogen ports that are link- and/or connection-compatible with any other type linkage, connector, valve, channel, harness, hose, tube, and/or pipe.

The scope of the present disclosure includes embodiments that incorporate, include, and/or utilize, chemical-fuel synthesizing WEC devices wherein the WEC devices incorporate, include, and/or utilize, a hydrogen reservoir that includes a nominally lowermost aperture through which that hydrogen reservoir and any hydrogen gas therein is fluidly connected to the body of water on which the respective WEC device floats, thereby permitting, facilitating, and/or enabling removal and/or harvesting of a portion of the hydrogen gas therein by means of that lower aperture (e.g., by means of a hose or pipe inserted up through the aperture through which hydrogen gas is drawn and/or sucked out of the hydrogen reservoir).

The scope of the present disclosure includes embodiments that incorporate, include, and/or utilize, chemical-fuel synthesizing WEC devices wherein the WEC devices are characterized by:
- any type, manner, category, design, and/or variety of structure, signal, feedback, and/or beacon by which a manually- or autonomously-operated mechanism is able to locate, approach, guide itself to, find, and/or home in on, the hydrogen port of a respective WEC device, including, but not limited to those incorporating, including, comprising, and/or utilizing magnets, magnet fields (e.g., those created about electrical conductors through which electrical current flows), optical guides (e.g., radial lines originating at, and/or focused upon, a hydrogen port painted in a first color and overlaid and/or painted between a second color), ridges, grooves, bumps, patterns of bumps, embossed and/or engraved triangular symbols aligned and/or pointing toward a hydrogen port, acoustic signals at and/or about a hydrogen port, voids within the hull of a WEC device wherein such voids create an acoustic response and/or echo distinct and/or discernably different from an acoustic response arising in response to a portion of hull lacking such voids (e.g., detected by a solenoid-driven tapping mechanism), lights (e.g., LED lights) at and/or arrayed about a hydrogen port, a resistance, voltage, and/or current arising from an electrical signal entering the hull of a WEC device at, near, or about a hydrogen port and connected to an external device, ROV, and/or other mechanism through the hull of the WEC device (e.g., and thereafter connected and/or grounded to the source of the electrical signal via the body of water (e.g., seawater) on which a WEC device floats) with the hull-distance between the signal's point of entry into a WEC device hull and its passage into a receiving and/or connecting external device resulting in a distance-unique voltage and/or current.

The scope of the present disclosure includes embodiments that incorporate, include, and/or utilize, hydrogen transfer and/or transport vessels wherein the hydrogen transfer and/or transport vessels are characterized by:
- any number of hydrogen transfer and/or transport vessels; hydrogen transfer and/or transport vessels of any size, any displacement, any geometry, any mode or method of propulsion (sail, propeller, jet); and
- hydrogen transfer and/or transport vessels characterized by, incorporating, including, comprising, and/or utilizing hydrogen storage vessels, tanks, chambers, enclosures, pressure vessels, and/or containers, characterized by any size, volume, shape, geometry, material, fabrication method, and/or maximum internal gas pressure.

The scope of the present disclosure includes embodiments that incorporate, include, and/or utilize, hydrogen transfer and/or transport vessels wherein the hydrogen transfer and/or transport vessels are characterized by:
- any mechanism, device, apparatus, system, component, means, and/or method by which the hydrogen transfer vessels are able to remove, extract, transfer, and harvest hydrogen (or any other gas or liquid) from a WEC device.

The scope of the present disclosure includes embodiments that incorporate, include, and/or utilize, WEC devices wherein the WEC devices are characterized by:
- any mechanism, device, apparatus, system, component, means, and/or method by which the WEC devices are able to expel, transfer, output, transmit, port, and/or send, hydrogen (or any other gas or liquid) to a hydrogen transfer vessel.

The scope of the present disclosure includes embodiments that incorporate, include, and/or utilize, mechanisms, devices, apparati, systems, components, means, and/or methods, by which hydrogen (or any other gas or liquid) is transferred from a WEC device to a hydrogen transport vessel, and/or from a hydrogen transport vessel to another ship, a receiving port facility, and/or some other consumer of the hydrogen (or any other gas or liquid), which are characterized by:
- any type, size, design, number, and/or kind, of attachment vessel to carry, pull, move, align, and/or connect, a hose, tube, cable, channel, and/or pipe, to a WEC device and/or a hydrogen transport vessel through which hose hydrogen (or any other gas or liquid) is transferred and/or flows from one to the other; wherein the attachment vessels may include, but are not limited to: autonomous underwater vessels (AUVs), remotely-operated vessels (ROVs), and/or unmanned underwater vessels (UUVs).

The scope of the present disclosure includes embodiments that incorporate, include, and/or utilize, a hose, tube, cable, channel, and/or pipe, through which hydrogen (or any other gas or liquid) is transferred and/or flows, which is characterized by:
- any type, size, diameter, length, design, number, and/or kind of hose or cable;
- a hose or cable fabricated by any design, scheme, and/or method;

a hose or cable incorporating, including, comprising, and/or utilizing any material;

a hose or cable incorporating any number of channels through each of which flows any gas, liquid, electrical signal, optical signal, data type; and a hose or cable through which flows any kind of energy, including, but not limited to: electrical energy, chemical energy, and/or pressure potential energy.

The scope of the present disclosure includes embodiments that incorporate, include, and/or utilize, a receiving, target, recipient, and/or supplied, energy consumer, which is characterized by:

any type, size, variety, and/or design of vessel, including, but not limited to: bulk-carrier ships, container ships, cruise/passenger ships, liquified natural gas (LNG) transport ships, submarines, and naval ships;

any type, size, variety, and/or design of autonomous water vessel, including, but not limited to: autonomous surface vessels (ASVs), autonomous underwater vessels (AUVs), and unmanned underwater vessels (UUVs);

any type, size, variety, and/or design of autonomous flying vessel, including, but not limited to: unmanned aerial vehicles (UAVs);

any type, size, variety, and/or design of land-based utility, including, but not limited to: near-shore power and/or energy storage or distribution utilities, island energy stations, and natural gas distribution facilities;

any type, size, variety, and/or design of sea-based platform, including, but not limited to: oil rigs, natural gas extraction platforms, aquaculture growing, production, and harvesting facilities, mineral harvesting facilities and/or operations, and seasteading platforms and/or communities;

any type, size, variety, and/or design of hydrogen-powered vehicle, including, but not limited to: personal automobiles, buses, trucks, tractor-trailer trucks, big rigs, and trains;

any type, size, variety, and/or design of hydrogen-powered airplane;

any type, size, variety, and/or design of hydrogen-powered rocket;

and the utilization of one or more fuel cells used to convert hydrogen into electrical power;

The scope of the present disclosure includes embodiments that produce, synthesize, create, generate, and/or manufacture, any chemical fuel including, but not limited to: hydrogen gas, liquified hydrogen, ammonia, hydrogen peroxide, methane, ethane, propane, any molecules containing carbon and hydrogen, any fossil fuel, nitrous oxide, any molecules containing nitrogen and hydrogen, and any molecules containing nitrogen and oxygen.

The scope of the present disclosure includes embodiments that produce, synthesize, create, generate, and/or manufacture, any nutritious molecule, food, vitamin, or nutritional supplement, including, but not limited to: an amino acid, L-arginine, L-histidine, L-phenylalanine, a protein, a carbohydrate, a sugar, glucose, sucrose, a vitamin, vitamin A, a B vitamin, vitamin C, vitamin D3, and vitamin E.

The scope of the present disclosure includes embodiments that incorporate, include, and/or utilize mechanisms, devices, apparati, systems, components, means, and/or methods designed to, intended to, capable of, and/or which prevent, illegal actions, activities, events, and/or losses including, but not limited to, those related to: theft of, or damage to, WEC devices, theft of, or damage to, hydrogen transport vessels, theft of, or loss of, hydrogen (or any other gas or liquid synthesized by a WEC device), and piracy.

The scope of the present disclosure includes embodiments that incorporate, include, and/or utilize mechanisms, devices, apparati, systems, components, means, and/or methods designed to, intended to, capable of, and/or which prevent, illegal actions, activities, events, and/or losses including, but not limited to, those related to: theft of intellectual property and/or proprietary knowledge, and theft of trade secrets.

The scope of the present disclosure includes embodiments that incorporate, include, and/or utilize mechanisms, devices, apparati, systems, components, means, and/or methods designed to, intended to, capable of, and/or which prevent, illegal actions, activities, events, piracy, and/or losses through defensive actions, capabilities, responses, and/or behaviors, including, but not limited to: the automatic and/or remotely-triggered release of all hydrogen (or any other gas or liquid synthesized by a WEC device) in response to the detection of an attempted theft or other act of piracy, the automatic and/or remotely-triggered ignition of all hydrogen (or any other gas or liquid synthesized by a WEC device) in response to the detection of an attempted theft or other act of piracy, the automatic and/or remotely-triggered sinking or scuttling of a WEC device or hydrogen transport vessel in response to the detection of an attempted theft or other act of piracy, the automated recording of video, photos, images, sounds, radio transmissions, and other data capable of identifying a pirate and/or pirate vessel, and the deployment of drones (e.g., AUVs and/or UAVs) capable of recording video, photos, images, sounds, radio transmissions, and other data capable of identifying a pirate and/or pirate vessel.

The scope of the present disclosure includes embodiments of WEC devices, hydrogen transport vessels, and/or other vessels and/or objects, capable of utilizing a chemical fuel, including, but not limited to, the chemical fuel(s) generated and/or synthesized by the WEC devices, for the purpose of energizing alternate energy consumption mechanisms, including, but not limited to, those which consume a portion of the chemical fuel for the purpose of generating electrical power, generating thrust, generating and/or synthesizing useful chemicals, performing computational tasks (such as those downloaded from remote locations), and calculating Bitcoin blockchain blocks, blockchain blocks, and/or Bitcoin hash values, and/or nonce values.

Any Materials

The scope of the present disclosure includes embodiments constructed, fabricated, incorporating, and/or made of, any material. The scope of the present disclosure includes, but is not limited to, embodiments fabricated, at least in part, of steel, aluminum, another metal, concrete, another cementitious material, fibrous materials (e.g., bamboo, or cellulose), or plastic.

Utilization of Autonomous Vessels

An embodiment of the present disclosure is propelled by means of a flexibly connected autonomous surface vessel (ASV), e.g., an automated boat or tug. Embodiments of the present disclosure need not be propelled by means of modules, systems, mechanisms, and/or machines, incorporated within them, nor fixedly attached to them. Propulsion may be provided by any means, devices, vessels, and/or other external energy-consuming machines, regardless of the manner, method, and/or type of connection by which and/or through which their propulsive forces are transmitted to their respective embodiment(s).

Alternate Embodiments

This disclosure, as well as the discussion regarding same, is made in reference to wave energy converters on, at, or adjacent to, the surface of an ocean. However, the scope of this disclosure applies with equal force and equal benefit to wave energy converters and/or other devices on, at, or adjacent to, the surface of an inland sea, a lake, and/or any other body of water or fluid.

All potential variations in sizes, shapes, thicknesses, materials, orientations, and/or other embodiment-specific variations of the general inventive designs, structures, systems, and/or methods disclosed herein are included within the scope of the present disclosure, and will be obvious to those skilled in the art.

The scope of the present disclosure includes, but is not limited to, embodiments which communicate with other embodiments; communicate with planes; communicate with shore stations; communicate with satellites; and/or communicate with networks.

The scope of the present disclosure includes, but is not limited to, embodiments which communicate by means of radios, lasers, quantum-encoded channels, and/or other communication modalities.

The scope of the present disclosure includes, but is not limited to, embodiments which include, incorporate, and/or utilize a variety of navigational equipment, nodes, technologies (e.g., radars, sonars, LIDARS).

The scope of the present disclosure includes, but is not limited to, embodiments which include, incorporate, and/or utilize a variety of sensors (e.g., cameras, radars, sonars, LIDARS, echo locators, magnetic).

The scope of the present disclosure includes, but is not limited to, embodiments which include, incorporate, and/or utilize sensors that measure, characterize, and/or evaluate:
  winds, waves, currents, atmospheric pressures, relative humidities, and/or other environmental factors;
  potential hazards, e.g., ships, ice bergs, floating debris, oil slicks, water depths, subsurface topographies, shore lines, reefs, etc.;
  ecological objects of interest, e.g., whales, turtles, fish, birds, plankton, etc.; and/or,
  environmental and/or ecological degradations, e.g., pollutants, illegal fishing, illegal dumping, etc.

All derivative embodiments, combinations of embodiments, and variations thereof, are included within the scope of this disclosure.

An embodiment of the present disclosure incorporates, includes, comprises, and/or utilizes a WEC device in which a water turbine of the WEC device directly energizes a water electrolyzer (i.e., in the absence of an intermediary generation of electrical power by a generator) through its incorporation, inclusion, and/or utilization of a magnetostrictive material and/or metal) to produce hydrogen and oxygen gases.

An embodiment of the present disclosure incorporates, includes, comprises, and/or utilizes a WEC device which extracts energy from waves at the surface of a body of water and uses a portion of that extracted energy to produce a chemical fuel other than hydrogen gas, including, but not limited to: ammonia, nitrous oxide, methanol, ethanol, gasoline, diesel, oil, and, hydrazine.

An embodiment of the present disclosure incorporates, includes, comprises, and/or utilizes a WEC device that incorporates, includes, comprises, and/or utilizes, two hydrogen ports. Another embodiment of the present disclosure incorporates, includes, comprises, and/or utilizes a WEC device that incorporates, includes, comprises, and/or utilizes, three hydrogen ports. And another embodiment of the present disclosure incorporates, includes, comprises, and/or utilizes a WEC device that incorporates, includes, comprises, and/or utilizes, four hydrogen ports.

The scope of the present disclosure includes embodiments which incorporate, include, and/or utilize a WEC device that incorporates, includes, comprises, and/or utilizes any number, and any variety, of hydrogen ports. The scope of the present disclosure includes embodiments which incorporate, include, and/or utilize a WEC device that incorporates, includes, comprises, and/or utilizes any mechanism, device, apparatus, technology, technique, method, and/or means, to facilitate a transfer of a synthesized chemical fuel from the WEC device to another vessel, whether the other vessel operates, and/or is positioned, within the body of water on which the WEC device floats, at the surface of the body of water on which the WEC device floats, and/or within the atmosphere above the body of water on which the WEC device floats.

An embodiment of the present disclosure incorporates, includes, comprises, and/or utilizes a WEC device that incorporates, includes, comprises, and/or utilizes a hydrogen reservoir that is separate from the second water reservoir, e.g., the second water reservoir connected to the water electrolyzer and/or the chamber in which the water electrolyzer is positioned by a pipe, channel, tube, and/or hose, wherein a valve opened and closed by the controller of the WEC device is fluidly connected to the water electrolyzer and/or the chamber in which the water electrolyzer is positioned when the valve is opened, and not fluidly connected to the water electrolyzer and/or the chamber in which the water electrolyzer is positioned when the valve is closed.

An embodiment of the present disclosure incorporates, includes, comprises, and/or utilizes a WEC device that incorporates, includes, comprises, and/or utilizes a seawater and/or water distillation, purification, deionization, and/or freshwater-extraction mechanism, device, apparatus, system, component, means, and/or method, with which is replenishes, restores, augments, and/or keeps filled, the second water reservoir.

An embodiment of the present disclosure incorporates, includes, comprises, and/or utilizes a WEC device that incorporates, includes, comprises, and/or utilizes, a hydrogen port that incorporates, includes, comprises, and/or utilizes a hose, pipe, conduit, and/or channel separate from the hydrogen effluent pipe through which a hydrogen vessel, hose connection ROV, and hydrogen transfer hose can pump into the second water reservoir of the WEC device fresh, and/or solute-free, water for consumption, processing, and/or alteration, by the water electrolyzer of the WEC device.

An embodiment of the present disclosure incorporates, includes, comprises, and/or utilizes a WEC device that incorporates, includes, comprises, and/or utilizes, a hydrogen port that incorporates, includes, comprises, and/or utilizes a hydrogen effluent pipe through which a hydrogen vessel, hose connection ROV, and hydrogen transfer hose can pump into the second water reservoir of the WEC device fresh, and/or solute-free, water for consumption, processing, and/or alteration, by the water electrolyzer of the WEC device, before or after it has used that same hydrogen effluent pipe to remove hydrogen gas from the hydrogen reservoir of the WEC device.

An embodiment of the present disclosure incorporates, includes, comprises, and/or utilizes a WEC device that incorporates, includes, comprises, and/or utilizes, air pocket gas release valve fluidly connected to, an upper portion of the hollow buoy where the pocket of compressed air is positioned, located, trapped, entrained, and/or enclosed, and positioned, located, and/or embedded, at, and/or in, the wall enclosing, surrounding, and/or establishing, the upper portion of the hollow buoy.

An embodiment of the present disclosure incorporates, includes, comprises, and/or utilizes a WEC device in which an air pocket gas release valve is actuated passively in response to a first threshold air-pocket pressure, such that an elevation of the pressure of the gas within the air pocket of the WEC device to a pressure equal to, or greater than, the first threshold air-pocket pressure triggers, causes, and/or actuates, the valve causing the valve to open and release gas from the air pocket of the WEC device, until the pressure of the gas within the air pocket falls to or below a second threshold air-pocket pressure. An embodiment of the present disclosure incorporates, includes, comprises, and/or utilizes a WEC device in which the first threshold air-pocket pressure is equal to the second threshold air-pocket pressure. An embodiment of the present disclosure incorporates, includes, comprises, and/or utilizes a WEC device in which the first threshold air-pocket pressure is greater than the second threshold air-pocket pressure.

An embodiment of the present disclosure incorporates, includes, comprises, and/or utilizes a WEC device in which an air pocket gas release valve is actively actuated, and/or opened, e.g., by the controller of the WEC device, in response to a signal, e.g., received by the controller, from a pressure sensor indicating that the pressure of the gas within the air pocket of the WEC device is at a pressure equal to, or greater than, a first threshold air-pocket, thereby causing the valve to release gas from the air pocket of the WEC device, e.g., until the pressure sensor detects, e.g., and signals the controller, that the gas within the air pocket is at or below a second threshold air-pocket pressure. An embodiment of the present disclosure incorporates, includes, comprises, and/or utilizes a WEC device in which the first threshold air-pocket pressure is equal to the second threshold air-pocket pressure. An embodiment of the present disclosure incorporates, includes, comprises, and/or utilizes a WEC device in which the first threshold air-pocket pressure is greater than the second threshold air-pocket pressure.

An embodiment of the present disclosure incorporates, includes, comprises, and/or utilizes a WEC device in which both the oxygen and hydrogen gases generated, synthesized, and/or produced, by the water electrolyzer are collected, trapped, and/or stored within a common, shared, and/or same, gas reservoir (e.g., hydrogen reservoir). An embodiment of the present disclosure that incorporates, includes, comprises, and/or utilizes such a WEC device, filters, and thereby separates, the hydrogen gas from the oxygen gas at the time that the hydrogen gas is to be removed, extracted, and/or transferred from, the WEC device, e.g., ejecting the oxygen gas from the WEC device in the process. Another embodiment of the present disclosure that incorporates, includes, comprises, and/or utilizes such a WEC device, transfers, releases, and/or transmits, the combined gas (i.e., inclusive of both hydrogen and oxygen) to a respective hydrogen vessel, and the hydrogen vessel filters, and thereby separates, the hydrogen gas from the oxygen gas prior to its storage of the hydrogen gas within its pressurized hydrogen storage tanks.

An embodiment of the present disclosure incorporates, includes, comprises, and/or utilizes a hydrogen vessel that incorporates, includes, comprises, and/or utilizes at least one of propellers, sails, rigid sails, Flettner rotors, hydrogen-burning jets, and hydrofoils.

An embodiment of the present disclosure incorporates, includes, comprises, and/or utilizes a hose connection ROV whose propulsion system and/or mechanism is powered, energized, and/or enabled, through and/or by electrical power that it receives from its respective hydrogen vessel by means of one or more electrical conduits, conductors, wires, and/or cables, embedded, incorporated, and/or included, within, and/or attached to, the respective hydrogen transfer hose connecting the hose connection ROV to its respective hydrogen vessel.

An embodiment of the present disclosure incorporates, includes, comprises, and/or utilizes a hose connection ROV whose propulsion system and/or mechanism is powered, energized, and/or enabled, through and/or by electrical power generated by a fuel cell which receives hydrogen gas from its attached hydrogen transfer hose.

An embodiment of the present disclosure incorporates, includes, comprises, and/or utilizes a hose connection ROV whose propulsion system and/or mechanism is powered, energized, and/or enabled, through and/or by electrical power supplied by an energy storage device, such as by a battery or capacitor.

An embodiment of the present disclosure incorporates, includes, comprises, and/or utilizes a hydrogen vessel that is able to submerge itself below the surface of the body of water on which the respective WEC device floats, and/or which nominally operates while submerged.

An embodiment of the present disclosure incorporates, includes, comprises, and/or utilizes a hose connection ROV which incorporates, includes, comprises, and/or utilizes, permanent magnets which it uses to magnetically attach itself to the hull of a WEC device. A similar embodiment of the present disclosure which incorporates, includes, comprises, and/or utilizes a hose connection ROV which incorporates, includes, comprises, and/or utilizes, permanent magnets to facilitate its attachment to the hulls of WEC devices, also incorporates, includes, comprises, and/or utilizes, solenoid-driven detachment spars which, when actuated, extend and push the hose connection ROV to a sufficient separation distance from a nearby WEC device to permit the hose connection ROV to propel itself away from the WEC device, and/or to its respective hydrogen vessel, despite the magnetic force that might otherwise hold it to the WEC device hull and prevent it from disengaging.

An embodiment of the present disclosure incorporates, includes, comprises, and/or utilizes a hose connection ROV which holds itself against the hull of a WEC device using a suction and/or negative pressure created between the hose connection ROV and the hull by the thrusters of the hose connection ROV.

LISTING OF THE DRAWINGS

The present disclosure includes examples, figures, and descriptive texts, which are offered to illustrate a subset of the range of possible embodiments which fall within the scope of this disclosure. These examples, figures, and descriptive texts are not limiting to the scope of the present disclosure.

With respect to the following figure descriptions, references to "trapped water" refer to the inability, or statistical improbability, of water within a chamber to flow backward to, and/or into, the chamber from which it originated, and typically a chamber that is at a lower average height relative to the body of water from which the raised water originated, and/or relative to the first chamber from which the water began its incremental flow "uphill", and/or relative to the height of the water turbine through which the water will eventually flow.

For a fuller understanding of the nature and objects of the disclosure, reference should be made to the following detailed description, taken in connection with the accompanying drawings, in which.

DETAILED DESCRIPTION OF THE PREFERRED EMBODIMENTS

Figure 1:
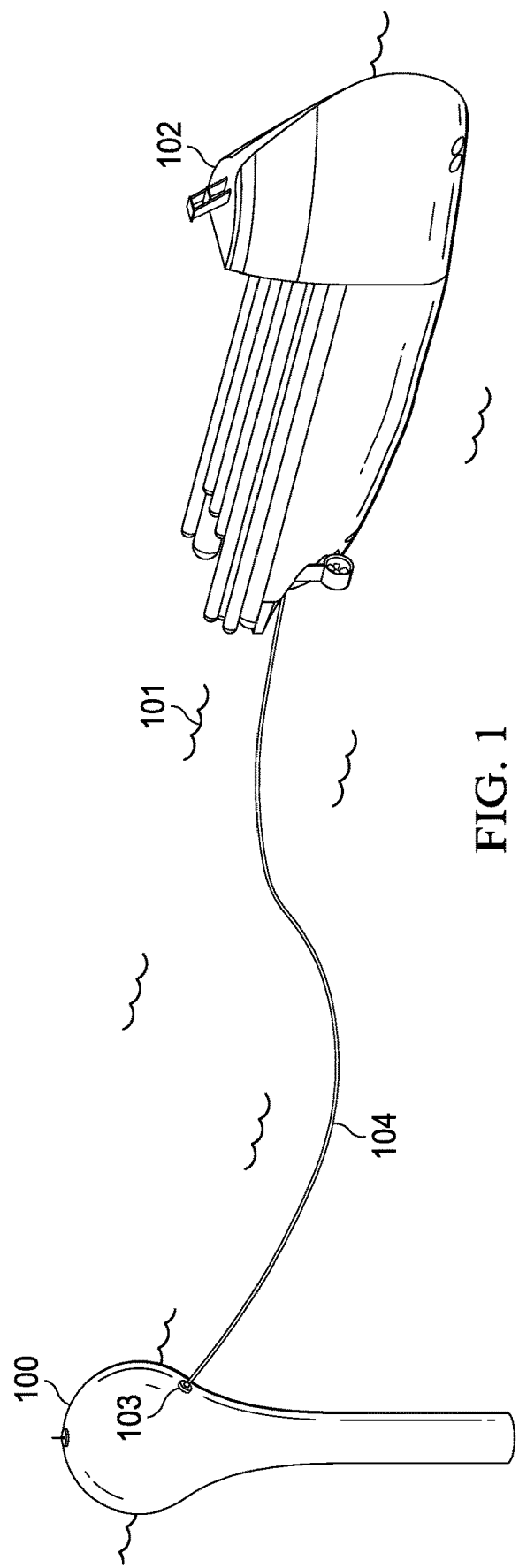
FIG. 1 shows a perspective side view of an embodiment of the present disclosure.

FIG. 1 shows a perspective side view of an embodiment of the present disclosure. A wave-energy conversion (WEC) device 100 obtains, extracts, harvests, receives, and/or collects, energy from waves moving across the surface 101 of a body of water on which the WEC device floats. A portion of the energy that the WEC device extracts from the passing waves is converted into electrical power by a water turbine (not visible) and generator (not visible). A portion of the generated electrical power energizes a water electrolysis apparatus (not visible) inside the WEC device resulting in the conversion of a portion of water contained in a reservoir within the WEC device (not visible) into hydrogen gas. A portion of the synthesized hydrogen gas is captured within a hydrogen reservoir (not visible) within the WEC device.

Periodically, a hydrogen vessel 102 approaches the WEC device 100 and positions itself near to the WEC device. When sufficiently proximate to the WEC device, the hydrogen vessel deploys a hose connection remotely-operated vehicle (hose connection ROV) 103 that is attached to a first end of a hydrogen transfer hose 104. The hose connection ROV pulls the hydrogen transfer hose to the WEC device. The hose connection ROV attaches itself translatably to the hull of the WEC device and moves itself across the WEC-device hull until it is positioned above and/or over a hydrogen port (not visible) of the WEC device. The hose connection ROV then connects itself, and the attached hydrogen transfer hose, to the hydrogen port of the WEC device thereby permitting hydrogen gas to be removed, and/or to flow, from the WEC device to the hydrogen vessel where it is then stored within one of more of the pressurized hydrogen storage tanks of and/or on the hydrogen vessel. In the event that the pressure of hydrogen stored within the WEC device is higher than that inside the fluidly connected hydrogen storage tank of the hydrogen vessel, said transfer of hydrogen from the WEC device to that hydrogen vessel will happen passively, without the need for active pumping at the time of transfer.

Figure 2:
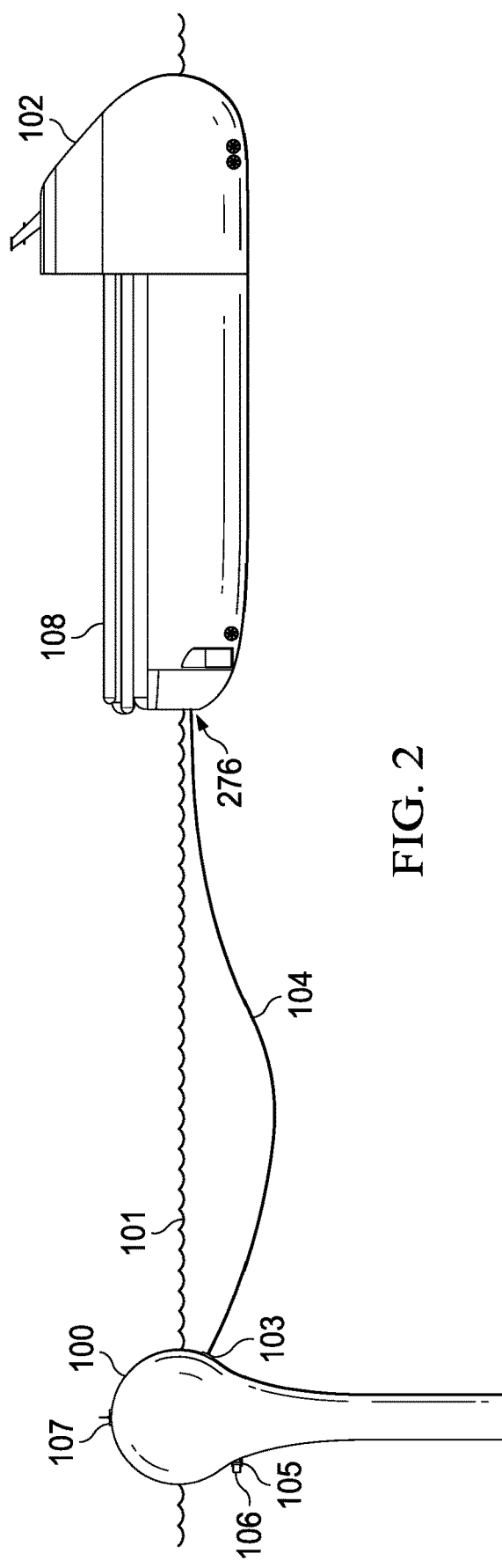
FIG. 2 shows a side view of the same embodiment of the present disclosure that is illustrated in FIG. 1.

FIG. 2 shows a side view of the same embodiment of the present disclosure that is illustrated in FIG. 1. The WEC device 100 has an effluent aperture, port, pipe, and/or channel 105 through which pressurized water within a first water reservoir (not visible) inside the WEC device flows out of the WEC device after having first flowed through a water turbine (not visible). The outflowing water-turbine effluent produces a thrust that tends to push the WEC device in an opposite direction, e.g., toward the hydrogen vessel in the illustration of FIG. 2. A rudder 106 is moveably connected to the WEC device. The angular orientation of the rudder, with respect to vertical axis of rotation (and/or hinge) of the rudder, is controlled by a WEC-device controller 107 attached to an uppermost portion of the WEC device's hull. Through adjustments to the orientation of the rudder, the controller is able to steer the WEC device to follow a course toward a new location at the surface of the body of water 101 on which the WEC device floats wherein the new location is at a different geospatial destination than a current location of the WEC device.

When the hydrogen vessel 102 is suitably positioned adjacent to the WEC device 100, it deploys the hose connection ROV 103 which uses thrusters (not visible) to approach and make contact with the hull of the WEC device. As the hose connection ROV travels toward the WEC device, a hydrogen transfer hose 104 fluidly connected to the hose connection ROV is pulled along and is released (e.g. unspooled) from a back and/or stern end 107 of the hydrogen vessel (e.g. from a hose drum rotatably attached thereto).

Hydrogen gas removed from the WEC device and transmitted to the hydrogen vessel through the hose connection ROV 103 and the hydrogen transfer hose 104 is stored within a plurality of pressurized hydrogen storage tanks, e.g., 108, attached to and/or incorporated within the hydrogen vessel 102. In the embodiment shown, said hydrogen storage tanks are long cylindrical pressure vessels stacked and mutually rigidly interconnected.

Intermittently, and/or continuously during they hydrogen vessel 102's transit, hydrogen in certain lower-pressure pressurized hydrogen storage tanks of hydrogen vessel 102 can be pumped to higher-pressure hydrogen storage tanks of hydrogen vessel 102, so that hydrogen can be accumulated in said higher-pressure hydrogen storage tanks even while certain lower-pressure hydrogen storage tanks are kept at a lower pressure to facilitate passive transfer of hydrogen from WEC devices to the hydrogen vessel when a hose connection ROV attachment is made.

Figure 3:
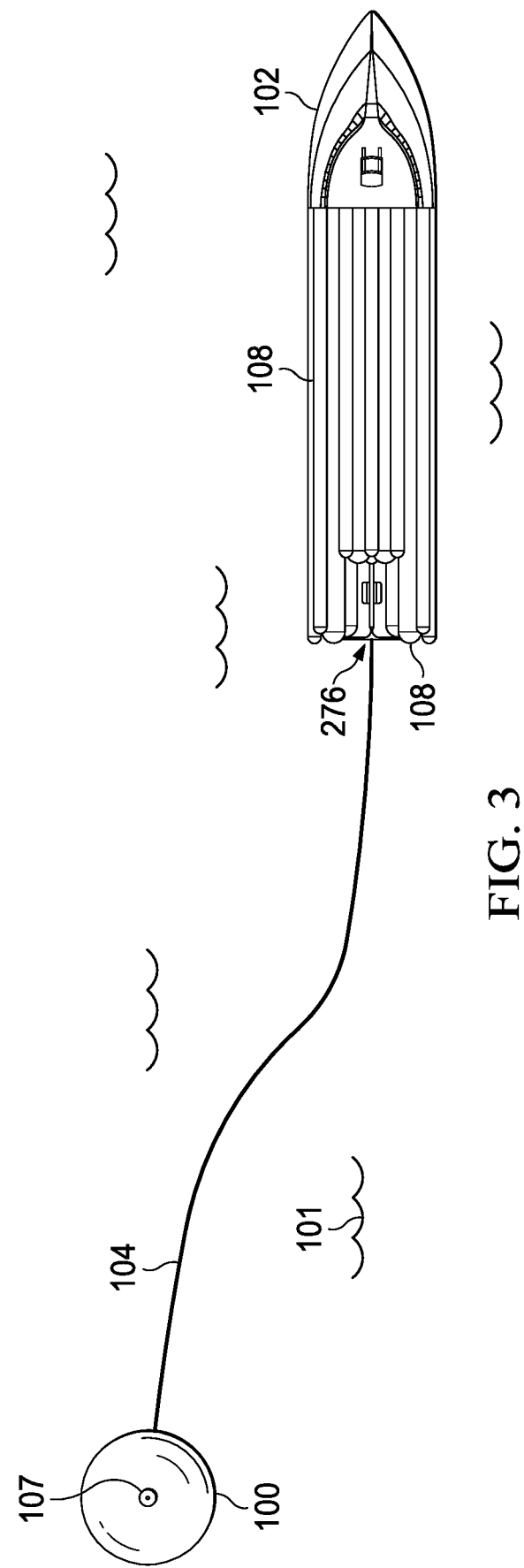
FIG. 3 shows a top-down view of the same embodiment of the present disclosure that is illustrated in FIGS. 1 and 2.

FIG. 3 shows a top-down view of the same embodiment of the present disclosure that is illustrated in FIGS. 1 and 2.

Figure 4:
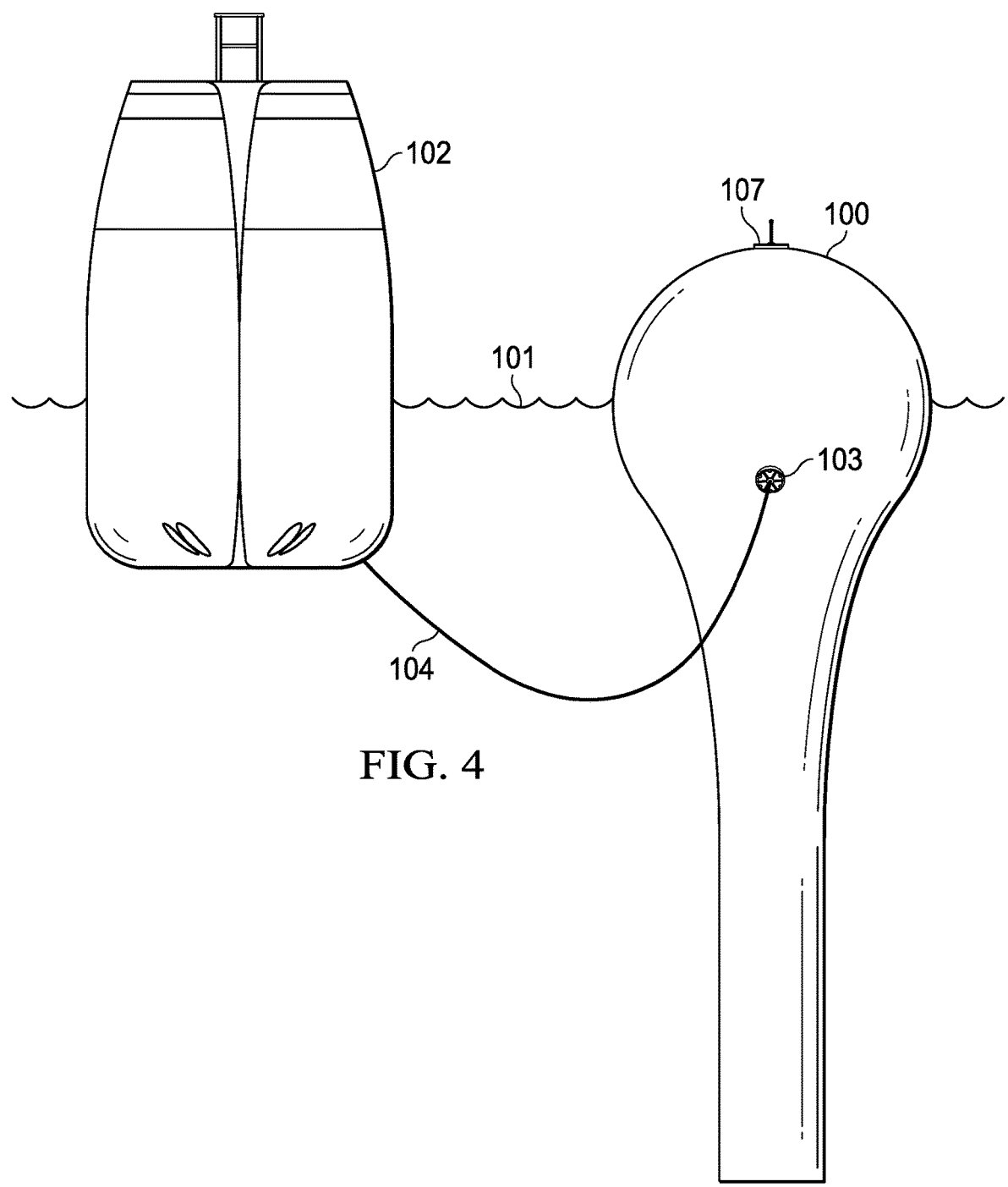
FIG. 4 shows a side view of the same embodiment of the present disclosure that is illustrated in FIGS. 1-3.

FIG. 4 shows a side view of the same embodiment of the present disclosure that is illustrated in FIGS. 1-3.

Figure 5:
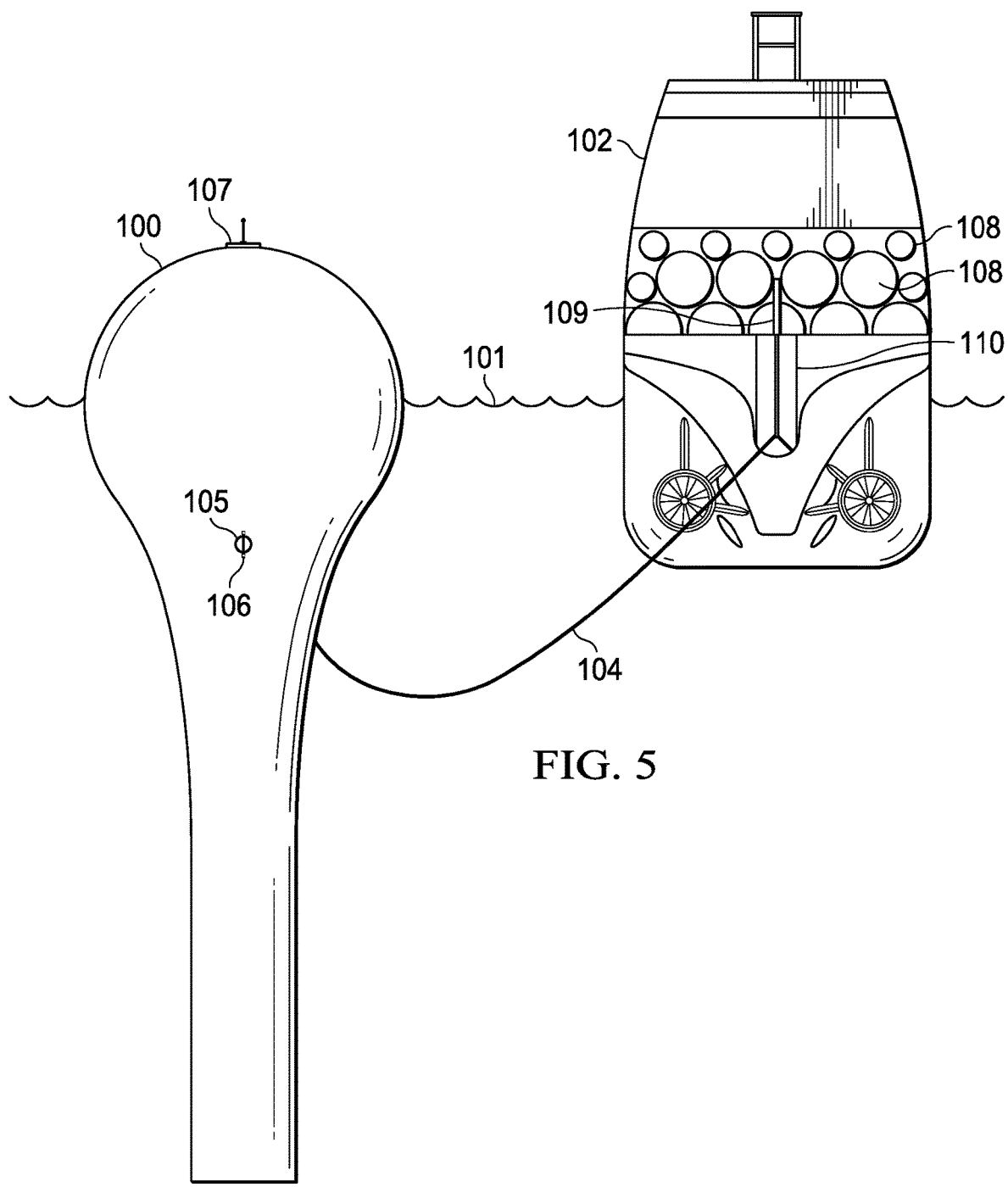
FIG. 5 shows a side view of the same embodiment of the present disclosure that is illustrated in FIGS. 1-4.

FIG. 5 shows a side view of the same embodiment of the present disclosure that is illustrated in FIGS. 1-4.

Figure 6:
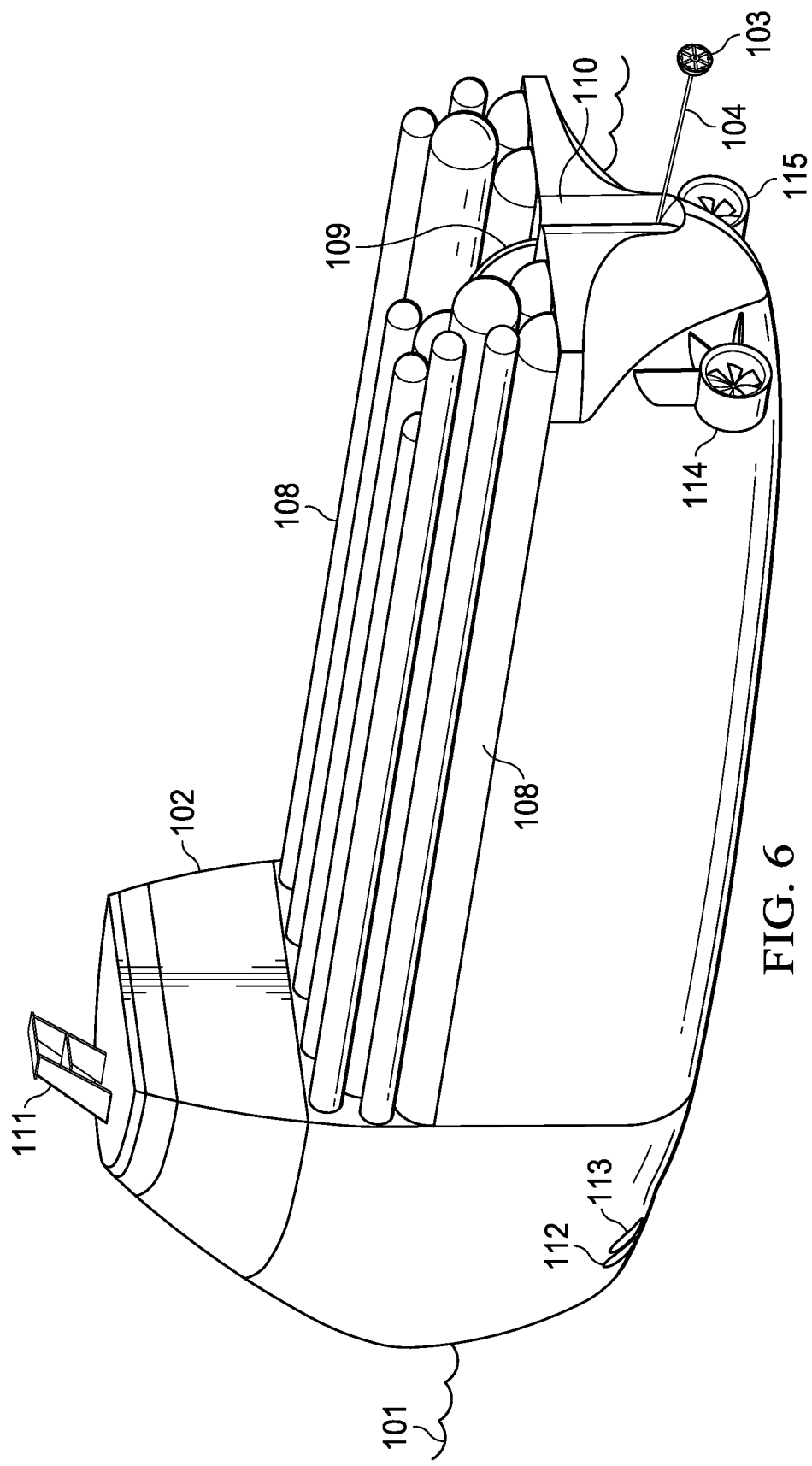
FIG. 6 shows a perspective side view of a hydrogen vessel of an embodiment of the present disclosure, identical to the hydrogen vessel that is illustrated in FIGS. 1-5.

FIG. 6 shows a perspective side view of a hydrogen vessel of an embodiment of the present disclosure, identical to the hydrogen vessel that is illustrated in FIGS. 1-5. The hydrogen transfer hose 104 is wound around a hydrogen transfer hose drum 109, and its release and its retraction are guided, and the possibility of damage to the hydrogen transfer hose is reduced, by a beveled vertical slit aperture 110 at a back, stern, and/or rearward end of the hydrogen vessel 102. The hydrogen transfer hose 104 is wound around a hydrogen transfer hose drum 109, and the deployment and retrieval of the hydrogen transfer hose wound about the hydrogen transfer hose drum is facilitated by a beveled vertical slit aperture 110 at a back, stern, and/or rearward end of the hydrogen vessel 102. The deployment of the hydrogen transfer hose is facilitated by the hose connection ROV 103 attached to a distal end of the hydrogen transfer hose. The retrieval of the hydrogen transfer hose is facilitated by motorized rotation of the hydrogen transfer hose drum which results in an active rewinding of the hydrogen transfer hose about the hydrogen transfer hose drum.

The hydrogen vessel 102 is autonomous and through a communications tower and antenna 111 it receives operational commands, requests for status updates, as well as other data, from a remote operational control station, from other hydrogen vessels, and/or from WEC devices; and it transmits operational status updates, requests for geospatial locations, as well as other data, to a remote operational control station, to other hydrogen vessels, and/or to WEC devices. The communications tower and antenna may send and receive data directly with other embodiment vessels. It may also send and receive data indirectly with other embodiment vessels, third-party vessels, terrestrial operational control stations, etc., via encoded electromagnetic signals transmitted to and from satellites.

The hydrogen vessel 102 can change its geospatial location at the surface of the body of water 101 on which it floats by means of through-hull thrusters 112 and 113, as well as forward thrusters 114 and 115.

The hydrogen vessel 102 in another embodiment is controlled and manned by human personnel and crew.

Figure 7:
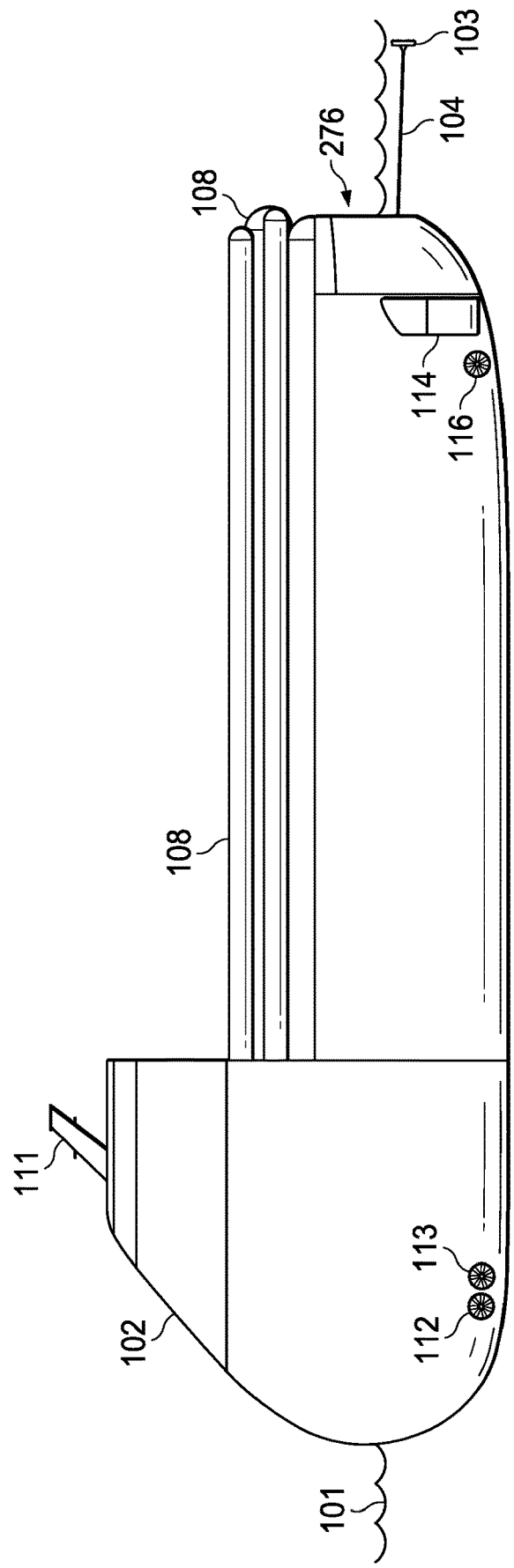
FIG. 7 shows a side view of a hydrogen vessel of an embodiment of the present disclosure, identical to the hydrogen vessel that is illustrated in FIG. 6.

FIG. 7 shows a side view of a hydrogen vessel of an embodiment of the present disclosure, identical to the hydrogen vessel that is illustrated in FIG. 6. The perspective of the illustration in FIG. 7 facilitates the observation of the through-hull thrusters 112 and 113. In the illustration of FIG. 7 it is possible to see the turbines/propellers positioned within the associated through-hull channels. Thrusters 112 and 113 allow the hydrogen vessel to move laterally (i.e. toward port or starboard, depending upon the direction at which the thruster propellers are rotated). Thrusters 112 and 113 also allow the hydrogen vessel to turn to port or starboard when the hydrogen vessel is being propelled forward by its forward thrusters, e.g. 114.

Forward thrusters, e.g., 114, may also be operated in a reverse direction, i.e., with the respective propellers rotated in a reverse direction, so as to make the hydrogen vessel move backward.

The hydrogen vessel 102 also has a through-hull thruster 116 at its stern which also facilitates the hydrogen vessel's ability to execute lateral movements, as well as its ability to turn to port or starboard when cruising in a forward or backward direction.

The configuration of the hose connection ROV 103, and its attached hydrogen transfer hose 104, which are illustrated in FIG. 7 show the position, geometry, and/or configuration of the hose connection ROV and its attached hydrogen transfer hose shortly after their deployment. FIG. 7 also shows the position, geometry, and/or configuration of the hose connection ROV and its attached hydrogen transfer hose shortly before the completion of their retrieval.

Figure 8:
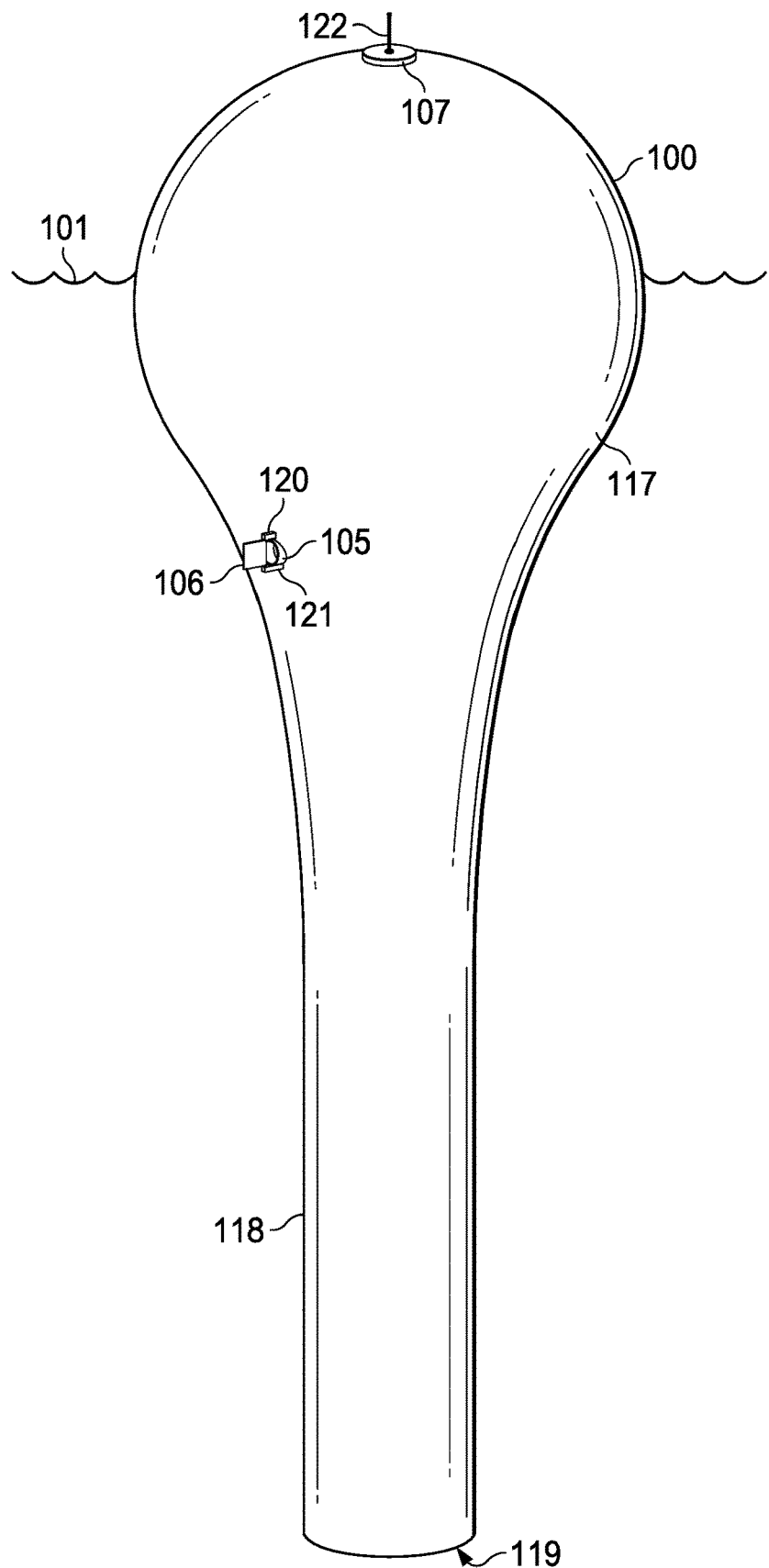
FIG. 8 shows a perspective side view of a wave-energy conversion device (WEC device) of an embodiment of the present disclosure, identical to the WEC device that is illustrated in FIGS. 1-5.

FIG. 8 shows a perspective side view of a wave-energy conversion device (WEC device) of an embodiment of the present disclosure, identical to the WEC device that is illustrated in FIGS. 1-5.

The WEC device is comprised of an upper hollow buoy 117 and a lower water tube 118. When floating adjacent to an upper surface 101 of a body of water, the water tube of the WEC device has positioned at its lowermost end a lower mouth, opening, and/or aperture 119 through which water may pass and/or flow between the body of water on which the WEC device floats and the interior of the water tube.

Water ejected from an upper mouth (not visible) positioned within the interior of the hollow buoy 117 is accumulated within a first water reservoir (not visible) within the hollow buoy. The water within the first reservoir, as well as a pocket of air (not visible) trapped within the hollow buoy above the first reservoir, is pressurized to a pressure which nominally exceeds that of the atmosphere outside and above the WEC device. Pressurized water within the first water reservoir flows out of the WEC device through an effluent aperture 105, flowing through a water turbine (not visible) as it does so. A rudder 106 interacts with the effluent water flowing out of the WEC device so as to impose a turning torque upon the WEC device when the rudder's broad surfaces are not aligned parallel to the effluent outflow.

The rudder rotates about a vertical axis and/or hinge positioned between, and rotatably-connected and secured to the WEC device by upper 120 and lower 121 rudder struts. A rudder screw rod (not visible) within the upper rudder strut is driven and/or actuated by a stepper motor, which is controlled by the WEC device controller 107 and allows the controller to adjust the relative angular orientation of the rudder with respect to the longitudinal and/or flow axis of the effluent outflow, and to thereby steer the WEC device. As the effluent outflow provides forward thrust to the WEC device, the controller's adjustments, alterations, changes, and/or modifications, of the upper and lower rudder screw rods allow the controller to steer the WEC device to a desirable, specified, and/or target, geospatial location at the surface 101 of the body of water on which the WEC device floats.

Affixed to an upper portion of the controller 107 is an antenna 122 through which the controller may exchange encoded electromagnetic signals with receivers on other vessels and/or on shore. Embedded within the controller is a phased array antenna through which the controller may exchange encoded electromagnetic signals with receivers on other vessels, on land, and on satellites.

Figure 9:
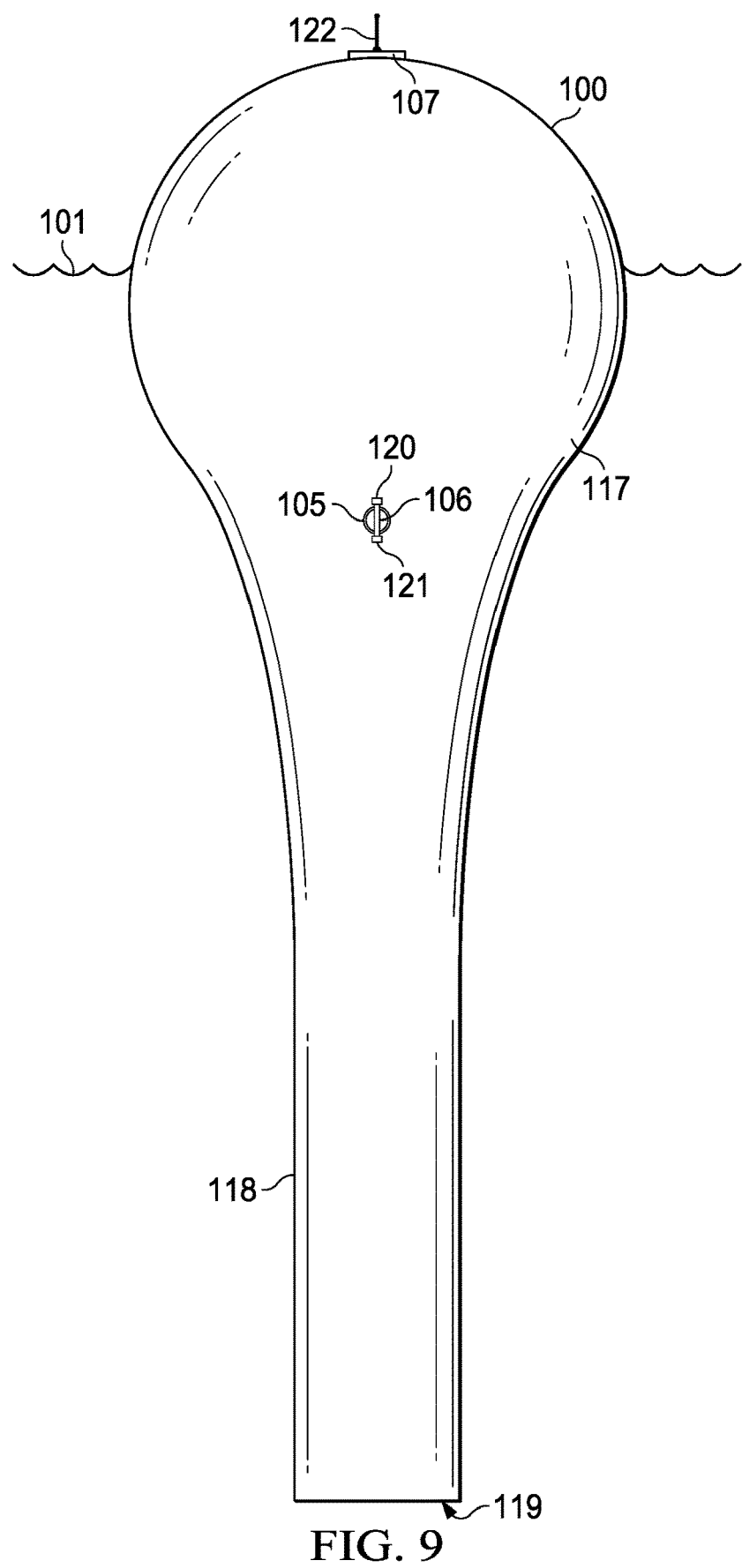
FIG. 9 shows a side view of a WEC device of an embodiment of the present disclosure, identical to the WEC device that is illustrated in FIG. 8.

FIG. 9 shows a side view of a WEC device of an embodiment of the present disclosure, identical to the WEC device that is illustrated in FIG. 8.

Figure 10:
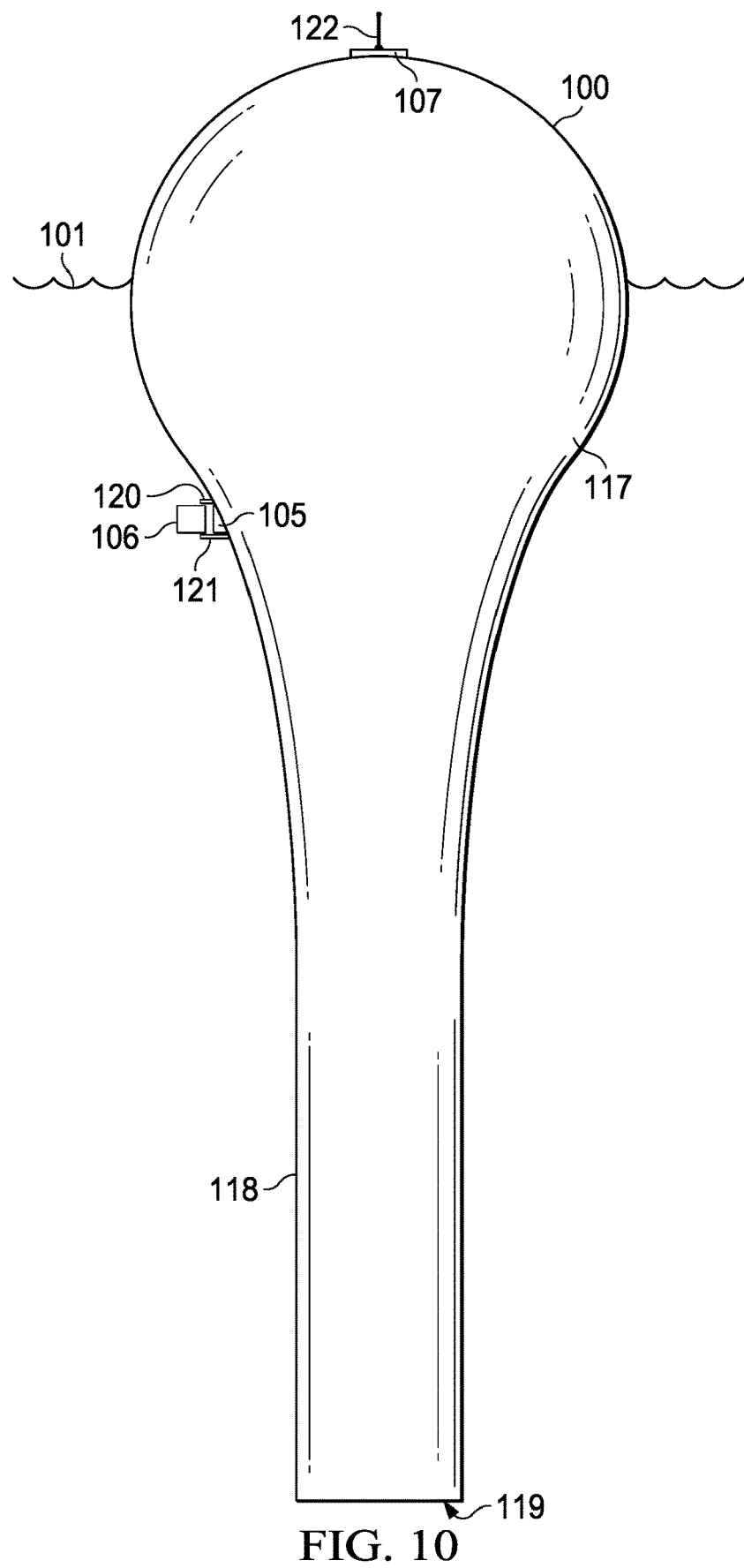
FIG. 10 shows a side view of a WEC device of an embodiment of the present disclosure, identical to the WEC device that is illustrated in FIGS. 8 and 9.

FIG. 10 shows a side view of a WEC device of an embodiment of the present disclosure, identical to the WEC device that is illustrated in FIGS. 8 and 9.

Figure 11:
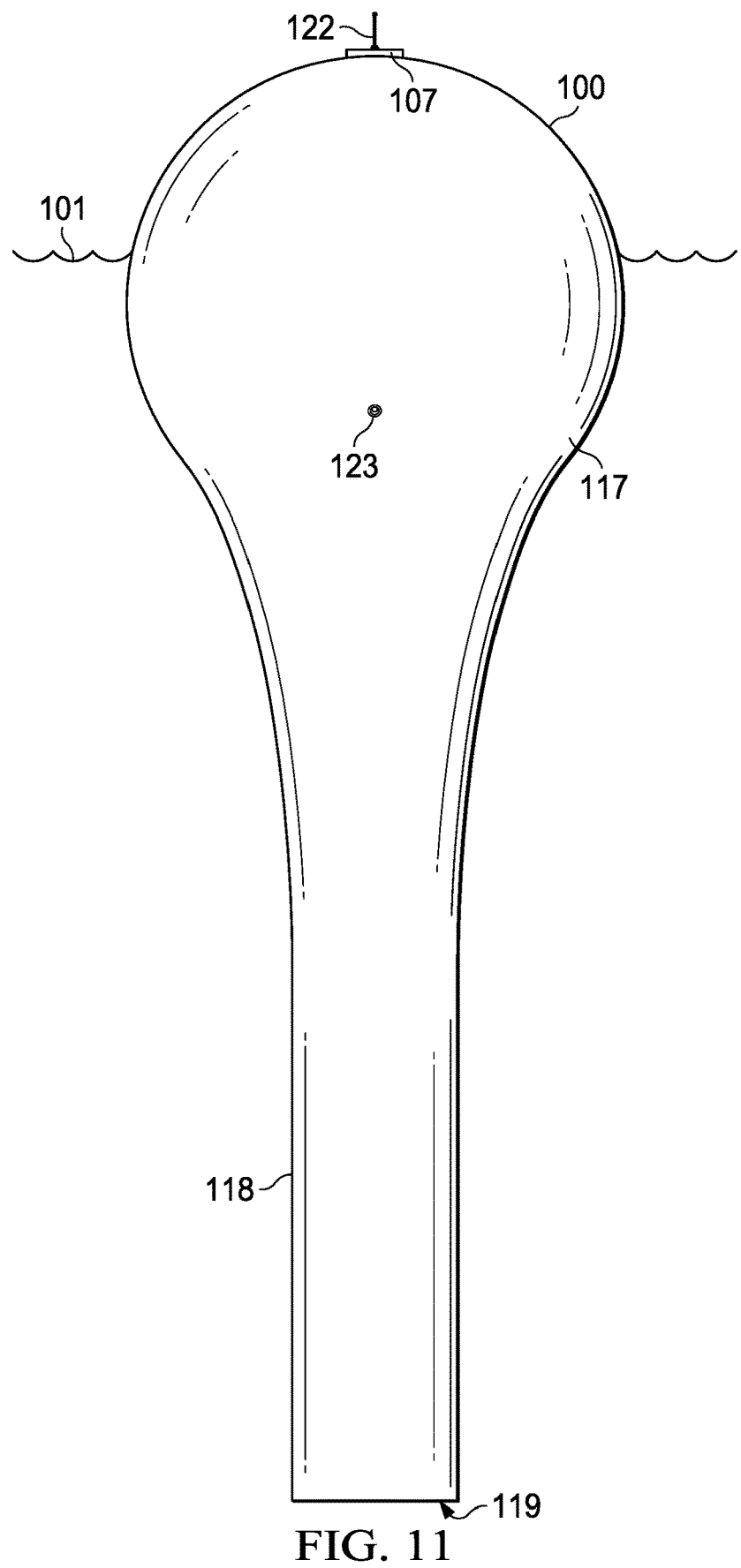
FIG. 11 shows a side view of a WEC device of an embodiment of the present disclosure, identical to the WEC device that is illustrated in FIGS. 8-10.

FIG. 11 shows a side view of a WEC device of an embodiment of the present disclosure, identical to the WEC device that is illustrated in FIGS. 8-10. Embedded within the hull of the WEC device, at a position below a mean waterline (at the junction of the surface 101 of the body of water on which the WEC device floats with the hull of the WEC device), is a hydrogen port 123 to which a hose connection ROV may connect in order to fluidly connect a hydrogen vessel with the hydrogen reservoir of the WEC device.

Figure 12:
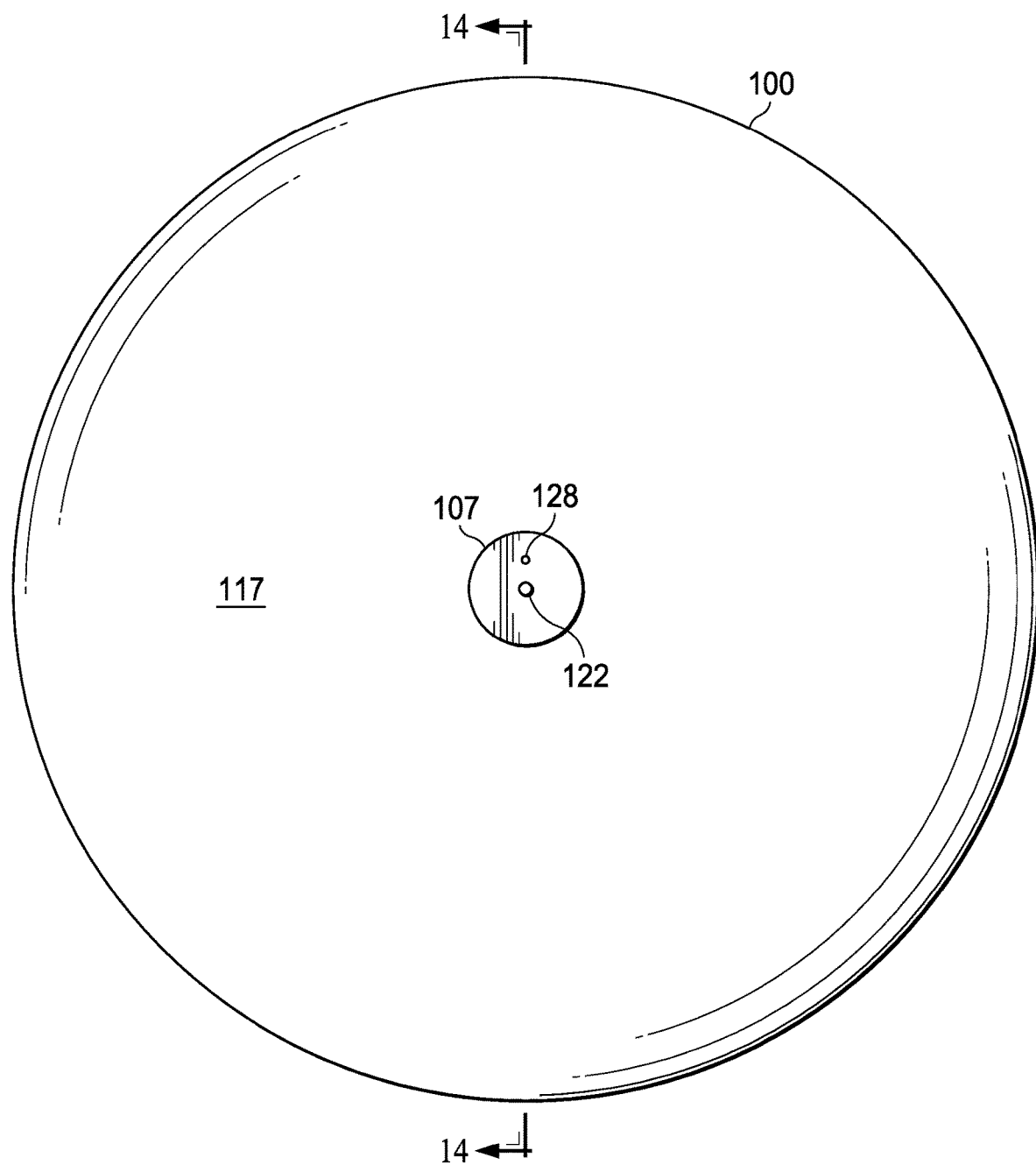
FIG. 12 shows a top-down view of a WEC device of an embodiment of the present disclosure, identical to the WEC device that is illustrated in FIGS. 8-11.

FIG. 12 shows a top-down view of a WEC device of an embodiment of the present disclosure, identical to the WEC device that is illustrated in FIGS. 8-11.

Figure 13:
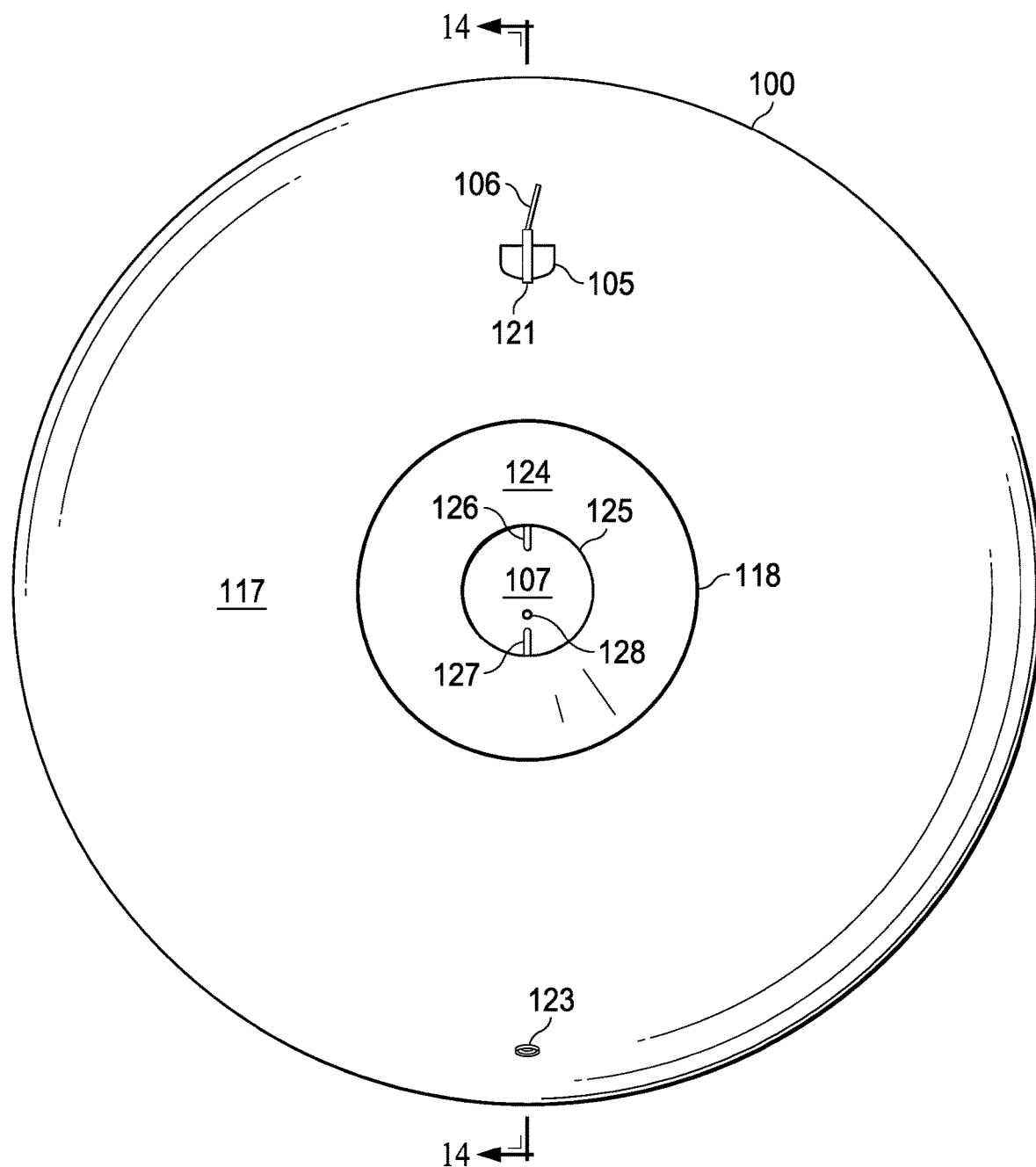
FIG. 13 shows a bottom-up view of a WEC device of an embodiment of the present disclosure, identical to the WEC device that is illustrated in FIGS. 8-12.

FIG. 13 shows a bottom-up view of a WEC device of an embodiment of the present disclosure, identical to the WEC device that is illustrated in FIGS. 8-12. Through the lower aperture and/or mouth at the bottom of water tube 118 can be seen the interior of the portion of the water tube, which is constricted 124, and/or the portion of the water tube over which the constriction is manifested. At the top of the water tube 118 can be seen the upper aperture and/or mouth 125 of the water tube through which water is periodically ejected and thereafter accumulated within the first water reservoir (not visible) of the hollow buoy 117.

Through the upper mouth 125 of the water tube 118 can be seen the lowermost side of the controller 107. The controller is connected to generator (not visible) and to the water electrolyzer (not visible) through electrical power cable 126. The controller is connected to an actuated hydrogen-release valve (not visible) through valve actuation cable 127.

Figure 14:
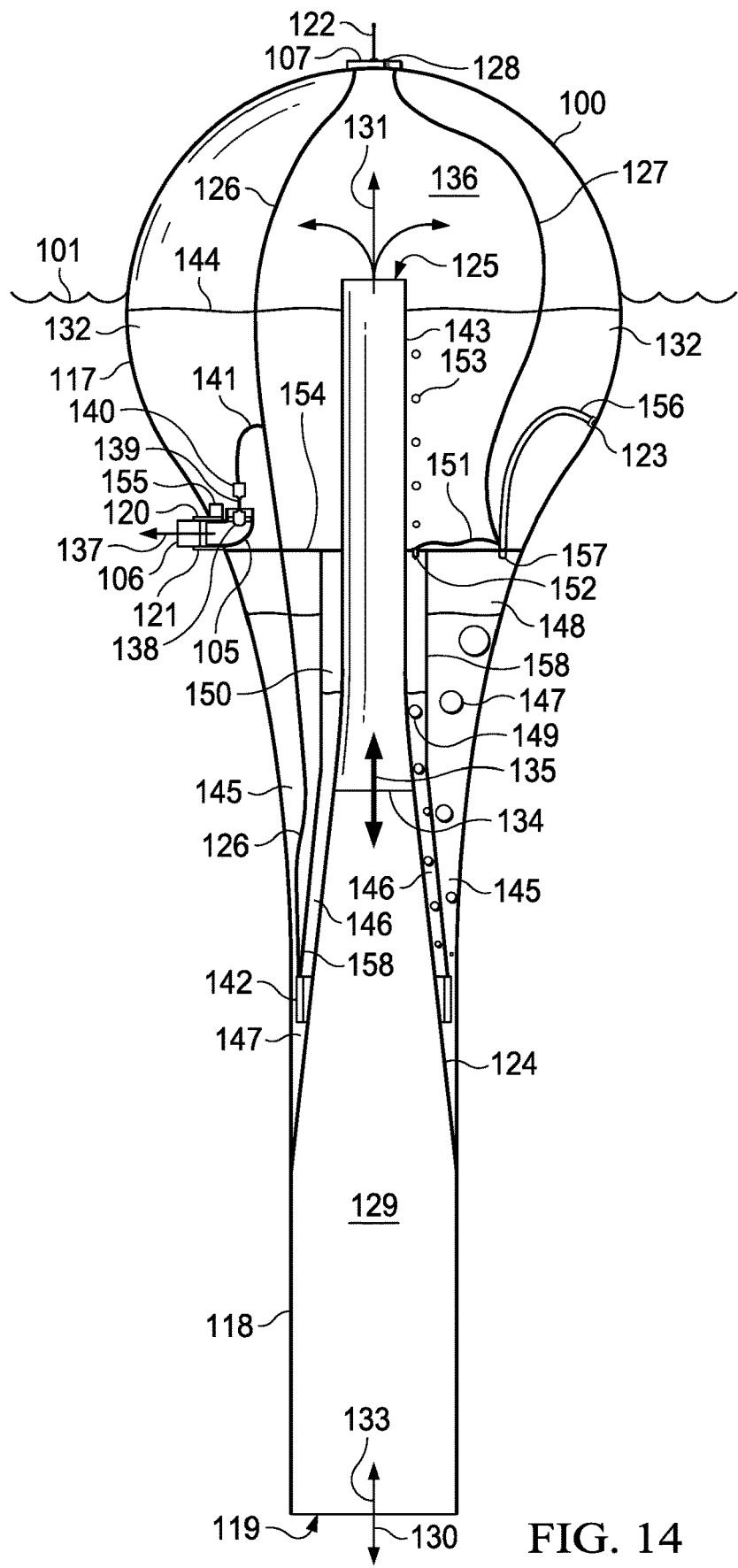
FIG. 14 shows a side sectional view of a WEC device of an embodiment of the present disclosure, identical to the WEC device that is illustrated in FIGS. 8-13 wherein the vertical section plane is specified in FIGS. 12 and 13 and the section is taken across line 14-14.

FIG. 14 shows a side sectional view of a WEC device of an embodiment of the present disclosure, identical to the WEC device that is illustrated in FIGS. 8-13 wherein the vertical section plane is specified in FIGS. 12 and 13 and the section is taken across line 14-14.

As the WEC device 100 is moved up and down in response to the passage of waves across the surface 101 of the body of water on which the WEC device floats, the water 129 entrained and/or confined to the interior of the water tube 118 moves up and down, so too the upper surface 134 of the water 129 within the water tube moves 135 up and down.

As the water within the interior of the water tube moves down relative to the water tube (i.e., as the water moves toward the lower mouth and/or aperture 119 of the water tube), a portion of that downward-moving water 129 flows 130 out of the water tube and enters the body of water 101 outside the WEC device. As the water 129 within the interior of the water tube moves up relative to the water tube, additional water flows 133 from the body of water 101 outside the WEC device into the water tube through the lower mouth 119 of the water tube.

As the water 129 within the interior of the water tube moves up relative to the water tube (i.e., as the water moves toward the upper mouth and/or aperture 125 of the water tube), the upper surface 134 of the water 129 within the water tube moves upward with enough speed, momentum, and/or power, that a portion of that upward-moving water flows out of, and/or is ejected 131 from, the upper mouth of the water tube and as a result falls onto an upper surface 144 of, and thereby enters and becomes trapped within, the first water reservoir 132. A pocket of air 136 trapped within the hollow buoy 117 and positioned above and adjacent to the first water reservoir is pressurized to a pressure that nominally exceeds the pressure of the atmosphere outside the WEC device (e.g., a pressure that exceeds one atmosphere of pressure).

As the water tube (and the WEC device of which it is a part) move down, e.g., when the WEC device falls from the crest of a wave toward an approaching trough, the constricted and/or narrowed portion 124 of the water tube 118 pushes down against the water 129 within the water tube, tending to impart to that water a downward force and momentum which carries the water downward within the water tube. When the WEC device then begins accelerating upward toward an approaching wave crest, the WEC device and its water tube move up and away from the downward moving water 129 causing the upper surface 134 of that water to move away from the upper mouth 125 of the water tube. As the water within the water tube moves down within the water tube its downward motion is resisted, opposed, and eventually reversed by the pressure of the water outside the lower mouth 119 of the water tube. Soon, the water within the water tube reverses its motion and begins accelerating upward. At about this same time, the WEC device will sometimes tend to be moving over a wave crest and beginning its fall toward an approaching wave trough. When the downwardly moving WEC device, and its constricted water tube 124, encounter the upwardly moving water 129 within the water tube, the resulting "collision" or impingement of the upwardly moving water against the downwardly moving constriction 124 of the water tube creates a local increase in the pressure of that water proximate to the constriction, and/or otherwise causes the water proximate to the constriction to be accelerated upwardly.

In response to the collision-induced pressurization of the water within the constricted portion of the water tube 118, and/or for other reasons, the pressurized water periodically moves up the relatively narrow upper portion 143 of the water tube with enough speed, momentum, and/or energy to result in the ejection 131 of a portion of that water into the pressurized interior of the hollow buoy 117 trapping a portion of that ejected water within the first water reservoir.

Over time, as the WEC device moves up and down amid passing waves, there tends to be a net upward flow of water through the water tube and into the pressurized first water reservoir 132.

Balancing the periodic addition of water to the first water reservoir, a regular, steady, smooth, and/or approximately constant, stream of pressurized water flows 137 out of the first water reservoir 132 and out of the WEC device 100 through an effluent pipe 105, channel, and/or aperture. As the water from the first water reservoir flows out of the effluent pipe, it flows through a water turbine 138 thereby causing the water turbine to rotate (e.g. about its shaft 139). The water turbine is operatively connected to a generator 140 by the shared and/or common shaft 139, and, as a result, rotations of the water turbine in response to the outflow of water from the first water reservoir cause the generator to produce electrical power.

A portion of the electrical power produced by the generator is transmitted through cable 141 to cable 126 and is therethrough transmitted to both a water electrolyzer 142 and to the WEC device controller 107. Appropriate power electronics must of course be provided to buck down the voltage supplied by the generator to an appropriate range of voltages for the electrolyzer (depending on, among other things, how many electrolyzer cells are electrically serialized).

In response to the electrical power provided by the generator 140, the water electrolyzer 142 splits water molecules into hydrogen and oxygen. A pair of concentric annular chambers: a hydrogen reservoir 145 (cathode side) and an oxygen reservoir 146 (anode side), are incident at a lower shared portion 147 of those chambers. The lowermost portion of each chamber contains and/or encloses water (deionized or solute-free water in a preferred embodiment), and in a preferred embodiment, membranes (e.g. proton exchange membranes) separate the lowermost portion of one chamber from the lowermost portion of the other, allowing protons to pass from the anode side to the cathode side, and also allowing water to diffuse from one side to the other (e.g. from the cathode side to the anode side under the influence of differential pressure, and/or from the anode side to the cathode side under the influence of differential pressure and/or proton drag during periods of applied voltage). Catalyst layers can be, and in a preferred embodiment are, provided on either side of the membrane to facilitate the relevant water-splitting reactions in accordance with normal PEM electrolysis practice. The water electrolyzer 142 can be composed of one or more electrical cells. In the case where the electrolyzer is composed of multiple cells, these cells can be electrically configured in series to form an (electrical, if not physical) stack. Alternately, cells can be configured in parallel to increase redundancy. Upon the application of a sufficiently high voltage across the at least one electrolyzer cell (e.g. from the generator 140 via appropriate power electronics, and/or from at least one battery configured to maintain at least a minimal voltage across the at least one electrolyzer cell even during periods when the generator 140 is not producing a voltage), current flows and gases are generated at the anode and cathode and tend to bubble to the uppermost portion of each chamber, and those gases tend to remain separated by virtue of the impermeable wall(s) (e.g. 158) separating the concentric annular chambers.

The upper wall of the hydrogen and oxygen reservoirs is a plate 154, and/or planar structural member, which spans the interior of the WEC device from the outer hull 117 to the upper portion 143 of the water tube. A nominally vertical tubular wall 158 separates the hydrogen and oxygen reservoirs.

The water electrolyzer 142 is configured such that molecules of hydrogen gas are emitted, created, synthesized, and/or generated, into the outermost annular chamber 145, thereafter tending to rise as bubbles, e.g., 147, to the uppermost portion 148 of that chamber therein augmenting the volume and/or pressure of hydrogen gas within the hydrogen reservoir.

The water electrolyzer 142 is configured such that molecules of oxygen gas are emitted, created, synthesized, and/or generated, into the innermost annular chamber 146, thereafter tending to rise as bubbles, e.g., 149, to the uppermost portion 150 of that chamber therein augmenting the volume and/or pressure of oxygen gas within the oxygen reservoir.

Periodically, when the volume of oxygen gas within the uppermost portion 150 of the oxygen reservoir 146 is sufficiently great, and/or becomes greater than a threshold volume, (e.g., as detected by a sensor, not shown, incorporating a float, an acoustic sensor, a pressure sensor, etc.) the WEC device controller 107, via cables 127 and 151, actuates and/or opens a valve 152 which releases a portion of the oxygen gas trapped within the uppermost portion 150 of the oxygen reservoir 146. The controller closes the valve 152 after a portion of the oxygen gas within the oxygen reservoir has been released. The released oxygen gas tends to rise as bubbles, e.g., 153, until it enters the air pocket 136 above the first water reservoir, thereby increasing the volume, mass, and/or pressure of the gas within the air pocket.

In a different embodiment, a passive regulator valve (which can replace and be located at the position of valve 152) releases oxygen from uppermost portion 150 to air pocket 136 when the pressure of oxygen in uppermost portion 150 is equal to or exceeds the pressure of hydrogen in uppermost portion 148, thereby maintaining an approximately balanced pressure across membranes (e.g. PEMs) of the water electrolyzer 142.

When the pressure of the gas within the air pocket 136 exceeds a threshold value, and/or when the WEC device controller determines that a decrease in the pressure of the air pocket will be advantageous with respect to the capture of energy from ambient waves, then the controller actuates and/or opens a valve 128 through which pressurized gas may escape the air pocket and enter the atmosphere outside the WEC device. When the controller determines (e.g., via a sensor that is not shown) that the pressure of the gas within the air pocket is at or below a desirable and/or advantageous pressure then the controller closes the valve 128.

Via cables 126 and 141, the WEC device controller 107 actuates motorized control 155 (e.g., a stepper motor) which alters, adjusts, configures, controls, and/or rotates, a rudder screw rod (not visible) within upper rudder strut 120, thereby permitting the controller to adjust the relative angular orientation of the rudder 106 with respect to the longitudinal and/or flow axis of the effluent water flowing 137 from the effluent pipe 105. When altered to an angular orientation that causes the rudder to obstruct the effluent flow differently with respect to its port and starboard sides, the rudder creates and applies to the WEC device a torque sufficient to turn the WEC device thus enabling the controller to steer the WEC device along a course toward a target location on the surface 101 of the body of water on which the WEC device floats and moves.

When a hydrogen vessel (102 in FIG. 4) is proximate to the WEC device and deploys its hose connection ROV (103 in FIG. 4), and attached hydrogen transfer hose (104 in FIG. 4), the hose connection ROV connects to the hydrogen port 123 of the WEC device thereby fluidly connecting the hydrogen transfer hose to the hydrogen effluent pipe 156. When the hydrogen vessel transmits a signal through its antenna (111 in FIG. 6) to the antenna 122 of the WEC device indicating that it is ready to receive hydrogen gas, then the WEC device controller 107 actuates and/or opens a hydrogen-release valve 157 thereby fluidly connecting the hydrogen reservoir 148 to the hydrogen vessel 102 and permitting the hydrogen gas within the hydrogen reservoir to flow (e.g. passively under the influence of pressure built up in the WEC device's hydrogen reservoir) to the hydrogen vessel's 102 low pressure tanks, from where it may subsequently be further pumped (i.e. further compressed) to the hydrogen vessel's 102 high pressure tanks and thereafter transported to one or more energy consumers (e.g., near-shore power generation and/or distribution utilities).

During the time when at least one tank of the hydrogen vessel 102 is fluidly connected to a hydrogen port 123 of the WEC device via the hose connection ROV 103, deionized water can be pumped and/or otherwise transferred from the hydrogen vessel via the hydrogen transfer hose to a hydrogen reservoir of the WEC device, so as to supply additional "feedstock" water for electrolysis. A water pump can be provided aboard the hydrogen vessel 102 to facilitate this transfer.

Deionization equipment can be provided aboard the hydrogen vessel 102 to turn ambient seawater into deionized water for transfer to WEC devices. In one embodiment, water processing equipment provided aboard the hydrogen vessel 102 distills and/or deionizes water using, at least in part, waste heat from hydrogen fuel cells mounted to said hydrogen vessel, said fuel cells being used to provide electricity to power said hydrogen vessel's thrusters, propellers, and or pump jets.

In a different embodiment, the hydrogen vessel 102 is supplied with deionized water from a shore-based deionization facility at such time as it is docked to unload hydrogen to a shore-based hydrogen-processing infrastructure.

In one method embodiment of the present disclosure, hydrogen is produced at sea using wave energy and carried to shore according to the following method: (1) a hydrogen vessel 102 departs from a shore-based facility and initiates a journey to a plurality of WEC devices (2) during its journey to a plurality of WEC devices, the hydrogen vessel deionizes water (e.g. in part, by application of waste heat from fuel cells to a distillation apparatus, wherein said fuel cells simultaneously provide electricity to the hydrogen vessel's thrusters), (3) the hydrogen vessel 102 arrives near the location of a first WEC device and slows and/or stops, (4) the hydrogen vessel releases a hose connection ROV 103, (5) the hose connection ROV 103 generates a propulsive thrust (e.g. using propellers) to carry a hydrogen hose toward said first WEC device, (6) the hose connection ROV magnetically couples to a hull surface of said first WEC device and translates (e.g. using motorized omni-directional wheels) across said hull surface of said first WEC device until it is positioned proximate to a hull-mounted hydrogen port (e.g. 123) of said first WEC device, (7) the hose connection ROV initiates a fluid connection to a hydrogen tank of the first WEC device via said hydrogen port of the first WEC device (e.g. by inserting a male connector into a female hydrogen port) (8) hydrogen, produced via electrolysis using electricity generated from ocean waves by said first WEC device, and stored under pressure in a hydrogen reservoir of said first WEC device, is offloaded to the hydrogen vessel from said first WEC device via the hydrogen hose carried by said hose connection ROV, (9) deionized water is transferred from the hydrogen vessel to a water tank of the first WEC device, (10) the hose connection ROV decouples from the first WEC device, (11) the hydrogen vessel 102 propels itself to the vicinity of a second WEC device, (12) steps 5-10 are repeated with respect to the second WEC device, (13) the hydrogen vessel 102 propels itself to the vicinity of a third WEC device, (14) steps 5-10 are repeated with respect to the third WEC device, (15) the hydrogen vessel retracts the hose connection ROV to a stowed position, (16) the hydrogen vessel initiates a journey to shore, carrying hydrogen offloaded from the two WEC devices to a shore-based facility and there offloading it for processing and conveyance to a shore-based hydrogen consumer.

Figure 15:
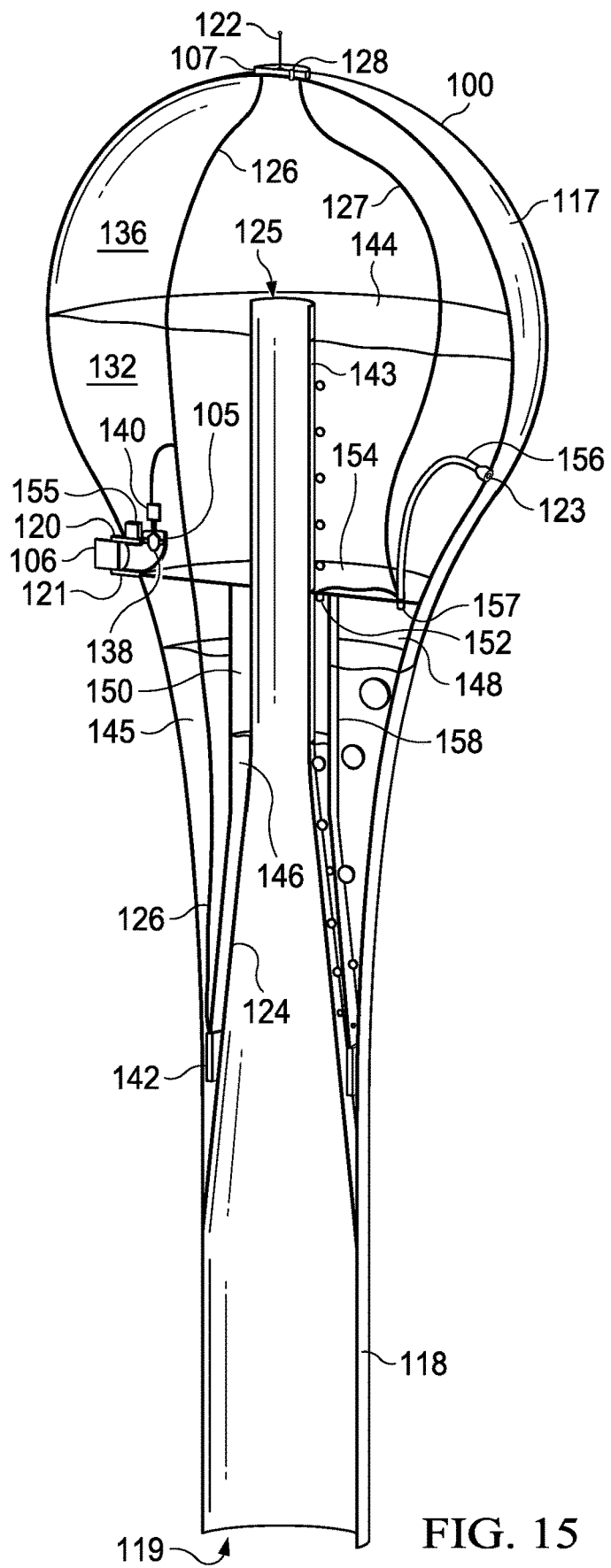
FIG. 15 shows a perspective view of the same side sectional view of a WEC device of an embodiment of the present disclosure that is illustrated in FIG. 14.

FIG. 15 shows a perspective view of the same side sectional view of a WEC device of an embodiment of the present disclosure that is illustrated in FIG. 14.

Figure 16:
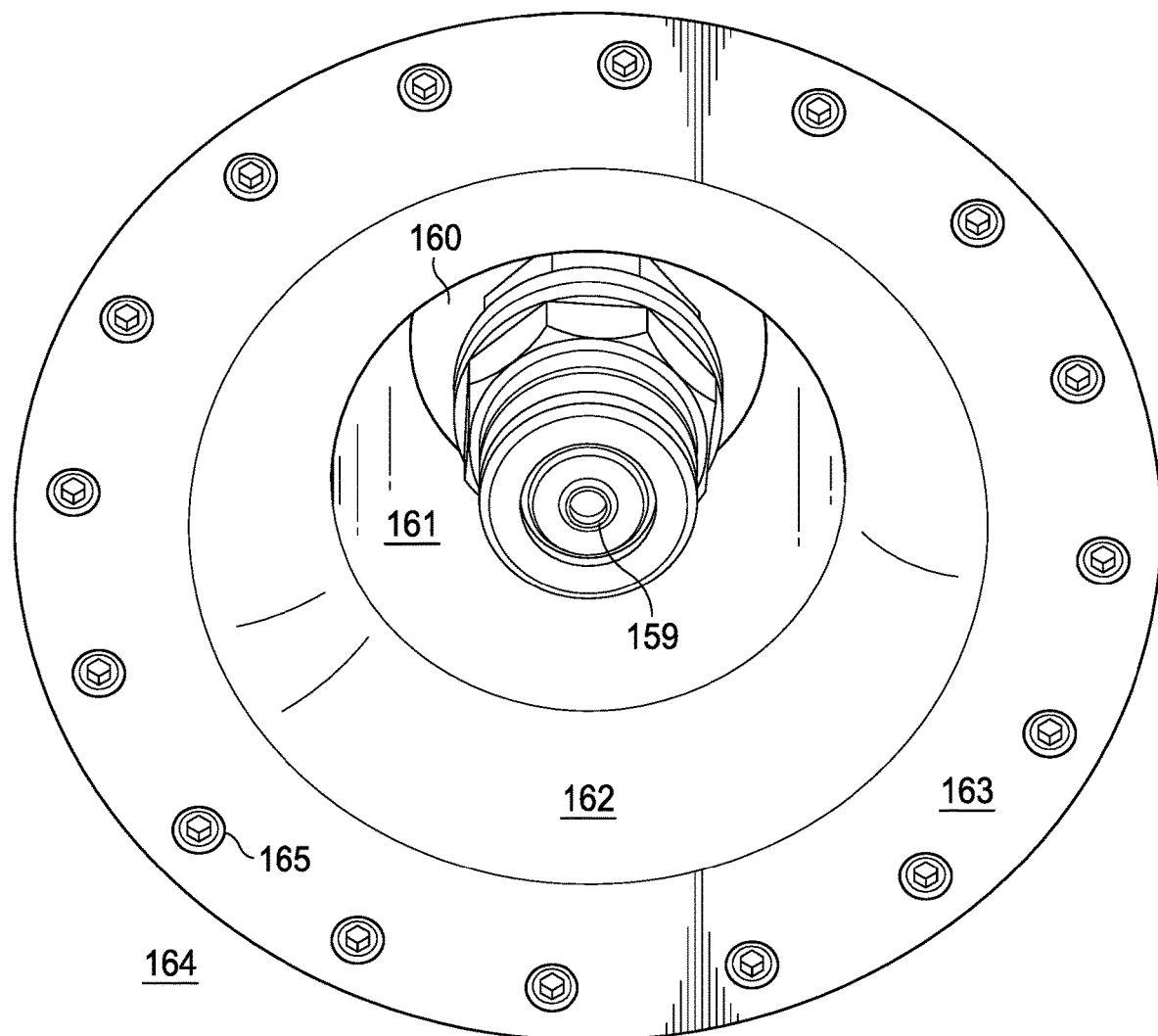
FIG. 16 shows a close-up view of a hydrogen port incorporated within the hull of a WEC device of an embodiment of the present disclosure.

FIG. 16 shows a close-up view of a hydrogen port incorporated within the hull of a WEC device of an embodiment of the present disclosure.

A male dry disconnect 159 is positioned at an innermost and/or proximal end 160 (with respect to the center of the respective WEC device) of a recessed cylindrical housing 161. The outermost and/or distal end of the recessed cylindrical housing is open and surrounded by an outward and/or expanding beveled and/or tapered guiding wall 162, which facilitates the insertion of a male valve connector by a hose connection ROV. The widest and/or outermost edge of the beveled wall is surrounded by an approximately flat and/or planar annular plate 163 which is secured to the hull 164 of a respective WEC device by at least a plurality of bolts, e.g., 165.

Figure 17:
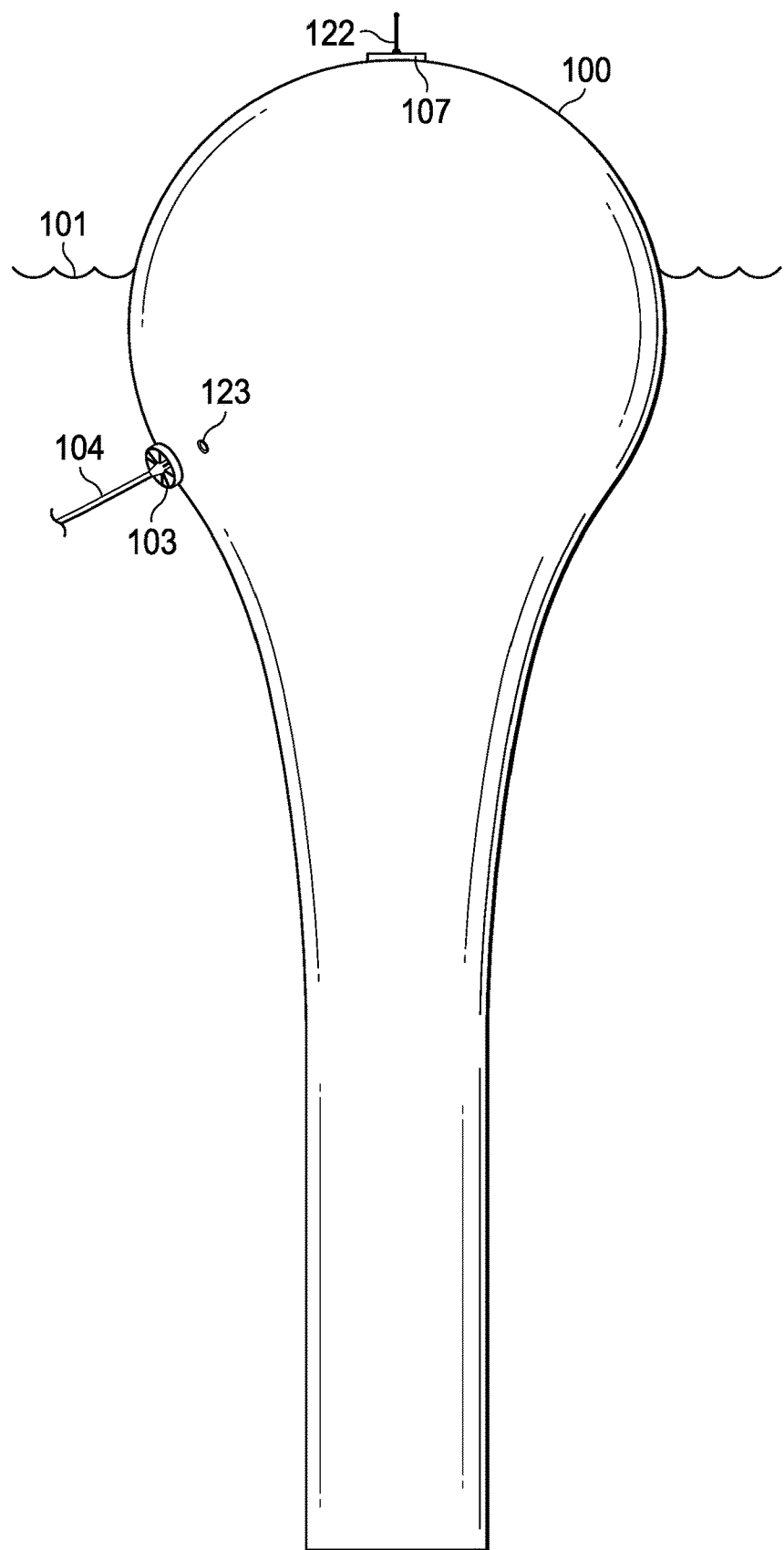
FIG. 17 shows a perspective side view of a WEC device of an embodiment of the present disclosure, identical to the WEC device that is illustrated in FIGS. 8-15.

FIG. 17 shows a perspective side view of a WEC device of an embodiment of the present disclosure, identical to the WEC device that is illustrated in FIGS. 8-15. The WEC device illustrated in FIG. 17 is configured to link and/or connect with an approaching hose connection ROV.

Figure 18:
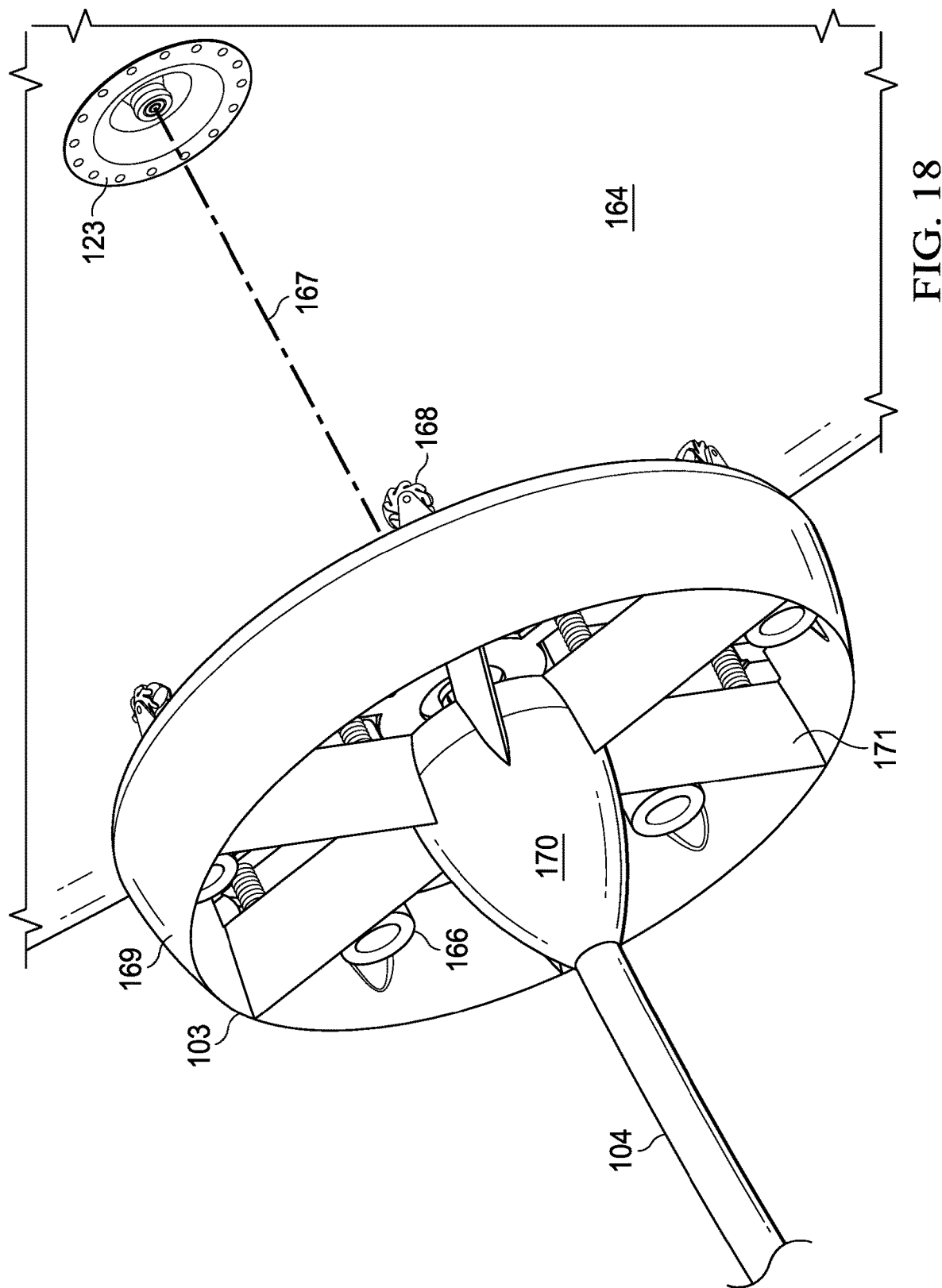
FIG. 18 shows a close-up perspective view of a hose connection ROV approaching a hydrogen port embedded within the hull of a WEC device of an embodiment of the present disclosure.

FIG. 18 shows a close-up perspective view of a hose connection ROV 103 approaching a hydrogen port 123 embedded within the hull 164 of a WEC device of an embodiment of the present disclosure.

The hose connection ROV 103 uses the thrust from six thrusters, e.g., 166, to approach the hydrogen port 123 and to pull the hydrogen transfer hose 104 attached and fluidly connected to the hose connection ROV. By varying the thrust produced by each of its thrusters, the hose connection ROV is able to steer a course and adjust, alter, correct, and/or control, its trajectory 167 toward the hydrogen port.

After making contact with the hull 164 of the WEC device, the hose connection ROV 103 is moveably connected to the outer surface of that hull by six omni-directional wheels, e.g., 168 similar to, if not identical to, a Mecanum wheel. Each omni-directional wheel is operatively connected to a respective motor that is able to turn each respective wheel about its axle in either rotational direction, as well as to be braked (at least in part) by that respective motor. Every roller thereof (sub-wheel element), is able to rotate freely about its own axle. The hose connection ROV illustrated in FIG. 18 incorporates, includes, and/or utilizes, Mecanum wheels. Another embodiment hose connection ROV incorporates, includes, and/or utilizes, omni-wheels.

Through its use of omni-directional wheels, a targeting and/or guidance system, and a hose connection ROV controller (not shown), the hose connection ROV is able to move across the outer surface of a WEC device's hull in search of, and until it locates and positions itself directly above and/or adjacent to, a hydrogen port of the respective WEC device, especially when held against said hull using electromagnets (not visible) and/or thrust from thrusters e.g. 166.

The thrusters of the hose connection ROV 103 are attached to an annular ring 169 with a cross-sectional shape that is aerodynamically streamlined to reduce drag as the hose connection ROV propels itself through water toward a WEC device. The annular ring is attached to the central connection apparatus 170 by six radially-oriented struts, e.g., 171, each of which is also aerodynamically streamlined so as to reduce drag.

Not shown in FIG. 18 are the hydrogen port guidance features which assist the hose connection ROV 103, and its respective hose connection ROV controller, to choose the lateral movements best able to position the hose connection ROV above the targeted hydrogen port 123.

An embodiment locates a targeted hydrogen port by means of radial lines emanating from a hydrogen port and painted on the outer surface of the hull of a respective targeted WEC device. An optical sensor on the hose connection ROV detects the lines and the respective hose connection ROV controller calculates and/or estimates the relative coordinates of the targeted hydrogen port through its analysis of the angular relationships of the detected portions of those painted radial lines.

An embodiment locates a targeted hydrogen port by means of radial ridges and/or grooves respectively embossed upon, and/or etched within, the outer surface of the hull of a respective targeted WEC device, wherein the radial ridges and/or grooves are oriented so as to emanate from a hydrogen port. A sensor that measures pressure, distance (e.g. ultrasonic), texture, etc., mounted on, and/or incorporated within, the hose connection ROV detects the ridges and/or grooves and the respective hose connection ROV controller calculates and/or estimates the relative coordinates of the targeted hydrogen port through its analysis of the angular relationships of the detected portions of those ridges and/or grooves.

Other embodiments utilize other means, methods, mechanisms, techniques, structures, configurations, adaptations, optical patterns, structural patterns, acoustic patterns, electrical patterns, magnetic patterns, or other targeting features, to assist, facilitate, help, guide, and/or draw, hose connection ROVs to their respective hydrogen ports. All such guiding features, and their methods of utilization, are included within the scope of the present disclosure.

Figure 19:
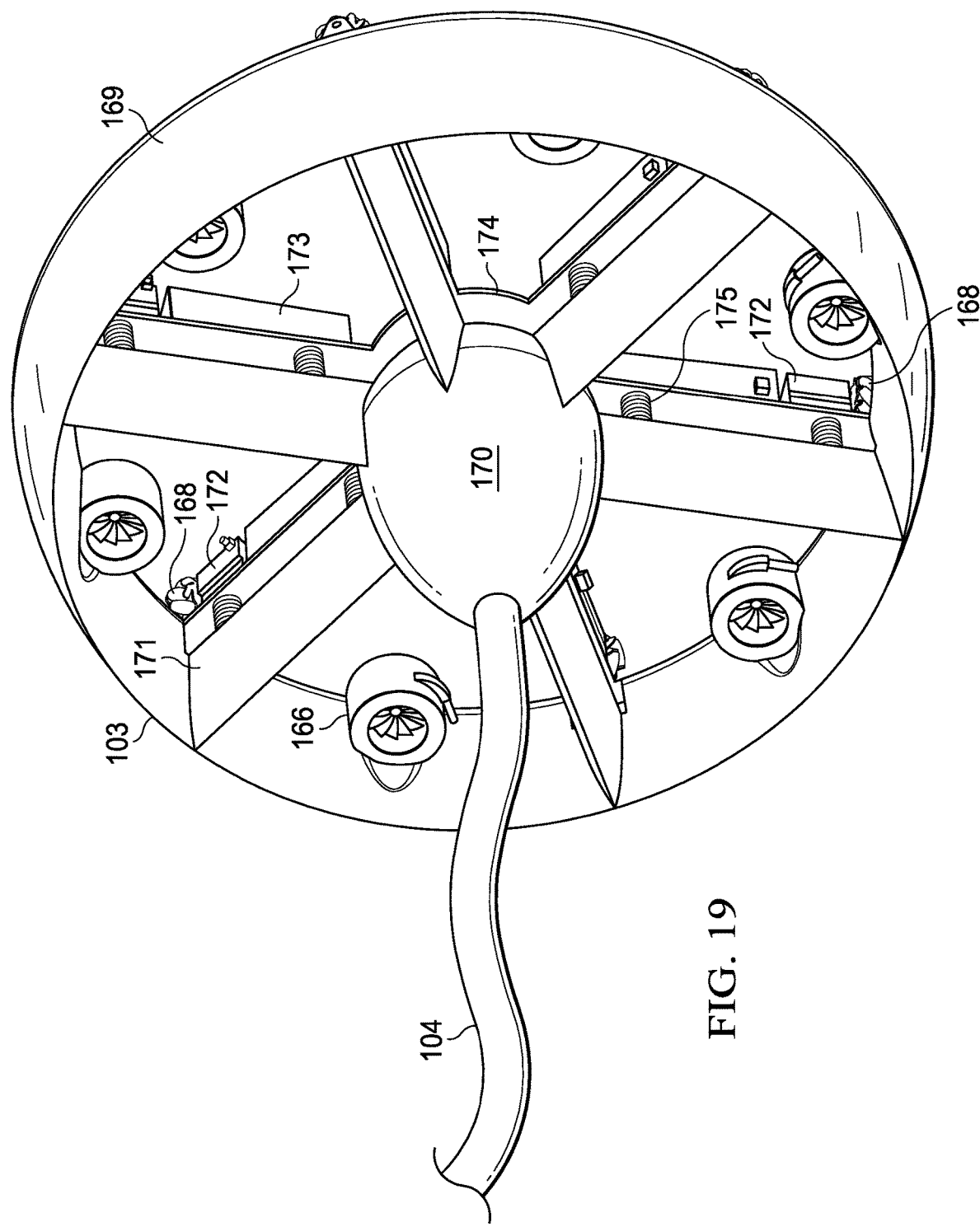
FIG. 19 shows a perspective view of the same hose connection ROV of an embodiment of the present disclosure that is illustrated in FIG. 18.

FIG. 19 shows a perspective view of the same hose connection ROV 103 of an embodiment of the present disclosure that is illustrated in FIG. 18. The hose connection ROV is operably connected to a hydrogen transfer hose 104 (which is connected to a hydrogen vessel). Each omni-directional wheel 168 is activated, energized, driven, propelled, and/or actuated, by a respective bidirectional motor 172. Through its adjustment of the rate and direction of rotation of select omni-directional wheels, the hose connection ROV controller (positioned on the respective hydrogen vessel) is able to move the hose connection ROV in any lateral (i.e. circumferential or tangential) direction over the hull of a WEC device in search of the respective hydrogen port. The hose connection ROV remains moveably attached to the hull of a WEC device by the magnetic field generated by six electromagnets, e.g., 173.

The electromagnets 173 and the omni-directional wheels 168 (and omni-directional wheel motors 168) are attached to a shock-absorbing suspension stage 174. And the suspension stage is connected to the six radially-oriented struts, e.g., 171, by twelve shock-absorbing springs 175, two springs per radial strut.

After the hose connection ROV 103 contacts the outer hull of a WEC device, the electromagnets 173 are energized to a first field strength and/or to a first magnetic attachment strength, by a first current and a first voltage transmitted to the hose connection ROV and its electromagnets by a conductor within the respective hydrogen transfer hose, wherein the first field strength and/or the first magnetic attachment strength is strong enough to hold the hose connection ROV against the hull, so as to provide ample traction to omni-directional wheels 168, enabling the ROV to move about the hull's outer surface.

After the hose connection ROV 103 is positioned above the hydrogen port of a WEC device, the hose connection ROV controller (not shown) extends female dry disconnect 177, which, as a result, physically connects with the male dry disconnect (159 in FIG. 16) over which it is positioned. The physical connection of the female and male dry disconnects fluidly connects the hydrogen transfer hose 104 of the respective hydrogen vessel (102 in FIG. 4) and hose connection ROV (103 in FIG. 4) to the hydrogen effluent pipe (156 in FIG. 14) of the respective WEC device.

After a hydrogen vessel has retrieved a sufficient amount of hydrogen gas from a WEC device, the hydrogen vessel's hose connection ROV de-energizes its electromagnets and actuates and/or energizes its thrusters so as to facilitate its return to, and/or retrieval by, its respective hydrogen vessel (e.g. by retraction of its hose onto the hydrogen vessel's drum).

An embodiment of the present disclosure incorporates, includes, comprises, and/or utilizes, a hose connection ROV that incorporates, includes, comprises, and/or utilizes, permanent magnets to facilitate its attachment to a WEC device hull.

An embodiment of the present disclosure incorporates, includes, comprises, and/or utilizes, a hose connection ROV that incorporates, includes, comprises, and/or utilizes, its thrusters to push itself against a WEC device hull with enough force to hold it there while it laterally moves in search of a hydrogen port, and then to hold it firmly in place when its omni-directional wheels are retracted such that the shock-absorbing stage it pressed directly against the WEC device hull.

An embodiment of the present disclosure incorporates, includes, comprises, and/or utilizes, a hose connection ROV that incorporates, includes, comprises, and/or utilizes, solenoid driven and/or actuated pedestals to facilitate its attachment to a WEC device hull, e.g., by lifting the omni-directional wheels away from the WEC device hull.

An embodiment of the present disclosure incorporates, includes, comprises, and/or utilizes, a hose connection ROV that incorporates, includes, comprises, and/or utilizes, omni-directional wheels mounted to retractable platforms and/or stages so that when the hose connection ROV is positioned above a WEC device's hydrogen port, the omni-directional wheels may be retracted to a distance, and/or clearance, that precludes their ability to facilitate the lateral movement of the hose connection ROV across the surface of the WEC device hull.

An embodiment of the present disclosure incorporates, includes, comprises, and/or utilizes, a hose connection ROV that incorporates, includes, comprises, and/or utilizes, omni-directional wheels having brakes.

Other embodiments of the present disclosure incorporate, include, comprise, and/or utilize, hose connection ROVs that incorporate, include, comprise, and/or utilize, other and/or alternate means, methods, mechanisms, devices, components, systems, apparati, and/or techniques to hold those hose connection ROVs against their target WEC device hulls while moving in search of a hydrogen port, and/or alternate means, methods, mechanisms, devices, components, systems, apparati, and/or techniques to fixedly and/or firmly hold those hose connection ROVs against their target WEC device hulls when they are positioned above their target hydrogen ports.

An embodiment of the present disclosure incorporates, includes, comprises, and/or utilizes, a hose connection ROV that incorporates, includes, comprises, and/or utilizes, jets of pressurized water dispensed and/or released from valved nozzles, with a portion of the pressurized water being supplied by the hydrogen vessel and transmitted to the hose connection ROV via one or more fluid channels incorporated within the respective hydrogen transfer hose. By regulating, adjusting, controlling, altering, and/or changing, the degrees to which individual water jets configured and/or oriented so as to provide a forward thrust obstruct the flow of pressurized water through them, the respective hose connection ROV can guide the hose connection ROV to a WEC device and its respective hydrogen port. Similarly, by regulating, adjusting, controlling, altering, and/or changing, the degrees to which individual water jets configured and/or oriented so as to provide a lateral thrusts obstruct the flow of pressurized water through them, the respective hose connection ROV can guide the hose connection ROV laterally across the outer surface of a WEC device in order to position it above a respective hydrogen port.

An embodiment of the present disclosure incorporates, includes, comprises, and/or utilizes, a hose connection ROV that incorporates, includes, comprises, and/or utilizes, omni-directional roller balls actuated and/or driven by orthogonal sets of motor-driven frictional rollers so as to provide the lateral movements necessary and sufficient to position the respective hose connection ROV above a respective hydrogen port.

An embodiment of the present disclosure incorporates, includes, comprises, and/or utilizes, a hose connection ROV that is controlled by an autonomous system positioned within the central connection apparatus 170 and energized by electrical power supplied by the respective hydrogen vessel through an electrical conductor within the respective hydrogen transfer hose.

An embodiment of the present disclosure incorporates, includes, comprises, and/or utilizes, a hose connection ROV that is controlled by an autonomous system positioned on and/or in a respective hydrogen vessel.

An embodiment of the present disclosure incorporates, includes, comprises, and/or utilizes, a hose connection ROV that is controlled by an autonomous system positioned on and/or in a respective targeted WEC device, with the control signals being relayed to the hydrogen vessel by radio, and then to a hose connection ROV controller on and/or in that hydrogen vessel, and/or to a hose connection ROV controller positioned within the respective hose connection ROV through a relaying of control signals from the respective hydrogen vessel to the respective hose connection ROV through an electrical and/or optical conductor within the respective hydrogen transfer hose.

An embodiment of the present disclosure incorporates, includes, comprises, and/or utilizes, a hose connection ROV that is controlled by a person aboard a respective hydrogen vessel.

An embodiment of the present disclosure incorporates, includes, comprises, and/or utilizes, a hose connection ROV that is remotely controlled by a human operator located far from the respective WEC device and hydrogen vessel through signals exchanged by the operator's control station with the hydrogen vessel and/or the WEC device.

Figure 20:
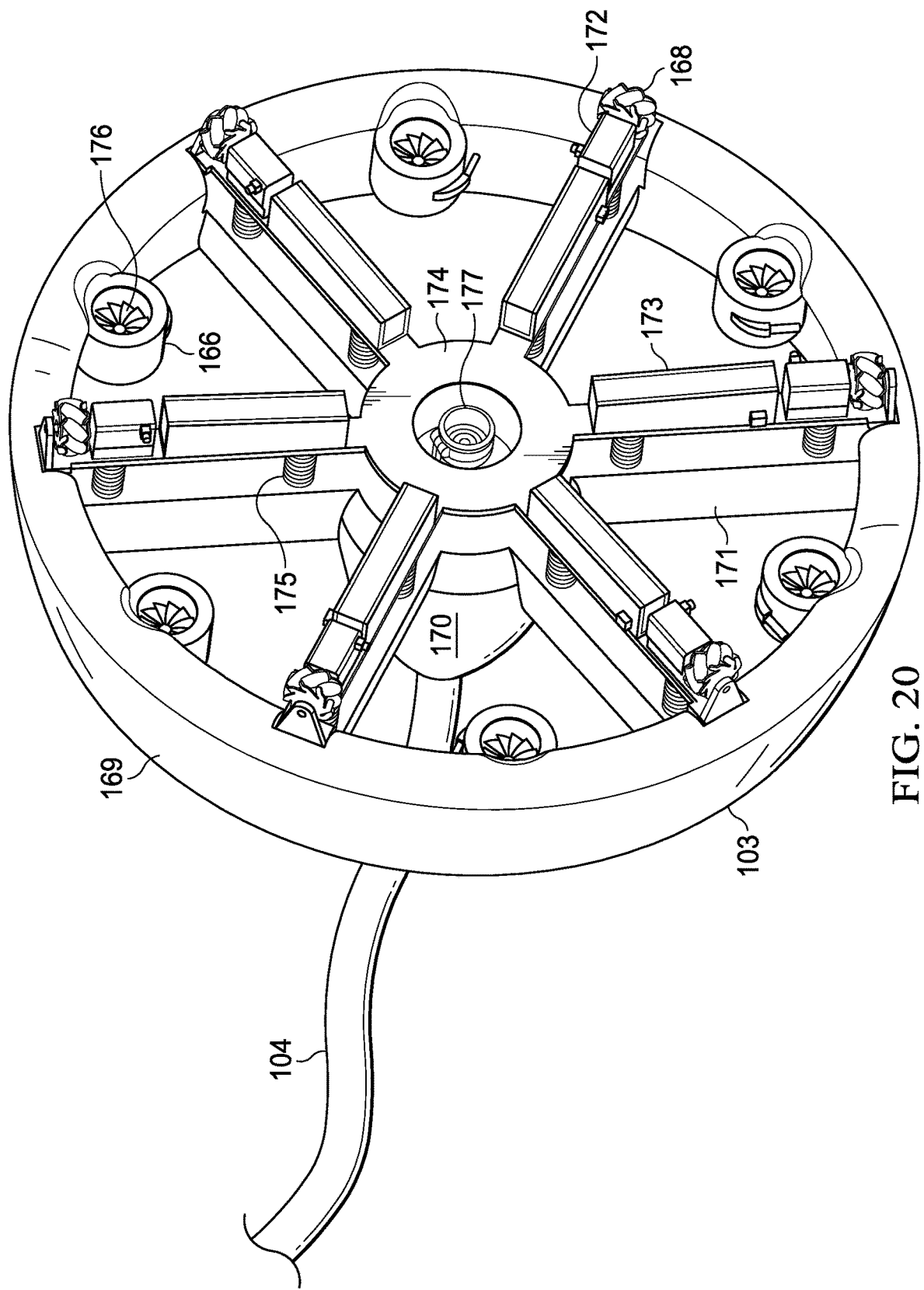
FIG. 20 shows a perspective view of the same hose connection ROV illustrated in FIGS. 18 and 19.

FIG. 20 shows a perspective view of the same hose connection ROV 103 illustrated in FIGS. 18 and 19. Each thruster 166 incorporates, includes, comprises, and/or utilizes, a propeller 176 the rotation of which generates thrust (either forward or backward depending upon the direction in which the respective propeller is rotated).

After successfully positioning itself above a hydrogen port, the female dry disconnect 177 is extended through an aperture at the center of the shock-absorbing suspension stage 174 thereby tending to engage and connect to the corresponding and/or complementary male dry disconnect of the respective hydrogen port.

Figure 21:
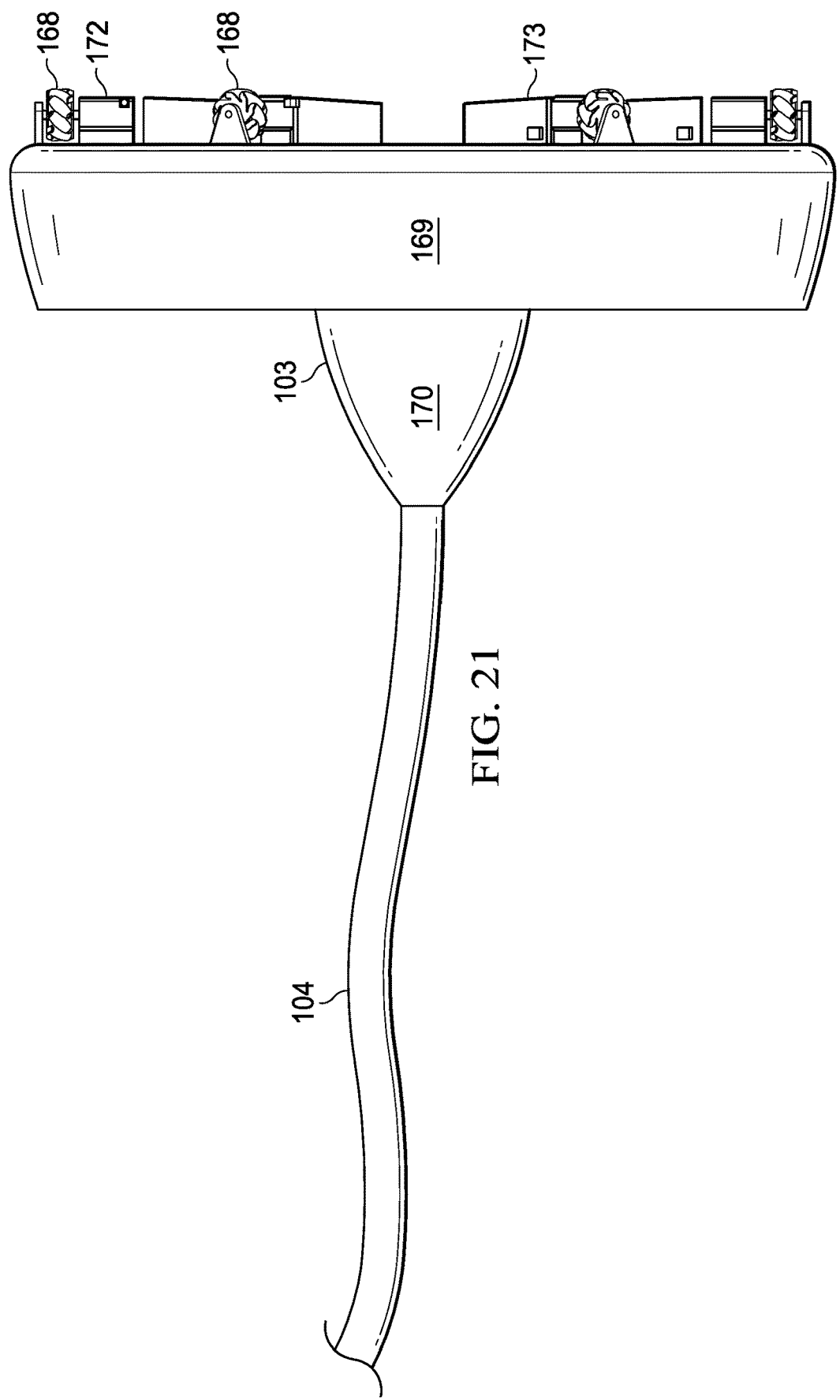
FIG. 21 shows a side view of the same hose connection ROV illustrated in FIGS. 18-20.

FIG. 21 shows a side view of the same hose connection ROV 103 illustrated in FIGS. 18-20. Contact with the hull of a WEC device is limited to the omni-directional wheels 168, even when the hose connection ROV is forced against an outer surface of a respective WEC device by the moderate and/or strong attractive forces generated by the electromagnets of the hose connection ROV. Note that each omni-directional wheel extends further from the respective hose connection ROV's hydrogen transfer hose than does any other component or part of the hose connection ROV. It is to be understood that the motorized rotation of said omni-directional wheels by motors (e.g. 172) is to be electrically controlled in the manner of Mecanum wheels and other types of omni-directional wheel.

Figure 22:
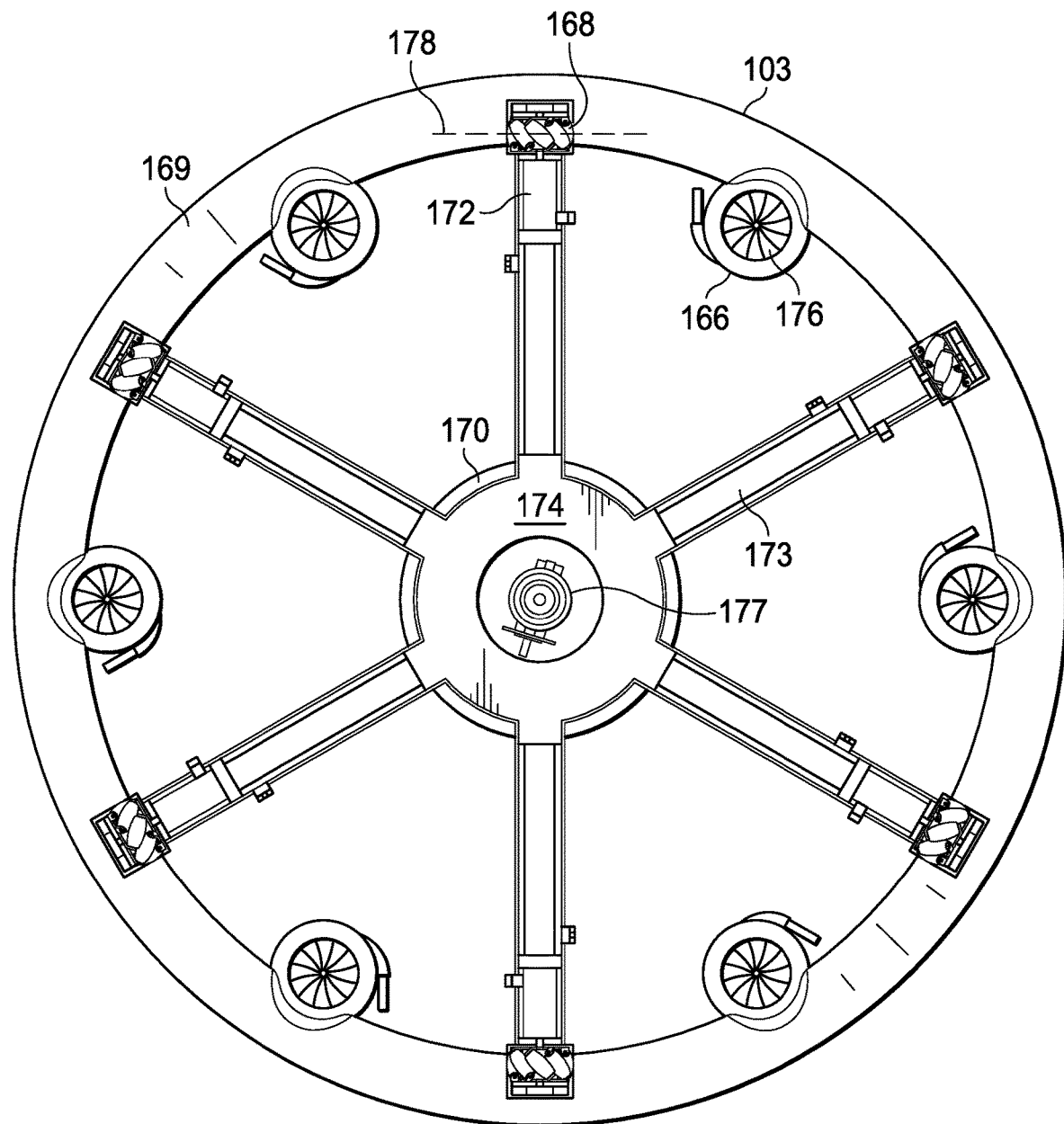
FIG. 22 shows a forward side view of the same hose connection ROV illustrated in FIGS. 18-21.

FIG. 22 shows a forward side view of the same hose connection ROV 103 illustrated in FIGS. 18-21. Each of the hose connection ROV's six omni-directional wheels are configured and/or aligned so that the axle and/or axis about which each wheel rotates is radially-oriented with respect to the female dry disconnect 177 at the center of the hose connection ROV. In other words, each wheel rotates in a plane 178 that is tangential to the hose connection ROV and/or to the longitudinal axis of its attached hydrogen transfer hose (not visible).

Through a combination of forward and backward rotations, the six omni-directional wheels of the hose connection ROV are able to move the hose connection ROV in any lateral direction across the outer hull surface of a WEC device. The flexibility of movement afforded a hose connection ROV by a plurality of omni-directional wheels facilitates the ability of a hose connection ROV controller to move a respective hose connection ROV to a position above and/or over a hydrogen port.

Figure 23:
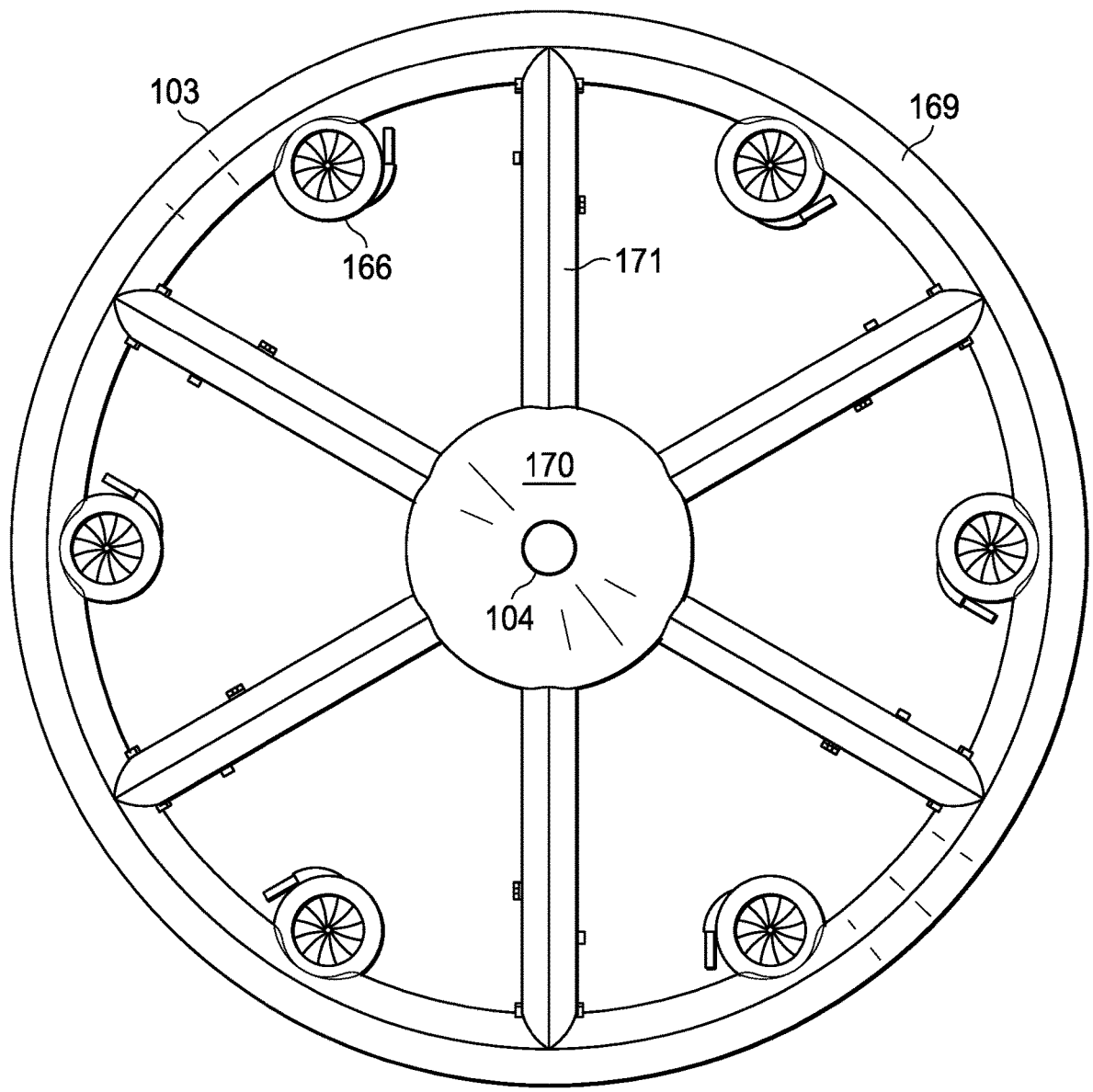
FIG. 23 shows a back, and/or hydrogen-transfer-hose-side, view of the same hose connection ROV illustrated in FIGS. 18-22.

FIG. 23 shows a back, and/or hydrogen-transfer-hose-side, view of the same hose connection ROV 103 illustrated in FIGS. 18-22.

Figure 24:
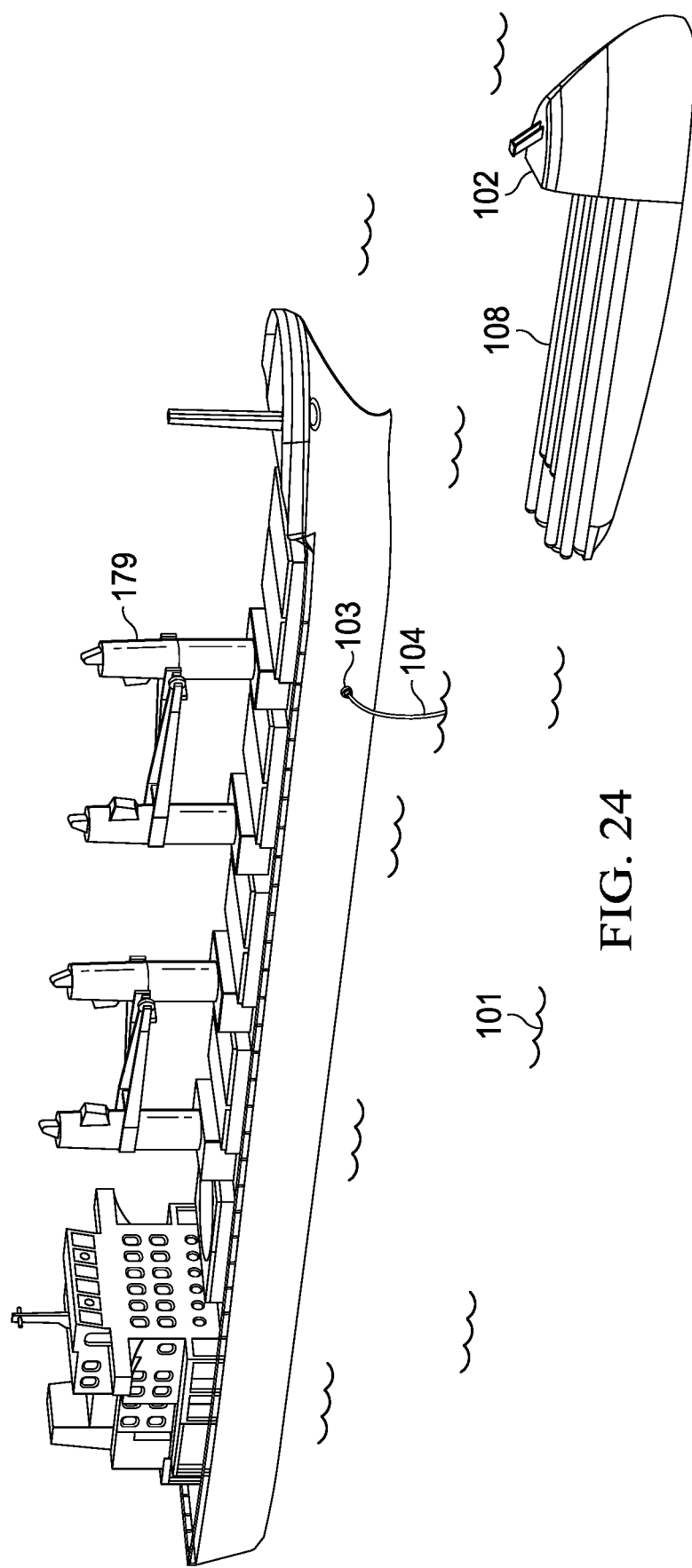
FIG. 24 shows a hydrogen vessel of an embodiment of the present disclosure dispensing and/or transferring hydrogen gas to an energy consumer which in this case is a bulk transport ship.

FIG. 24 shows a hydrogen vessel 102 of an embodiment of the present disclosure dispensing and/or transferring hydrogen gas to an energy consumer which in this case is a bulk transport ship 179. Both the hydrogen vessel and the bulk transport ship are floating at an upper surface of a body of water 101. The hydrogen vessel has released its hose connection ROV 103 which has propelled itself to the ship, pulling its attached hydrogen transfer hose 104 with it. The hose connection ROV has magnetically attached itself to the hull of the ship and the respective hose connection ROV controller has controlled the hose connection ROV's omni-directional wheels so as to position the hose connection ROV over a complementary and/or compatible hydrogen port (not visible beneath the hose connection ROV) embedded within the hull of the ship.

In this case, instead of using the hydrogen transfer hose 104 to draw hydrogen gas to itself, the hydrogen vessel 102 is now using it to transfer hydrogen gas from its onboard pressurized hydrogen storage tanks 108 to the ship (e.g., to its onboard pressurized hydrogen tanks). After the transfer of hydrogen gas is complete, the hose connection ROV 103 detaches from the hull of the ship and is pulled back to the hydrogen vessel. And, after its refueling with hydrogen from the hydrogen vessel, the bulk carrier ship 179 uses a portion of the hydrogen gas received from the hydrogen vessel to energize its propulsion system (e.g., with a fuel cell and electric motor) and cruise to another location (e.g., a port where it will offload its cargo).

Figure 25:
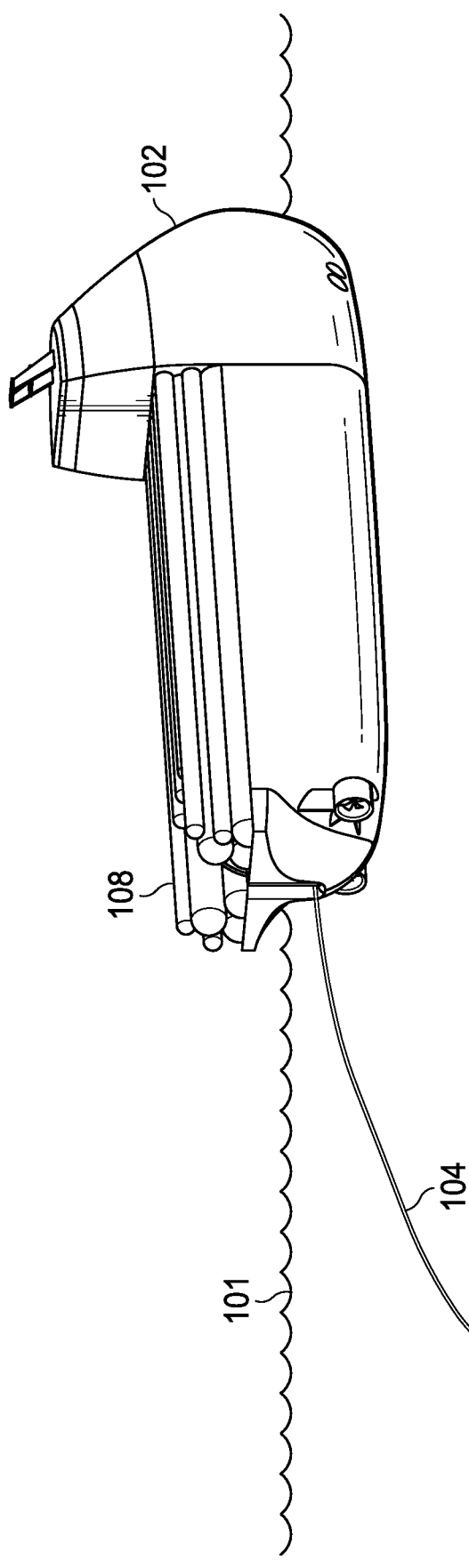
FIG. 25 shows a hydrogen vessel of an embodiment of the present disclosure dispensing and/or transferring hydrogen gas to an energy consumer which in this case is a submarine.
Figure 25:
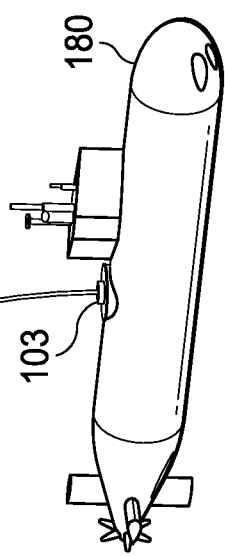

FIG. 25 shows a hydrogen vessel 102 of an embodiment of the present disclosure dispensing and/or transferring hydrogen gas to an energy consumer which in this case is a submarine 180 (and/or an AUV or UUV). The hydrogen vessel is floating at an upper surface of a body of water 101. While the submarine is floating and/or moving within that body of water, and nominally below its surface 101.

The hydrogen vessel 102 has released its hose connection ROV 103 which has propelled itself down to the submarine 180, pulling its attached hydrogen transfer hose 104 with it. The hose connection ROV has magnetically attached itself to the hull of the submarine and the respective hose connection ROV controller has controlled the hose connection ROV's omni-directional wheels so as to position the hose connection ROV over a complementary and/or compatible hydrogen port (not visible beneath the hose connection ROV) embedded within the hull of the submarine.

The hydrogen vessel 102 uses its hydrogen transfer hose 104 to transfer hydrogen gas from its onboard pressurized hydrogen storage tanks 108 to the submarine (e.g., to its onboard and/or inboard pressurized hydrogen tanks). After the transfer of hydrogen gas is complete, the hose connection ROV 103 detaches from the hull of the submarine and is pulled back to the hydrogen vessel. And, after its refueling with hydrogen from the hydrogen vessel, the submarine 180 uses a portion of the hydrogen gas received from the hydrogen vessel to energize its propulsion system (e.g., with a fuel cell and electric motor) and cruise to another location within the body of water 101.

Figure 26:
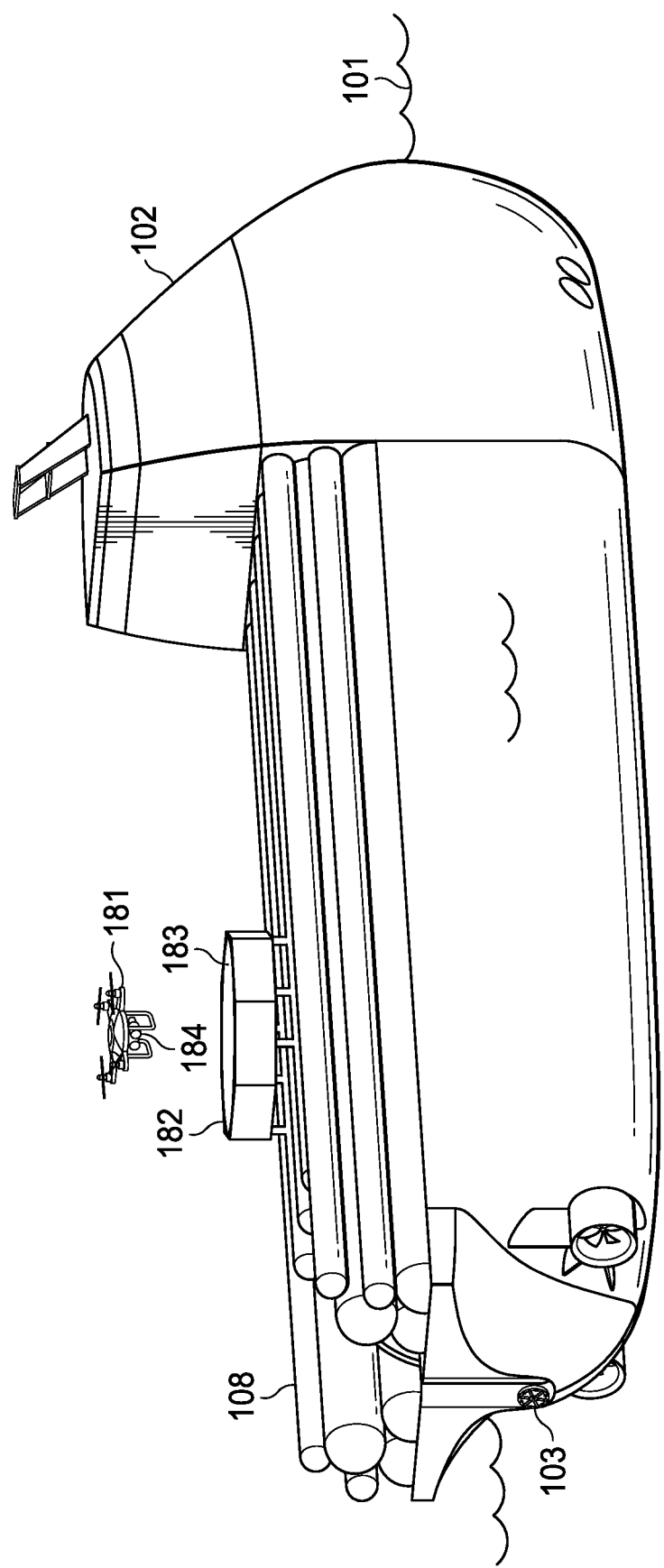
FIG. 26 shows a hydrogen vessel of an embodiment of the present disclosure, floating at an upper surface of a body of water, and dispensing and/or transferring hydrogen gas to an energy consumer which in this case is an autonomous unmanned aerial vehicle (UAV).

FIG. 26 shows a hydrogen vessel 102 of an embodiment of the present disclosure, floating at an upper surface of a body of water 101, and dispensing and/or transferring hydrogen gas to an energy consumer which in this case is an autonomous unmanned aerial vehicle 181 (UAV). This hydrogen vessel is equipped, fitted, configured, and/or adapted, with a UAV landing and recharging platform 182. The floor 183 of the recharging platform is adapted to fluidly connect to a pair of pressurized hydrogen storage tanks 184 within, on and/or in the UAV, and to refill those tanks with pressurized hydrogen gas drawn from the hydrogen storage tanks 108 of the hydrogen vessel.

Figure 27:
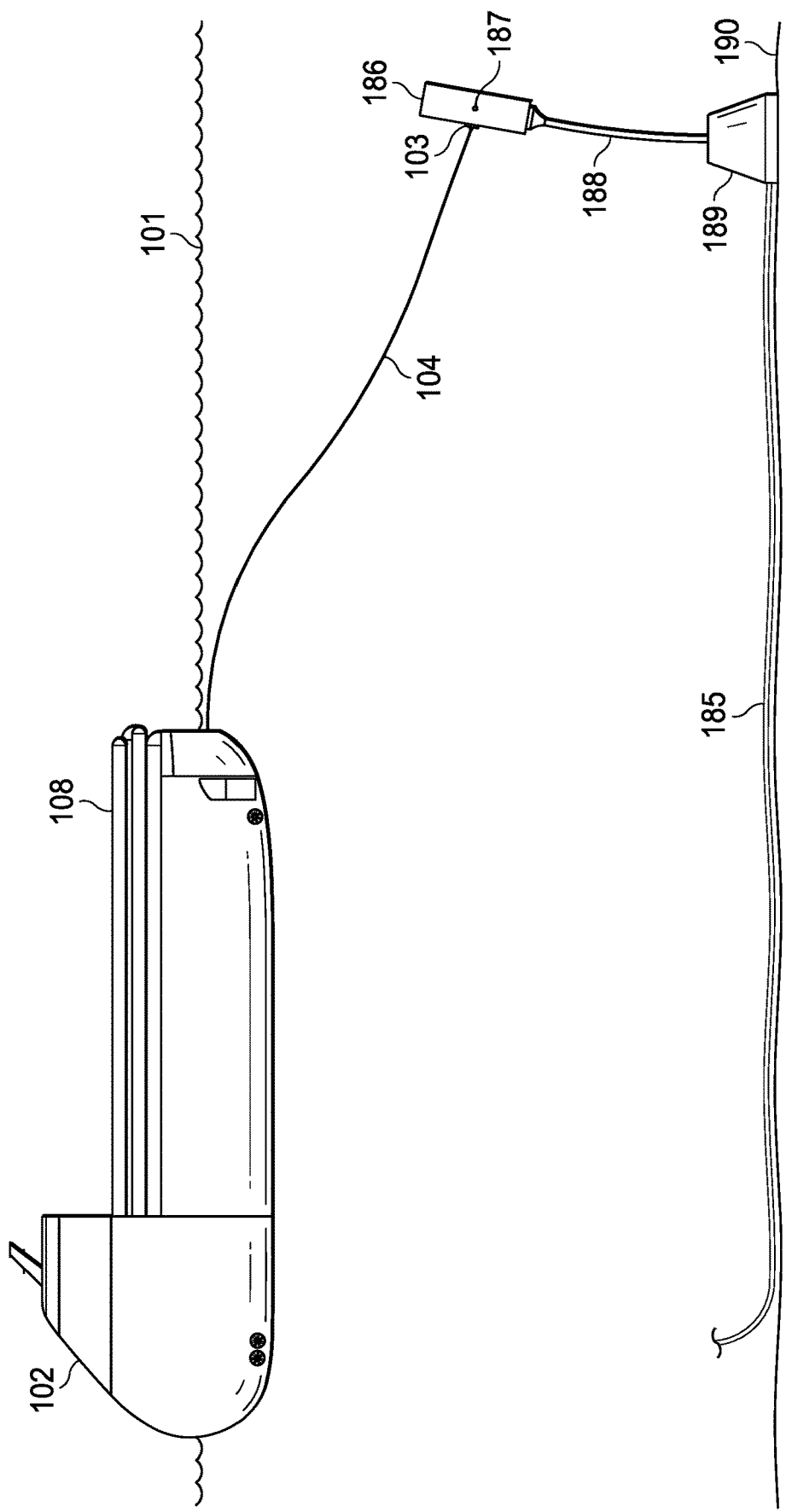
FIG. 27 shows a hydrogen vessel of an embodiment of the present disclosure, dispensing and/or transferring hydrogen gas to an energy consumer via a submerged receiving hose, tube, pipe, and/or channel.

FIG. 27 shows a hydrogen vessel 102 of an embodiment of the present disclosure, floating at an upper surface of a body of water 101, and dispensing and/or transferring hydrogen gas to an energy consumer via a submerged receiving hose 185, tube, pipe, and/or channel. For example, the energy consumer might be a nearshore power utility that stores the hydrogen gas received via hose 185 in onshore pressurized hydrogen storage tanks, and then uses that hydrogen gas to energize fuel cells and produce electrical power which is directed and/or transmitted into a terrestrial power grid.

When the hydrogen vessel 102 arrives at a position over and/or adjacent to a floating submerged connection dongle 186, it releases its hose connection ROV 103 which propels itself to the connection dongle, attaches to one of its four nominally vertical surfaces, and uses its lateral locomotion capabilities to locate and position itself over the male dry connector of a connection-compatible and/or complementary hydrogen port, e.g., 187.

In the illustration of FIG. 27, the hose connection ROV 103 of the hydrogen vessel 102 has positioned itself over, and connected its extendable female dry connector to, an underlying hydrogen port (not visible) on the side of the connection dongle 186 facing the hydrogen vessel. After securing a fluid connection to the submerged connection dongle 186, the hydrogen vessel releases and/or pumps hydrogen gas through its hydrogen transfer hose 104 and into the dongle receiving hose 188 by way of the dongle 186.

The hydrogen gas released and/or pumped into the dongle receiving hose 188 flows through a channel within a dongle anchoring base 189 resting upon a seafloor 190 to therethrough flow into the submerged receiving hose 185 and therethrough to the energy consumer at the distal end of the submerged receiving hose.

Figure 28:
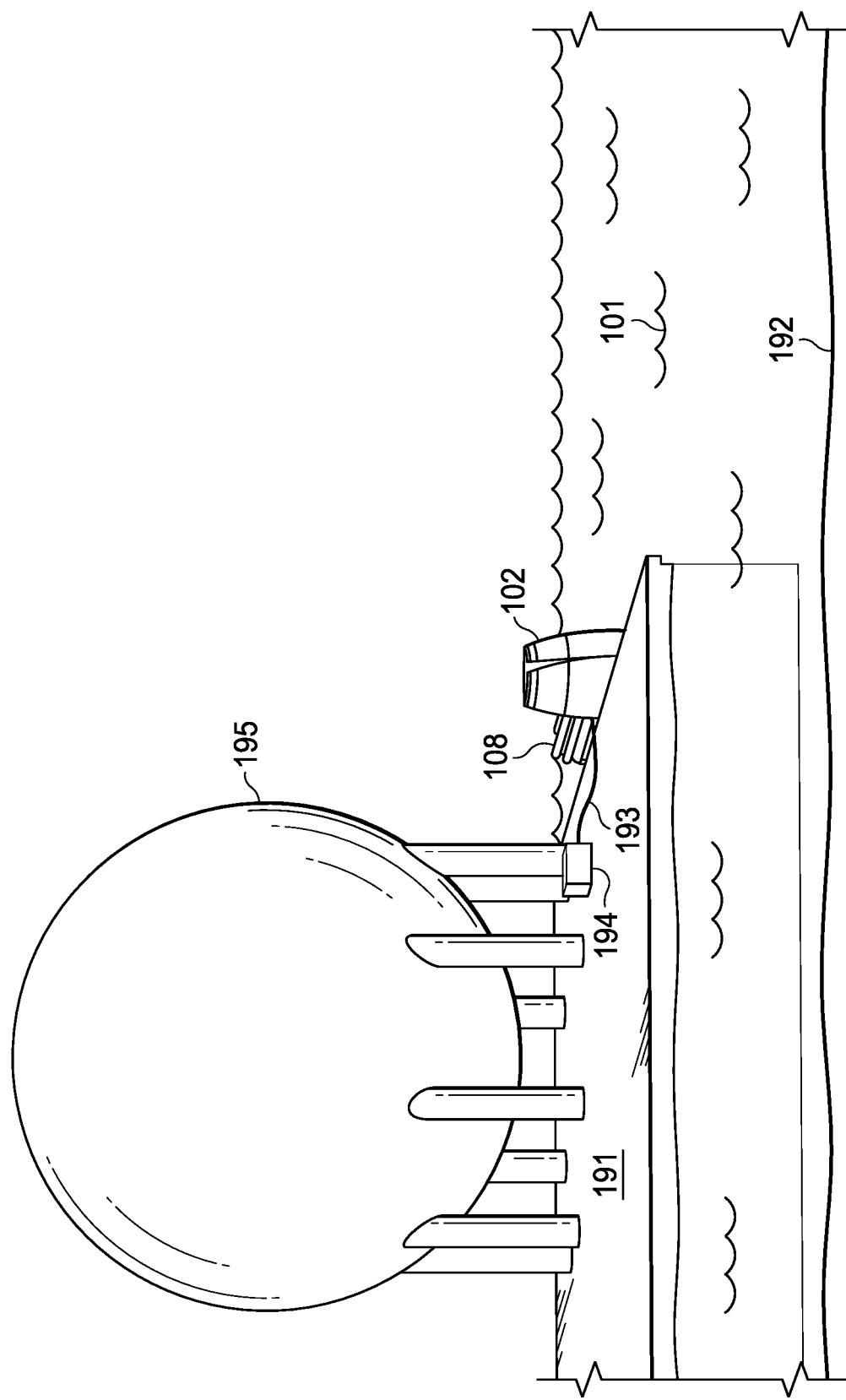
FIG. 28 shows a hydrogen vessel of an embodiment of the present disclosure, floating at an upper surface of a body of water adjacent to a landing, pier, dock, and/or shore facility where the height of the surface of the body of water above the seafloor is relatively small, and/or the water is relatively shallow.

FIG. 28 shows a hydrogen vessel 102 of an embodiment of the present disclosure, floating at an upper surface of a body of water 101 adjacent to a landing, pier, dock, and/or shore facility 191, e.g., where the height of the surface of the body of water 101 above the seafloor 192 is relatively small, and/or the water is relatively shallow.

After being moored to the shore facility 191, a shore-based hydrogen transfer hose 193 is used (e.g. manually connected to the ship by a dockworker) to fluidly connect the pressurized hydrogen storage tanks 108 on the hydrogen vessel to a pump and/or interface connector 194 which then directs the received hydrogen gas into an onshore pressurized hydrogen storage tank 195. The hydrogen gas stored within the onshore storage tank 195 is then pumped via above- and/or below-ground pipes to energy consumers, including, but not limited to, residential homes, automobile refueling stations, and industrial facilities.

Figure 29:
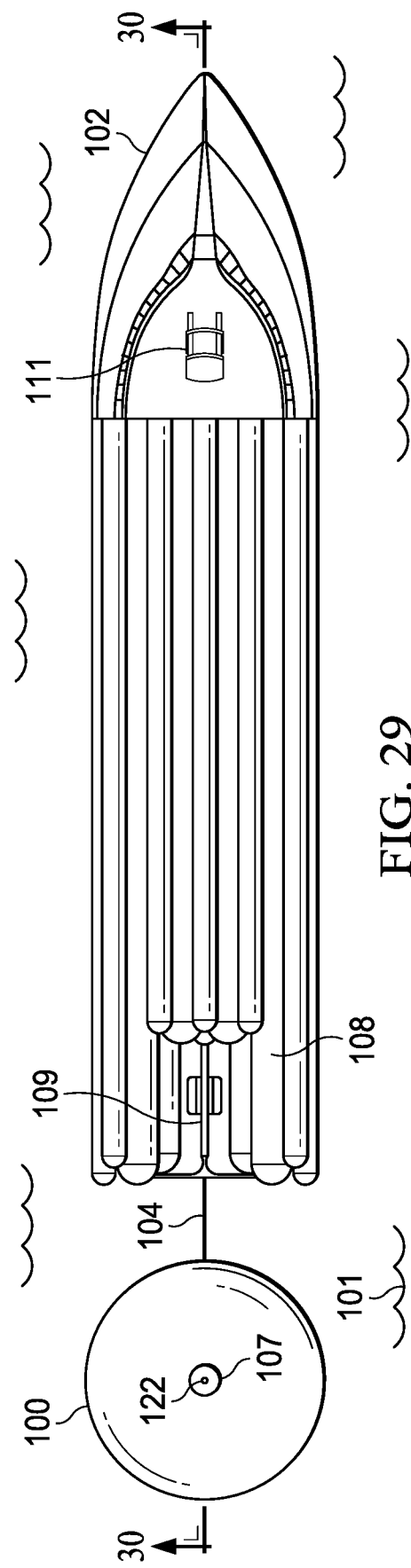
FIG. 29 shows a top-down view of an embodiment of the present disclosure comprising a hydrogen vessel fluidly connected to a hydrogen-producing wave energy converter (WEC) by a hydrogen transfer hose and its attached hose connection ROV.

FIG. 29 shows a top-down view of an embodiment of the present disclosure comprising a hydrogen vessel 102 fluidly connected to a hydrogen-producing wave energy converter (WEC) by a hydrogen transfer hose 104 and its attached hose connection ROV 103. This figure is similar to FIG. 3, except that the WEC is shown very near to the hydrogen vessel in order to facilitate the description and explanation of the transfer of hydrogen from the WEC to the hydrogen vessel, and the transfer of freshwater from the hydrogen vessel to the WEC. In practice and/or normal operations, it would be unwise to attempt such a transfer of hydrogen or water when a hydrogen vessel and WEC are so near to one another as this may result in a collision.

Figure 30:
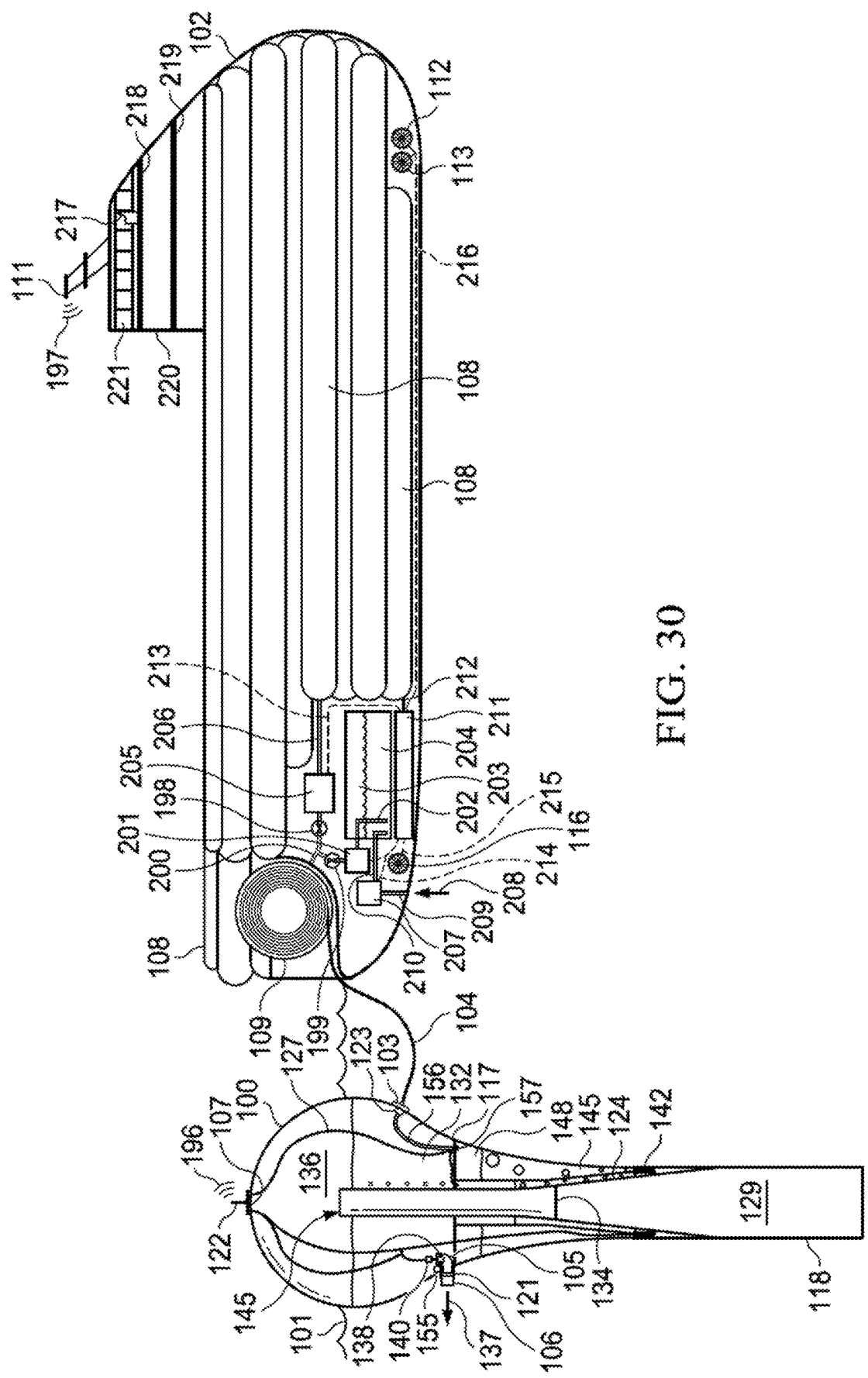
FIG. 30 shows a side sectional view of an embodiment of the present disclosure comprising a hydrogen vessel fluidly connected to a hydrogen-producing wave energy converter (WEC) by a hydrogen transfer hose and its attached hose connection ROV.

FIG. 30 shows a side sectional view of an embodiment of the present disclosure comprising a hydrogen vessel 102 fluidly connected to a hydrogen-producing wave energy converter (WEC) by a hydrogen transfer hose 104 and its attached hose connection ROV 103. The sectioned embodiment of the hydrogen-producing WEC device of FIG. 14 is identical to the embodiments of the hydrogen-producing WEC device illustrated in FIGS. 3 and 29, and wherein the vertical section plane is specified in FIG. 29 with the section taken across line 30-30.

A hydrogen-producing WEC device 100 of the present disclosure will, over time, in response to wave action and its energizing of an internal electrolyzer, tend to produce and accumulate hydrogen gas 148, typically compressed, within its hydrogen reservoir 145. A hydrogen vessel 102 of the present disclosure will periodically visit the WEC device and connect to it via its hose connection ROV 103, and the hydrogen transfer hose 104 attached thereto. After connecting to the WEC device, the hydrogen vessel will engage and/or actuate a compressor and/or pump on board the hydrogen vessel so as to pull a portion of the compressed hydrogen gas 148, stored within the WEC device, to the hydrogen vessel and thereafter to push that retrieved and/or suctioned hydrogen gas into one or more of the plurality of pressurized hydrogen storage tanks, e.g., 108, on the hydrogen vessel.

After the transfer of hydrogen gas from the WEC device 100 to the hydrogen vessel 102 is complete, the hydrogen vessel will activate a water pump and thereby pump fresh- and/or solute-free water from a reservoir of freshwater on board the hydrogen vessel to and into the hydrogen reservoir 145 within the WEC device, thereby replenishing its reservoir of freshwater with which it may continue to electrolyze water and produce additional portions of hydrogen gas 148.

After completing the transfer of a sufficient volume of freshwater to the WEC device, the water pump is turned off, the hydrogen transfer hose 104 is retracted and rewound around the hydrogen transfer hose drum 109, with the retraction of the hydrogen transfer hose being facilitated by the complementary thrust and steering provided by the hose connection ROV 103.

A hydrogen-producing WEC device 100 of the present disclosure moves up and down in response to waves passing across the surface 101 of a body of water on which the WEC device floats. As it moves and/or oscillates vertically water 129 entrained within the water tube 118 of the WEC device moves up and down. Occasionally and/or periodically the water 129 within the water tube moves upward within the water tube with enough speed and/or momentum such that when it encounters and/or enters the constricted portion of the water tube, it is sufficiently accelerated upward so that a portion of that accelerated water is ejected from the upper mouth 145 of the water tube, thereby entering the first water reservoir 132 of the WEC device.

As a result of a pressurized pocket of air 136 trapped within the hollow buoy 117 with the water 132 of the first water reservoir, the pressure of the water 132 within the first water reservoir amplifies and/or increases the effective head pressure of that water with respect to the water 101 outside the WEC device. Therefore, water 132 flowing into and out of the effluent aperture, port, pipe, and/or channel 105 of the WEC device transfers a substantial amount of energy to the water turbine 138 positioned within that effluent pipe. As a result of effluent-induced rotations of the water turbine, an operably connected generator 140 produces electrical power.

A portion of the electrical power produced by the generator 140 of the WEC device is used to energize an electrolyzer 142 which therefore electrolyzes freshwater within the hydrogen reservoir 145 of the WEC device resulting in the production of hydrogen gas that tends to collect in a pocket at an upper end of the hydrogen reservoir. Since the hydrogen reservoir is nominally sealed, the production of each new portion of hydrogen gas tends to increase the pressure of the hydrogen gas 148 trapped at the top of the hydrogen reservoir. Though the production of hydrogen gas results from the dissolution of water molecules which tends to reduce the volume of water within the hydrogen reservoir over time, the gaseous nature of the hydrogen gas produced tends to result in a substantial amount of pressure within the gas so produced.

An embodiment of the present disclosure comprises a hydrogen reservoir and electrolyzer designed and intended to produce and trap hydrogen gas at a pressure that ranges from 1 bar to a maximum of 30 bar and/or 3,000 kPa. Other embodiments comprise, include, incorporate, and/or utilize hydrogen reservoirs and electrolyzers designed and intended to produce and trap hydrogen gas at different ranges of pressure, including, but not limited to, those producing and trapping hydrogen gas up to maximal pressures of 10 bar, 20 bar, 40 bar, 50 bar, 70 bar, 90 bar, 100 bar, 120 bar, 150 bar, 170 bar, and 200 bar.

In the absence of a removal of produced and accumulated hydrogen gas, and a replenishing of freshwater amenable to electrolysis, a WEC device of the present disclosure would be required to cease its production of hydrogen gas, thereby using all or most of the fluid energy (e.g. pressurized water) within its first water reservoir solely for propulsion as effluent (e.g. from which little if any energy has been removed by a resistive water turbine). Therefore, it is a nominal element of the present hydrogen production and distribution method that each WEC device is periodically visited by a hydrogen vessel to which a substantial portion of its accumulated hydrogen gas is transferred, and from which a portion of freshwater sufficient to support additional electrolysis is received.

When a WEC device is either storing a volume of hydrogen gas at the maximal volumetric capacity and pressure supported by, and/or characteristic of, the WEC device, or when a WEC device is expected to reach such a maximal quantity and pressure of hydrogen gas in the near future, the WEC device issues a signal 196 from its antenna 122 indicating and/or encoding its need for a hydrogen vessel, its geospatial coordinates, its direction and speed (and/or anticipated course), and the time at which it expects to have exhausted its capacity to produce and/or store additional hydrogen gas. The signal 196 may be directed to a satellite and therethrough to a remote command and control station (not shown).

The remote command and control station may respond to such a signal by scheduling a visit to the WEC device by a hydrogen vessel. The remote command and control station may transmit (e.g. via satellite) to the selected hydrogen vessel a signal indicating and/or encoding the time and geospatial coordinates at which it should rendezvous with the WEC device, as well as the amount of hydrogen gas it may expect to offload from the WEC device, and the amount of freshwater that the WEC device requires and which it may expect to transfer to the WEC device.

The remote command and control station may further respond to such a signal by transmitting (e.g. via satellite) to the WEC device a signal indicating and/or encoding the frequency on which it may directly contact the hydrogen vessel assigned to meet it, as well as the time and geospatial coordinates at which it should expect to rendezvous with the hydrogen vessel.

In an alternate embodiment of the present disclosure, rather than a remote command and control station coordinating the activities of a plurality of WEC devices and hydrogen vessels, each WEC device broadcasts its geospatial coordinates, its direction and speed, and its readiness to have its accumulated supply of hydrogen gas offloaded on a frequency common to one or more hydrogen vessels, and those hydrogen vessels act directly to determine individually or as a group which hydrogen vessel will rendezvous with a WEC device, as well as when and where such a rendezvous will occur.

When a hydrogen vessel 102 approaches the presumed location of a WEC device 100 it transmits a signal to the WEC device to request from the WEC device its current geospatial location and directional orientation, as well as to inform it of the current geospatial location, course, and speed, of the hydrogen vessel. As the hydrogen vessel approaches the WEC device, the hydrogen vessel and the WEC device periodically exchange signals informing each other of their current positions, directions, and speeds. And, when on its final approach to a WEC device, a hydrogen vessel will transmit to the WEC device a signal encoding a request for the WEC device to assume and maintain a particular directional orientation which will place its hydrogen port 123 in a favorable orientation with respect to the stern of the hydrogen vessel.

The hydrogen vessel 102 maneuvers itself so that its stern end is proximal to, and positioned towards, the respective WEC device 100. The hydrogen vessel then releases its hose connection ROV 103 from the vessel while also releasing the hydrogen transfer hose drum 109 so that it is free to unwind and thereby dispense, feed out, extend, and/or deploy, the hydrogen transfer hose 104 wound about it. The hose connection ROV 103 uses its thrusters (166 in FIG. 18) to pull the attached hydrogen transfer hose 104 toward the WEC device, and to eventually attach to the hull 117 of the WEC device using its electromagnets 173.

An embodiment of the present disclosure incorporates, includes, and/or utilizes, a hose connection ROV 103 whose thrusters, electromagnets, and other components are controlled autonomously by a computational control system (not shown) embedded within and/or on the hose connection ROV. The ROV's autonomous control system is provided information and/or data regarding the relative position of the respective WEC device, and the relative position of the hose connection ROV (e.g. as determined by the length of hydrogen transfer hose 104 deployed, and visual tracking data obtained from video systems and/or cameras on board the hydrogen vessel) in order to facilitate its localization, discovery, and/or targeting of the WEC device, and the eventual union of the ROV with the WEC device.

An embodiment of the present disclosure incorporates, includes, and/or utilizes, a hose connection ROV 103 whose thrusters, electromagnets, and other components are controlled autonomously by a computational control system (not shown) embedded within and/or on the hydrogen vessel 102. The hydrogen vessel's autonomous ROV control system is provided information and/or data regarding the relative position of the respective WEC device, and the relative position of the hose connection ROV (e.g. as determined by the length of hydrogen transfer hose 104 deployed, and visual tracking data obtained from video systems and/or cameras on board the hydrogen vessel) in order to facilitate its localization, discovery, and/or targeting of the WEC device, and the eventual union of the ROV with the WEC device.

An embodiment of the present disclosure incorporates, includes, and/or utilizes, a hose connection ROV 103 whose thrusters, electromagnets, and other components are controlled autonomously by a computational control system (not shown) embedded within and/or on the WEC device 100. The WEC device's autonomous ROV control system is provided (e.g. by encoded radio signals) information and/or data regarding the relative position of the respective WEC device, and the relative position of the hose connection ROV (e.g. as determined by the length of hydrogen transfer hose 104 deployed, and visual tracking data obtained from video systems and/or cameras on board the hydrogen vessel) in order to facilitate its localization, discovery, and/or targeting of the WEC device, and the eventual union of the ROV with the WEC device.

An embodiment of the present disclosure incorporates, includes, and/or utilizes, a hose connection ROV 103 whose thrusters, electromagnets, and other components are controlled by a human operator on board the hydrogen vessel 102. The human operator is able to utilize information and/or data regarding the relative positions of the respective WEC device and the the hose connection ROV to assist him or her in directing the ROV to the WEC device.

An embodiment of the present disclosure incorporates, includes, and/or utilizes, a hose connection ROV 103 whose thrusters, electromagnets, and other components are controlled by a human operator located at a remote command and control station, and linked to the sensors and/or cameras on board the WEC device, the ROV, and the hydrogen vessel, as well as being linked to the thrusters, electromagnets, and other components of the ROV, by radio and/or satellite signals exchanged between the remote command and control station and the WEC device, the ROV, and the hydrogen vessel.

An embodiment of the present disclosure incorporates, includes, and/or utilizes, a hose connection ROV 103 that incorporates, includes, and/or utilizes, an acoustic transducer (speaker) that emits periodic bursts of sound at one or more specific frequencies. Each WEC device in this embodiment contains an array of microphones. The differences between the times at which the ROV emits acoustic pulses (as known to the human and/or autonomous controller of the ROV) and the times at which each microphone on the WEC device detects those pulses allows the human and/or autonomous controller of the ROV to determine with some degree of accuracy the position of the ROV with respect to the WEC device and facilitates the direction and/or steering of the ROV toward the WEC device, and, in particular, toward the WEC device's hydrogen port 123.

An embodiment of the present disclosure incorporates, includes, and/or utilizes, a WEC device 100 that incorporates, includes, and/or utilizes, one or more acoustic transducers (speakers) that emit periodic bursts of sound at one or more specific frequencies. Each hose connection ROV 103 in this embodiment contains at least one microphone with which it can detect the acoustic pulses emitted by the WEC device. The differences between the times at which the ROV detects the acoustic pulses emitted by the WEC device (as known to the human and/or autonomous controller of the ROV via encoded radio signals transmitted by the WEC device) and the times at which the microphone on the WEC device detects each of those WEC-device-location-specific pulses allows the human and/or autonomous controller of the ROV to determine with some degree of accuracy the position of the ROV with respect to the WEC device and facilitates the direction and/or steering of the ROV toward the WEC device, and, in particular, toward the WEC device's hydrogen port 123.

Similarly, an embodiment of the present disclosure incorporates, includes, and/or utilizes, a WEC device 100 and a hose connection ROV 103, in which one of the WEC device and hose connection ROV incorporates, includes, and/or utilizes, acoustic transducers, and the other of the WEC device and hose connection ROV incorporates, includes, and/or utilizes, one or more microphones, so that periodic and/or continuous acoustic signals (e.g., frequency-specific, volume-specific, and/or modulation-specific acoustic signals) emitted, produced, and/or issued, by one and detected by the other facilitate the movements of the hose connection ROV toward the hydrogen port 123 of the WEC device.

An embodiment of the present disclosure incorporates, includes, and/or utilizes, a hydrogen vessel that incorporates, includes, and/or utilizes, two or more hose connection ROVs 103, and corresponding hydrogen transfer hoses 104, enabling it to connect to a single WEC device 100 at two or more hydrogen ports 123, to connect to two or more WEC devices at the same time, and/or to remain operational even in the event that a first hose connection ROV and/or its attached hydrogen transfer hose fails and/or becomes inoperable.

An embodiment of the present disclosure incorporates, includes, and/or utilizes, a hose connection ROV 123 that uses thrust produced by its thrusters 166 (e.g. the same thrust that the ROV uses to propel itself from its respective hydrogen vessel to a WEC device) to hold itself against submerged portions of the hull of a WEC device instead of, or in addition to, electromagnets 173.

After its attachment to the hull 117 of a WEC device, the hose connection ROV 103 moves across the hull using its omni-directional wheels 168 while maintaining a translatable connection to the hull using its electromagnets 173 (and/or using thrust produced by its thrusters 166). The ROV moves across the hull of a WEC device in order to find, and until it finds the hydrogen port 123 of the WEC device. The ROV positions itself and its female dry disconnect 177 connector directly over the male dry disconnect connector of the WEC device's hydrogen port. When properly positioned over a hydrogen port, the controller of the ROV (whether human or autonomous) activates and/or actuates the a linear actuator (not shown) thereby causing the female dry disconnect of the ROV to be extended through the aperture at the center of the shock-absorbing suspension stage 174 of the ROV, and thereby engaging and/or connecting the female dry disconnect of the ROV to the complementary male dry disconnect of the hydrogen port of the WEC device.

During the interconnection of a hydrogen vessel with a WEC device, the hydrogen vessel uses its forward 114 and 115 and transverse (through-hull) thrusters 112, 113, and 116, to maintain an approximately constant distance from, and orientation with respect to, the WEC device. Similarly, the WEC devices uses its turbine effluent 137, and its rudder 106, to maintain an approximately constant distance from, and orientation with respect to, the hydrogen vessel. The hydrogen vessel and WEC device coordinate their station-keeping maneuvers through an exchange of encoded radio transmissions 196 and 197.

After its connection of the WEC device's male and the hose connection ROV's 103 female dry disconnects to form a fluid connection between the hydrogen vessel 102 and the WEC device's hydrogen reservoir 145, the hydrogen vessel transmits 197 an encoded signal to the WEC device requesting that it open its hydrogen-release valve 157 thereby fluidly connecting the pressurized hydrogen gas 148 within the hydrogen reservoir to the WEC device's hydrogen effluent pipe 156.

In preparation for a receipt of a portion of pressurized hydrogen gas from the WEC device 100, the hydrogen vessel 102 closes its hydrogen pump valve 198 and opens its water pump valve 199. The pressurized hydrogen gas 148 is no able to forcefully push its way from the hydrogen reservoir 145, through the hydrogen effluent pipe 156, through the hydrogen transfer hose 104, and into the hydrogen intake pipe 200. Due to a prior transfer of freshwater to a different WEC device, there may be a quantity of freshwater within the hydrogen transfer hose at the time that the hydrogen gas begins pushing its way through the various hoses, valves, and pipes on its way to the hydrogen vessel. Therefore, the water pump valve 199 has been opened and the initial influx of fluid from and/or through the hydrogen intake pipe 200 which may be largely or entirely water is directed through the water pump 201, and through the water pump intake pipe 202, into the hydrogen vessel's water reservoir 203 where any water will be returned to the water reservoir, and any hydrogen gas will be added to the pocket of hydrogen gas 203 above the water 204 (thereby tending to pressurize the contents of the water reservoir 203).

When a sensor (not shown) within and/or connected to the hydrogen intake pipe 200 determines that no more water is flowing into the water reservoir, the hydrogen-vessel controller (not shown) closes the water pump valve 199 and opens the hydrogen pump valve 198. At this point, the pressure of the hydrogen gas 203 within the water reservoir 204 should equal the pressure of the hydrogen gas originating from the WEC device.

After opening the hydrogen pump valve, the hydrogen-vessel controller allows pressurized hydrogen gas 148 from the hydrogen reservoir 145 of the WEC device to flow passively through the hydrogen pump 205, and through the hydrogen pump effluent pipe 206, being driven by the greater pressure of that hydrogen gas than the pressure of the hydrogen gas already stored within the hydrogen storage tanks 108 of the hydrogen vessel.

Because the evacuation of water from the hydrogen transfer hose 104 may not have been complete before the pressure of the contents of the water reservoir 203/204 equilibrated with the pressure of the hydrogen gas flowing from the WEC device to the hydrogen vessel, there may still be water within that hydrogen transfer hose, and a portion of that water may be transferred into the hydrogen storage tanks 108 of the hydrogen vessel. And, following the off-loading of hydrogen gas from the hydrogen storage tanks to a customer, any water present in the hydrogen storage tanks is purged by and/or through tank-specific valves (not shown) which are opened by the hydrogen-vessel controller.

When a sensor (not shown) within and/or connected to the hydrogen intake pipe 200 determines that the rate at which hydrogen gas is passively flowing into the hydrogen storage tanks 108 of the hydrogen vessel 102 reaches or falls below a threshold volumetric flow rate, the hydrogen-vessel controller (not shown) activates and/or actuates the hydrogen pump 205 thereby sucking, and/or drawing in by partial vacuum, additional hydrogen gas from the hydrogen intake pipe 200 and the hydrogen reservoir 145 to which it is ultimately connected. The hydrogen gas drawn in by the hydrogen pump 205 is driven, by pressure, into and through the hydrogen pump effluent pipe 206, and therethrough into the hydrogen storage tanks 108 of the hydrogen vessel.

When a sensor (not shown) on the WEC device 100 signals that the pressure of the hydrogen gas 148 remaining within the hydrogen reservoir 145 has reached, and/or fallen below, a threshold pressure, and/or when a sensor (not shown) on the hydrogen vessel 102 signals that the pressure and/or flow rate of hydrogen gas passing through the hydrogen intake pipe 200 has reached, and/or fallen below, a threshold pressure and/or flow rate, then the hydrogen-vessel controller (not shown) closes the hydrogen pump valve 198 and opens the water pump valve 199.

If the depressurized hydrogen gas remaining within the hydrogen transfer hose 104 is of a sufficiently low-pressure (as measured by a sensor not shown) water 204 within the water reservoir 203 will passively flow into the water pump intake pipe 202, through the water pump 201, the water pump valve 199, the hydrogen intake pipe 200, the hydrogen transfer hose 104, the hydrogen port 123, the hydrogen effluent pipe 156, the hydrogen-release valve 157, and therethrough enter the hydrogen reservoir 145, thereby replenishing the volume and/or supply of freshwater therein.

If the gas pressure within the hydrogen transfer hose 104 is to high to provide a sufficiently rapid passive movement, transfer, and/or flow of water 204 from the hydrogen vessel's water reservoir 203 into the WEC device's hydrogen reservoir 145, then the hydrogen-vessel controller (not shown) activates and/or actuates the water pump which then draws water 204 from the water reservoir 203 through water pump intake pipe 202, and pumps it at an increased pressure into the water pump valve 199, and into and through the hydrogen intake pipe 200 where it then flows into the hydrogen reservoir 145 in the WEC device.

When a sensor (not shown) on the WEC device 100 signals that the volume, mass, and/or amount, of water within the hydrogen reservoir 145 has reached, and/or risen above, a threshold level, then the WEC device transmits an encoded signal 196 to the hydrogen vessel which then turns off the water pump 201 and closes the water pump valve 199.

When the hydrogen-vessel controller (not shown) has turned off the water pump 201 and closed the water pump valve 199, then the controller transmits an encoded signal 197 to the WEC device which then closes the hydrogen-release valve 157.

Following the completion of the hydrogen-offloading and water-replenishment process, and the closing of the valves opened during that process, the hose connection ROV controller (not shown) signals the hose connection ROV 103 to release its magnetic attachment to the hull 117 of the WEC device 100, engage its thrusters in a direction that will generate a thrust tending to propel the hose connection ROV toward the hydrogen vessel 102, thereby accelerating the separation of the hose connection ROV from the WEC device, and thereby tending to minimize the chance of a wave-induced collision between the separated hose connection ROV and the WEC device.

If the hydrogen-vessel controller (not shown) has determined, planed, and/or scheduled, the removal of hydrogen from another WEC device, then the hydrogen-vessel controller engages the forward thrusters 114 and 116, and the through-hull thrusters 112-113 and 116 (as needed for steering), in order to move and/or cruise to the geospatial location of the next WEC device that it will visit. In this case, where the hydrogen vessel 102 cruises away from a WEC device from which it has removed hydrogen, and cruises toward another WEC device from which it will remove hydrogen, then the hydrogen-vessel controller does not retrieve, rewind, and/or pull back, the hydrogen transfer hose 104 prior to, nor during, the cruising, and instead "drags" the deployed hydrogen transfer hose and its attached hose connection ROV 103, thereby saving the time and energy required to retrieve them and then redeploy them.

By contrast, if the hydrogen-vessel controller (not shown) has determined, planed, and/or scheduled, the transfer of its stored hydrogen to a customer, recipient, port, ship, submarine, and/or other vessel, and has therefore not determined, planed, and/or scheduled, the removal of hydrogen from another WEC device, then the hydrogen-vessel controller retrieves, rewinds, and/or pulls back, the hydrogen transfer hose 104 by engaging a motor (not shown) that rotates the hydrogen transfer hose drum 109 in a direction that tends to cause the hydrogen transfer hose to be pulled from the ocean 101. At the point that the hydrogen transfer hose has been fully retracted and rewound about the hydrogen transfer hose drum (to the maximum extent characteristic of the nominal operation of the hydrogen vessel 102), thereby pulling the hose connection ROV 103 to its nominal position at the stern of the hydrogen vessel, then the hydrogen-vessel controller engages the forward thrusters 114 and 116, and the through-hull thrusters 112-113 and 116 (as needed for steering), in order to move and/or cruise to the geospatial location of the intended, designated, prospective, targeted, and/or specified customer, recipient, port, ship, submarine, and/or other vessel to which it will transfer a portion of its hydrogen.

While the hydrogen transfer hose 104 is being retracted and/or retrieved, the hose connection ROV 103 attached to its distal end is signaled to generate thrust in a manner, mode, and/or pattern, which tends to align the hydrogen transfer hose behind the hydrogen vessel 102 and which tends to maintain a tension in the hydrogen transfer hose, thereby facilitating the retrieval, rewinding, and/or retraction of the hydrogen transfer hose.

In an embodiment of the present disclosure, the hydrogen-vessel controller (not shown) causes the hydrogen vessel 102 to retract its hydrogen transfer hose 104 and attached hose connection ROV 103 following the completion of each transfer of hydrogen and fresh water between the respective hydrogen vessel and a respective WEC device prior to and/or during its cruising to any new geospatial location, whether that of another WEC device, or that of a customer, recipient, port, ship, submarine, and/or other vessel, to which it will transfer a portion of its hydrogen.

Whenever the hydrogen-vessel controller (not shown) determines (e.g. in response to a signal from a sensor) that the level, volume, and/or mass of fresh water (e.g. solute-free water) 204 stored within the hydrogen vessel's water reservoir 203 is at or below a threshold level, volume, and/or mass, and the hydrogen vessel 102 is not actively engaged in the transfer of hydrogen from a WEC device or the transfer of freshwater to a WEC device, then the hydrogen-vessel controller activates, operates, actuates, and/or energizes, a desalination mechanism, module, and/or device 207.

When activated, operated, and/or energized, the desalination mechanism 207 draws 208 water from the body of water 101 on which the hydrogen vessel 102 floats into and through a desalination intake pipe 209 into the desalination mechanism where its salts and other solutes are removed. The desalinated water produced and/or isolated by the desalination mechanism is pumped by the desalination mechanism through a freshwater pipe 210 into the hydrogen vessel's water reservoir 203 thereby increasing the level, volume, and/or mass of fresh water 203 within that reservoir 204.

When the hydrogen-vessel controller (not shown) determines (e.g. in response to a signal from a sensor) that the level, volume, and/or mass of fresh water 204 within the hydrogen vessel's water reservoir 203 has increased to or above a threshold level, volume, and/or mass, or that the hydrogen vessel 102 is ready to begin the transfer of hydrogen from a WEC device or the transfer of freshwater to a WEC device, then the hydrogen-vessel controller deactivates, and/or de-energizes, the desalination mechanism, module, and/or device 207.

Concentrated brine and/or other waste products produced by the desalination mechanism 207 during its desalination of water is returned to the body of water 101 on which the hydrogen vessel 102 floats through desalination intake pipe 209. The desalination mechanism of an embodiment of the present disclosure rinses out its store, cache, and/or tank containing concentrated brine and/or solute solution by rinsing it out with a portion of the desalinated water 204 stored in the water reservoir 203 of the respective hydrogen vessel.

A hydrogen-vessel controller (not shown) of an embodiment of the present disclosure preferentially activates, energizes, and operates its respective desalination mechanism 207 while cruising to, from, and/or between WEC devices, rather than while cruising to an intended, designated, prospective, targeted, and/or specified customer, recipient, port, ship, submarine, and/or other vessel to which it will transfer a portion of its hydrogen.

A hydrogen-vessel controller (not shown) of an embodiment of the present disclosure preferentially fills, replenishes, and/or receives its store, cache, and/or supply, of freshwater from a port facility, ship, and/or other recipient, to which it transfers a portion of its stored hydrogen.

The electronic and/or electrical components, modules, mechanisms, and/or parts, of the hydrogen vessel 102, as well as the electronic and/or electrical components, modules, mechanisms, and/or parts, of the hose connection ROV 103, receive electrical energy, and/or power, from a fuel cell 211 that receives hydrogen from one of the hydrogen vessel's plurality of pressurized hydrogen storage tanks 108 via a fuel-cell hydrogen intake pipe 212. The freshwater produced by the fuel cell during and/or as a result of its consumption of hydrogen is transferred and/or added to the hydrogen vessel's water reservoir 203 by a pump and a pipe not shown.

Electronic and/or electrical components, modules, mechanisms, and/or parts, of the hydrogen vessel 102 that receive and/or draw electrical energy and/or power from the fuel cell 211 include, but are not limited to: the hydrogen pump 205 (via electrical conductor, wire, and/or cable 213); the water pump 201 and the desalination mechanism 207 (via electrical conductor, wire, and/or cable 214); the stern through-hull thruster 116 (via electrical conductor, wire, and/or cable 215); the bow through-hull thrusters 112 and 113 (via electrical conductor, wire, and/or cable 216); the hose connection ROV 103, and the electromagnets (173 in FIG. 19), thrusters (166 in FIG. 19), and bidirectional motors (172 in FIG. 19) therein (via an electrical conductor, wire, and/or cable, that is not shown and is embedded within the hydrogen transfer hose 104); and, via electrical conductors, wires, and/or cables, that are not shown: the forward through-hull thrusters (114 and 115 in FIG. 6); the motor (not shown) which rotates the hydrogen transfer hose drum 109 in both winding and unwinding directions; the hydrogen pump valve 198; the water pump valve 199; the hydrogen-vessel's operational controls and/or console 217 (positioned on a second floor and/or deck 218, located above a first floor and/or deck 219, within the operational cabin 220 of the hydrogen vessel); and, the radio and/or satellite transceiver 111 attached to an upper surface of the operational cabin of the hydrogen vessel, above a panel of windows, e.g. 221, along the side of the upper deck 218 of the operational cabin).

Figure 31:
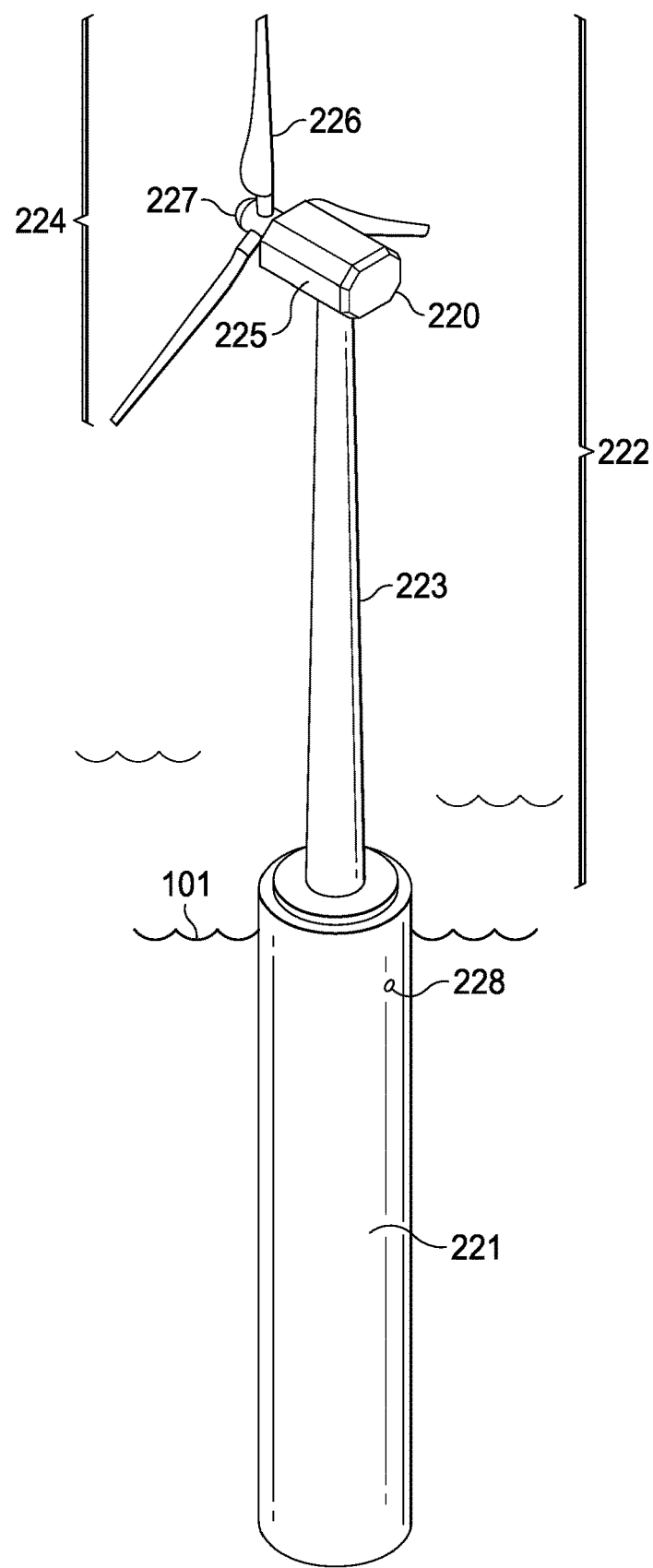
FIG. 31 shows a perspective side view of a hydrogen-producing floating wind turbine (FWT) device of an embodiment of the present disclosure.

FIG. 31 shows a perspective side view of a hydrogen-producing floating wind turbine (FWT) device 220 of an embodiment of the present disclosure. The FWT device is comprised of a lower buoyant spar buoy 221, and an upper wind turbine 222. The wind turbine is rotatably connected and/or mounted to an upper end of a tower 223, a lower end of which is fixedly attached to an upper portion of the buoyant spar buoy. The wind turbine is comprised of a turbine rotor 224 which is rotatably connected to a turbine nacelle 225. The turbine rotor is comprised of a plurality of turbine blades 226, each of which is connected to a hub 227 of the turbine rotor.

When floating adjacent to an upper surface 101 of a body of water over which winds blow, currents of air tend to flow through the turbine blades 226 and/or swept area of the turbine rotor 224, thereby tending to cause the turbine rotor and its hub to rotate, which, in turn, tends to cause a generator (not visible) within the wind turbine's nacelle 225 to produce electrical energy.

As a consequence of its relatively small waterplane area (i.e. with respect to a horizontal cross-sectional plane at the surface 101 of the body of water on which it floats), the spar buoy 221 of the FWT device 220 does not tend to exhibit significant vertical movements or motions in response to the heave of passing waves. Similarly, as a consequence of its relatively small lateral area (i.e. with respect to a vertical cross-sectional plane), the spar buoy of the FWT device does not tend to exhibit significant movements or tilting in response to the surge of passing waves.

The FWT device 220 of the present disclosure has a hydrogen port 228 which serves a similar function to the hydrogen port (123 of FIG. 11) of the WEC device illustrated in FIGS. 11, and 13-18.

Figure 32:
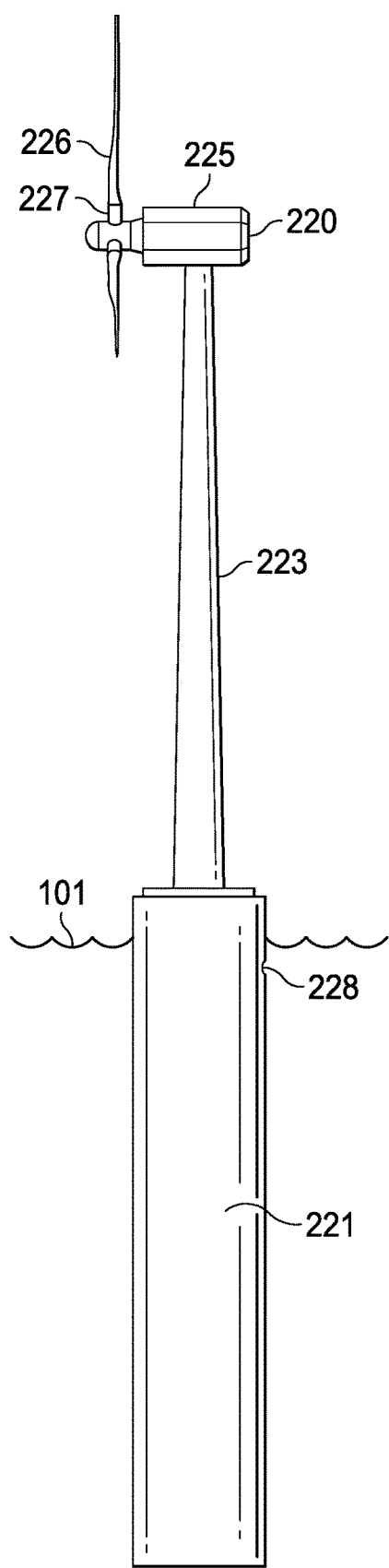
FIG. 32 shows a side view of the same hydrogen-producing floating wind turbine (FWT) device of the present disclosure illustrated in FIG. 31.

FIG. 32 shows a side view of the same hydrogen-producing floating wind turbine (FWT) device 220 of the present disclosure that is illustrated in FIG. 31.

Figure 33:
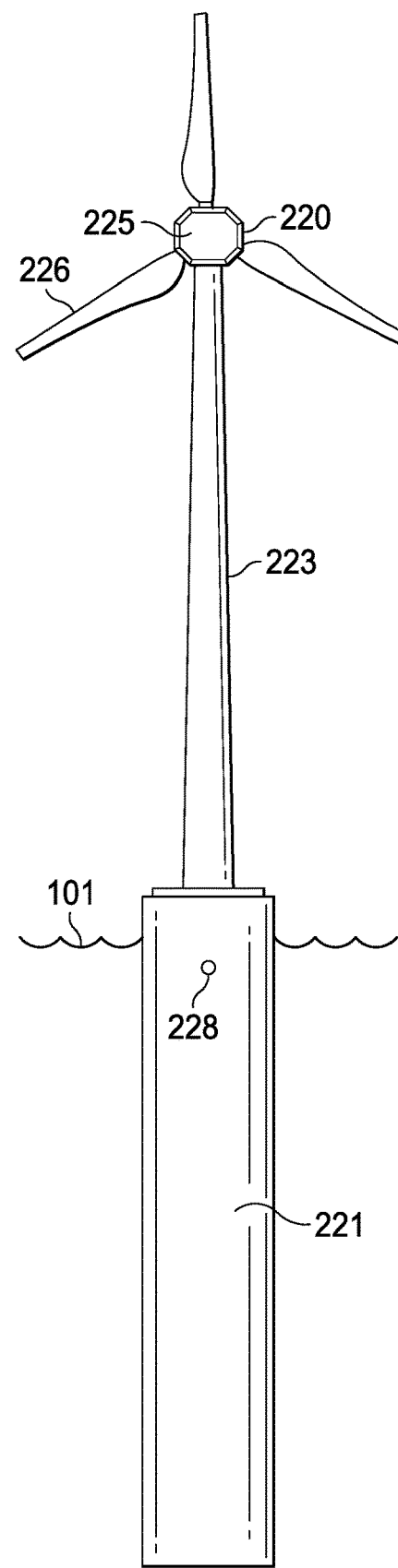
FIG. 33 shows a side view of the same hydrogen-producing floating wind turbine (FWT) device of the present disclosure that is illustrated in FIGS. 31 and 32.

FIG. 33 shows a side view of the same hydrogen-producing floating wind turbine (FWT) device 220 of the present disclosure that is illustrated in FIGS. 31 and 32.

Figure 34:
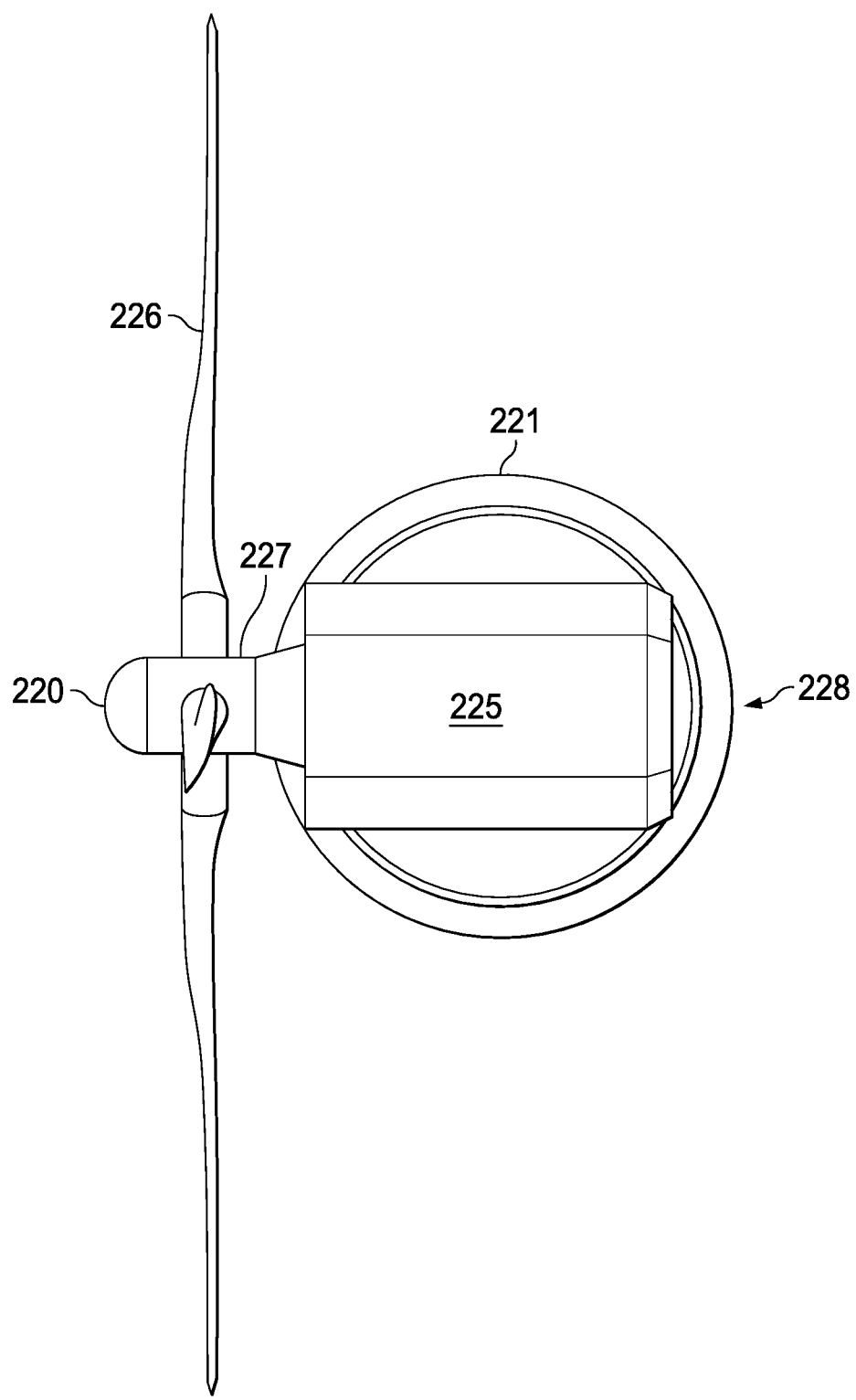
FIG. 34 shows a top-down view of the same hydrogen-producing floating wind turbine (FWT) device of the present disclosure that is illustrated in FIGS. 31-33.

FIG. 34 shows a top-down view of the same hydrogen-producing floating wind turbine (FWT) device 220 of the present disclosure that is illustrated in FIGS. 31-33.

Figure 35:
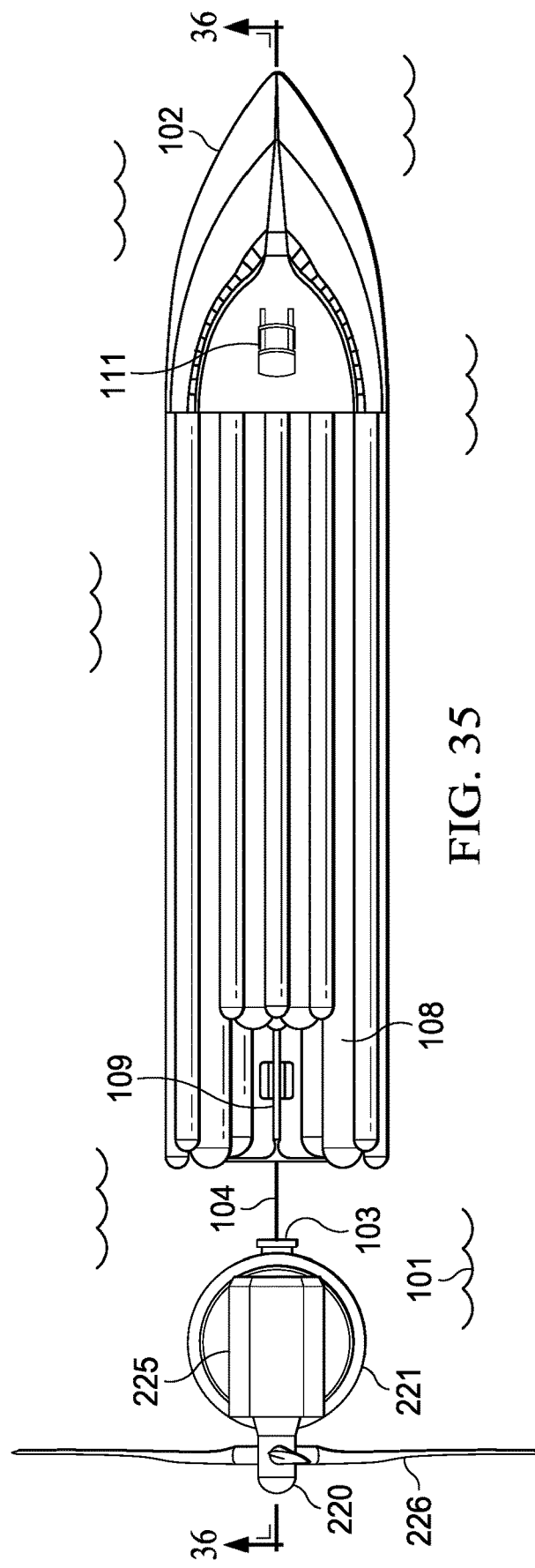
FIG. 35 shows a top-down view of an embodiment of the present disclosure comprising a hydrogen vessel fluidly connected to a hydrogen-producing floating wind turbine (FWT) device by a hydrogen transfer hose and its attached hose connection ROV.

FIG. 35 shows a top-down view of an embodiment of the present disclosure comprising a hydrogen vessel 102 fluidly connected to a hydrogen-producing floating wind turbine (FWT) device 220 by a hydrogen transfer hose 104 and its attached hose connection ROV 103. The hose connection ROV, and the hydrogen transfer hose, are operatively connected to the hydrogen port (228 of FIG. 33) of the FWT device.

Figure 36:
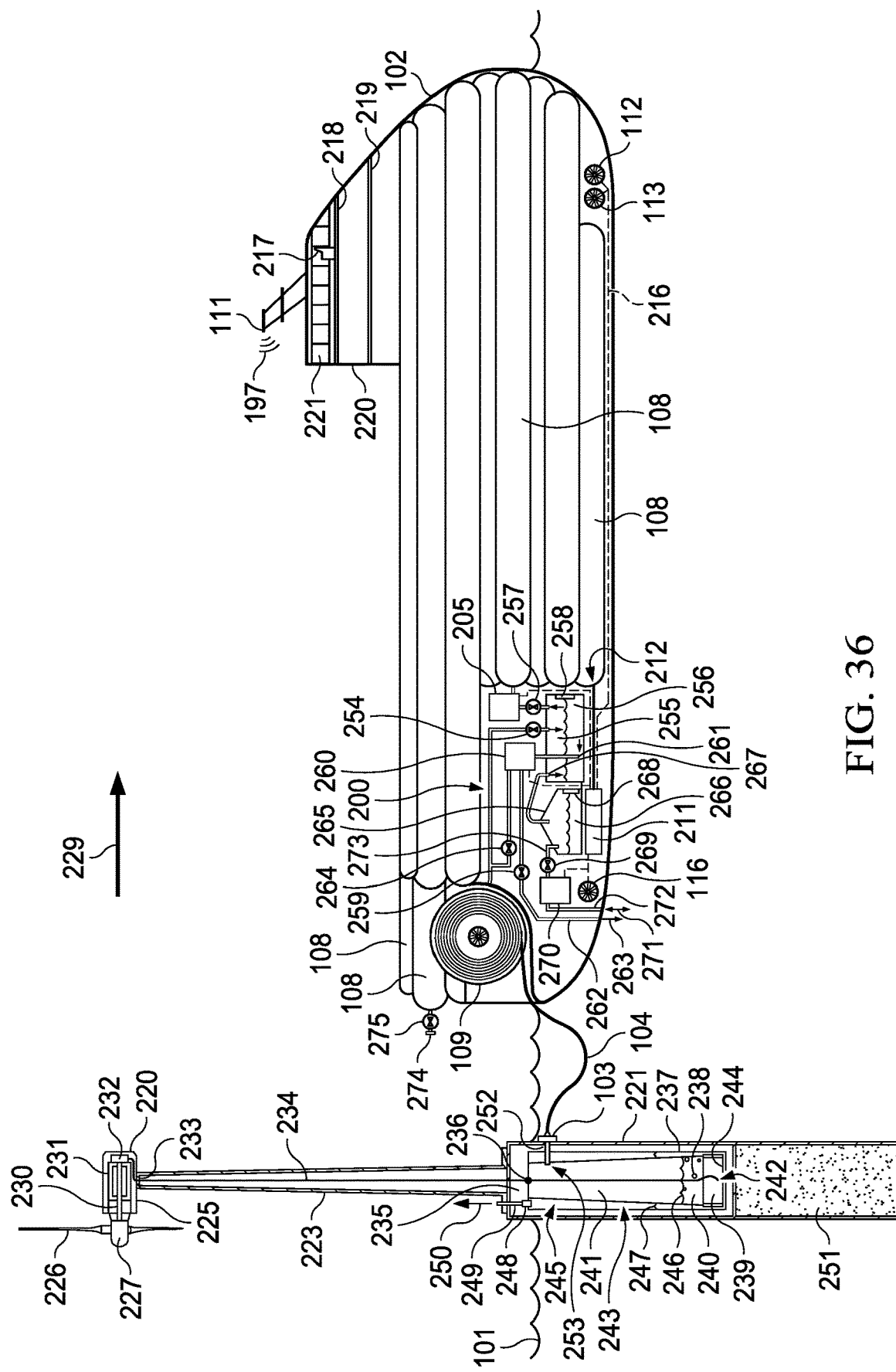
FIG. 36 shows a side sectional view of an embodiment of the present disclosure comprising a hydrogen vessel fluidly connected to a hydrogen-producing floating wind turbine (FWT) device by a hydrogen transfer hose and its attached hose connection ROV.

FIG. 36 shows a side sectional view of an embodiment of the present disclosure comprising a hydrogen vessel 102 fluidly connected to a hydrogen-producing floating wind turbine (FWT) device by a hydrogen transfer hose 104 and its attached hose connection ROV 103. The hydrogen-producing FWT device illustrated in FIGS. 35 and 36 is identical to the hydrogen-producing FWT device illustrated in FIGS. 31-34, and the vertical section plane of FIG. 36 is specified in FIG. 35 with the section taken across line 36-36. The hydrogen vessel illustrated in FIGS. 35 and 36 is similar to the hydrogen vessel illustrated in FIGS. 1-7 and 29-30, however the hydrogen vessel illustrated in FIG. 36 comprises an alternate management and transfer mechanism and/or architecture for the hydrogen and water processed by and/or through the hydrogen vessel.

As wind blows 229 across and/or over an upper surface 101 of a body of water on which floats an FWT device 220, a portion of that wind flows through, and imparts energy to, the blades 226 of a wind turbine (222 of FIG. 31) thereby causing the wind turbine's rotor (224 of FIG. 31) and hub 227 to rotate. Rotation of the hub of the wind turbine causes an attached turbine shaft 230 to rotate, thereby transmitting rotational energy to a generator 231 positioned within the nacelle 225 of the wind turbine and operatively connected to the turbine hub by their shared turbine shaft. Electrical power produced by wind-turbine generator 231 is conditioned, altered, adjusted, changed, and/or modified, by a power-conditioning module 232 electrically connected to the generator.

In response to changes in the direction from which the wind 229 blows, the turbine's rotor (224 of FIG. 31) and its connected nacelle 225 rotate about a nacelle bearing 233 rotatably connecting the turbine nacelle to the wind turbine tower 223 so as to approximately align the turbine rotor's axis of rotation with the wind direction.

A portion of the electrical power produced by the wind turbine's generator 231, and conditioned by the wind turbine's power-conditioning module 232, is transmitted through an electrical cable 234 which passes through the wind turbine's hollow tower 223 and passes into a hollow upper portion 235 of the buoyant spar buoy 221 of the FWT device 220. The electrical cable then passes through, at plug 236, the wall of a pressurized hydrogen tank 237 and connects 242 to a water electrolyzer 239 within the hydrogen tank.

Electrical energy from the wind turbine's generator 231 and its power-conditioning module 232 is transmitted to the water electrolyzer 239 through electrical cable 234 via electrical connection and/or connector 242. And, in response to a transmission of electrical energy to the electrolyzer from the generator and the power-conditioning module, the water electrolyzer causes an electrical-energy-induced separation of molecules of liquid water which are stored in a reservoir 240 of water that surrounds the water electrolyzer thereby creating molecules of gaseous hydrogen which tend to rise as bubbles 238 to become trapped within a respective pocket 241 of compressed hydrogen.

An approximately cylindrical and/or frustoconical hydrogen-oxygen-separation tube 243 connects an upper edge and/or surface of the water electrolyzer 239 to a lower surface of an upper wall of the compressed hydrogen tank 237 thereby creating an approximately radially-symmetrical tubular hydrogen storage space, chamber, and/or compartment 241 into which hydrogen generated, and/or produced, by the water electrolyzer 239 at, along, and/or across an inner lateral surface and/or portion of the water electrolyzer, is accumulated, trapped, stored, and compressed (e.g. compressed through the continuous addition of hydrogen to a chamber of fixed volume).

Between the outer wall 243 of the hydrogen-oxygen-separation tube and the inner walls of the compressed hydrogen tank 237 is an approximately radially-symmetrical annular oxygen storage space, chamber, and/or compartment 245 into which oxygen generated, and/or produced, by the water electrolyzer 239 at, along, and/or across an outer lateral surface and/or portion of the water electrolyzer, is accumulated, trapped, stored, and compressed.

The lower edge of the cylindrically-arrayed water electrolyzer 239 constitutes a lower mouth and/or aperture of the hydrogen-oxygen-separation tube which is open at its bottom 244 and which causes, and/or results in, the tubular hydrogen storage chamber 241 being fluidly connected to the annular oxygen storage chamber 245 across and/or through that aperture. Therefore the pressure of the hydrogen and water within the hydrogen storage chamber tends to remain approximately equal to the pressure of the oxygen and water within the oxygen storage chamber.

In the illustrated embodiment, the volume of the oxygen storage chamber is less than the volume of the hydrogen storage chamber. Furthermore, for every molecule of oxygen gas produced by the water electrolyzer 239, two molecules of hydrogen gas are produced. Therefore, the gases produced and/or generated by the water electrolyzer result in unequal adjustments, changes, alterations, and/or movements in the levels 246 and 247, and/or upper surfaces, of the water within each respective storage chamber.

As the water electrolyzer 239 produces oxygen and hydrogen gases, the level 247 of the water within the oxygen storage chamber 245 tends to move down relative to the level 246 of the water within the hydrogen storage chamber 241. When and/or while a water-level sensor (not shown) within the oxygen storage chamber detects that the level 247 of the water within the oxygen storage chamber reaches a threshold level adjacent and/or equal to an upper edge of the water electrolyzer 239 then an oxygen release valve 248 opens allowing pressurized oxygen gas within the oxygen storage chamber 245 to enter and flow through an oxygen effluent pipe 249 and then and/or thereafter to enter and/or flow 250 into the atmosphere outside the the FWT device 220. In this way, oxygen produced by the water electrolyzer is incrementally and/or periodically released and/or purged from the oxygen storage chamber. While, by contrast, the hydrogen produced by the water electrolyzer is preserved, retained, accumulated, and/or stored within the hydrogen storage chamber until it is removed by a hydrogen vessel 102.

A negatively-buoyant weight, mass, and/or ballast material 251, i.e. material having a density greater than that of water, contributes to the displacement of the floating wind turbine's spar buoy 221, and, in combination with the buoyancy provided by the hollow portion 235 of the spar buoy, also provides vertical stability to the FWT device 220, thereby tending to preserve a favorable orientation of the FWT device which positions the wind turbine's rotor (224 of FIG. 31) at the maximum possible distance above, and away from, the surface 101 of the water on which the FWT device floats.

Periodically a hydrogen vessel 102 positions itself near to the FWT device 220 and directs its hose connection ROV 103 to propel itself through the body of water 101, on which the hydrogen vessel floats, to a position adjacent to the spar buoy 221 of the FWT device, and to then magnetically attach itself to an exterior of the hull of that spar buoy. After magnetically attaching to the hull of the FWT device, the hose connection ROV of the hydrogen vessel moves across the hull of the spar buoy and positions itself, and its female dry disconnect (177 in FIG. 20) above the hydrogen port (228 in FIGS. 31-34) of the FWT device, and a male dry disconnect 252 incorporated therein. After achieving a satisfactory relative position over and/or adjacent to the hydrogen port of the FWT device, the hose connection ROV extends its female dry disconnect onto, over, and/or around the male dry disconnect of the FWT device thereby fluidly connecting the hydrogen transfer hose 104 of the hydrogen vessel 102 to a hydrogen effluent pipe 253 in fluid communication with an interior of the hydrogen storage chamber 241 and the pressurized hydrogen therein.

After receiving a signal from a sensor on the hose connection ROV 103, and/or from the hose connection ROV controller (not shown), indicating that the hydrogen transfer hose 104 has been successfully fluidly-connected to the interior of the hydrogen storage chamber 241, and the pressurized hydrogen gas therein, the hydrogen-vessel controller (not shown) opens hydrogen intake valve 254 thereby permitting the fluid contents (gas and/or liquid) of the hydrogen transfer hose 104, and the hydrogen intake pipe 200, to flow into a water/hydrogen sump tank 255.

After removing, harvesting, extracting, and/or transferring, hydrogen gas from another FWT device prior to initiating the removal, harvesting, extraction, and/or transfer, of hydrogen gas from the FWT device 220 in FIG. 36, to which the hydrogen vessel 102 is connected, then the hydrogen transfer hose 104 will tend to contain water that was flowing through the hydrogen transfer hose at the time that the refilling and/or replenishing of the water reservoir 240 of the prior FWT device was halted. Therefore, when the removal, harvesting, extraction, and/or transfer of hydrogen gas from the currently fluidly-connected FWT device begins, a slug, measure, amount, volume, and/or mass, of water may be evacuated from, and/or flow out of, the hydrogen transfer hose before any of the pressurized hydrogen gas within the hydrogen storage chamber 241 of the currently fluidly-connected FWT device reaches the hydrogen vessel.

After hydrogen intake valve 254 is opened, the pressure of the pressurized hydrogen gas within the hydrogen storage chamber 241 of the fluidly-connected FWT device 220 will tend to push hydrogen gas from the hydrogen storage chamber into and through the hydrogen transfer hose 104, and into and through the hydrogen intake pipe 200. However, there will tend to be a slug, measure, amount, volume, and/or mass, of water that will first flow through the hydrogen transfer hose, and the hydrogen intake pipe. That initial slug of water (if any) will flow through hydrogen intake valve 254 and into the water/hydrogen sump tank 255 where it will augment and/or increase the volume and mass of the water 256 already stored, trapped, accumulated, and/or residing, therein.

After, or concurrent with, the opening of hydrogen intake valve 254, the hydrogen-vessel controller (not shown) opens the hydrogen-pump intake valve 257, positioned within the hydrogen-pump intake pipe (not labelled), thereby fluidly connecting the pocket 255 of hydrogen gas within the water/hydrogen sump tank 255/256 with one or more of the plurality of pressurized hydrogen storage tanks 108 onboard and/or within the hydrogen vessel 102. While and/or if the pressure of the hydrogen within the hydrogen storage chamber 241 of the FWT device 220 exceeds the pressure of the hydrogen within the one or more of the plurality of pressurized hydrogen storage tanks to which the hydrogen-pump intake valve is fluidly connected, then hydrogen gas will tend to passively flow from the hydrogen storage chamber of the FWT device, through the pocket of hydrogen gas within an upper portion 255 of the water/hydrogen sump tank, and into one or more of the plurality of pressurized hydrogen storage tanks to which the hydrogen-pump intake valve is fluidly connected.

On the other hand, when the pressure of the hydrogen within the hydrogen storage chamber 241 of the FWT device 220 equals or falls below the pressure of the hydrogen within the one or more of the plurality of pressurized hydrogen storage tanks to which the hydrogen-pump intake valve 257 is fluidly connected, then the hydrogen-vessel controller (not shown) will activate, actuate, energize, and/or start, a hydrogen pump 205 which will pull hydrogen gas (through a local reduction in the pressure of the hydrogen gas flowing through it) from the water/hydrogen sump tank 255, and thereby from the hydrogen storage chamber of the FWT device, and pump that hydrogen gas into one or more of the plurality of pressurized hydrogen storage tanks 108 to which it is fluidly connected.

A water-level sensor 258 measures the height of the water 256 within the water/hydrogen sump tank 255/256. When and while the water-level sensor signals to the hydrogen-vessel controller (not shown) that the level of the water within the water/hydrogen sump tank is too great (e.g. potentially allowing water 256 to enter the hydrogen-pump intake pipe and the hydrogen-pump intake valve 257, and through them to enter the hydrogen pump 205 and the pressurized hydrogen storage tanks 108 to which the hydrogen pump is connected) the hydrogen-vessel controller opens a water-pump discharge valve 259 and activates, actuates, energizes, and/or starts, a water pump 260.

While activated and pumping, the water pump 260 draws water 256 from the water/hydrogen sump tank 255/256 into and through water-pump intake pipe 261, pumps the water into and through water-pump discharge pipe 262, and water-pump discharge valve 259, thereby ejecting, transferring, and/or discharging 263 water from the water/hydrogen sump tank into the body of water 101 on which the hydrogen vessel 102 floats.

When the hydrogen-vessel controller (not shown) receives a signal from the hose connection ROV 103, from the hydrogen pump 205, and/or from a pressure sensor (not shown) connected to the hydrogen transfer hose 104, the hydrogen intake pipe 200, and/or any other channel, pipe, or conduit, through which flows hydrogen from the FWT device 220 to the pressurized hydrogen storage tanks 108 on the hydrogen vessel 102, then the hydrogen-vessel controller closes hydrogen-pump intake valve 257, and shuts off, stops, de-energizes, and/or deactivates, hydrogen pump 205. The hydrogen-vessel controller then, also, or after, closes hydrogen intake valve 254 thereby preventing a further flow of hydrogen and/or water into and/or out of the water/hydrogen sump tank 255/256.

After halting the transfer of hydrogen from the FWT device 220 to the hydrogen vessel 102, the hydrogen-vessel controller (not shown) opens water-pump effluent valve 264 thereby directing a portion of the water discharged and/or pumped by the water pump 260 into the hydrogen intake pipe 200, through which it flows into the hydrogen transfer hose 104 and the hydrogen effluent pipe 253, and is therethrough deposited into the hydrogen storage chamber 241 within the pressurized hydrogen tank 237 of the FWT device 220.

As pressurized hydrogen gas is removed from the hydrogen storage chamber 241 of the pressurized hydrogen tank 237 of the FWT device 220, the pressure of the oxygen gas within the oxygen storage chamber 245 will tend to respond to the removal of hydrogen gas, and the subsequent reduction in the pressure of that gas, by pushing the level 247 of water within the oxygen storage chamber 245 downward. However, as it does this, the water-level sensor (not shown) within the oxygen storage chamber will detect, likely many times during the evacuation of hydrogen gas, that the level 247 of the water within the oxygen storage chamber has reached the threshold level adjacent and/or equal to an upper edge of the water electrolyzer 239 resulting in an opening of the oxygen release valve 248, and a subsequent and/or consequent venting of a portion of the oxygen within the oxygen storage chamber to the air outside the FWT device, until the pressure and volume of the oxygen gas within the oxygen storage chamber has been reduced to a degree sufficient to raise the level 247 of the water within the oxygen storage chamber and keep it at or above the threshold water level.

A pressure sensor (not shown) reports and/or signals to the hydrogen-vessel controller the pressure of the hydrogen gas and water fluid mixture within the hydrogen intake pipe 200, which is also the pressure of the hydrogen gas remaining within the hydrogen storage chamber 241 of the FWT device 220, the hydrogen transfer hose 104, the hydrogen intake pipe 200, and/or any other channel, pipe, or conduit, through which hydrogen flows from the FWT device 220 to the hydrogen intake pipe 200. And, because the volume of oxygen within the oxygen storage chamber may be assumed and/or estimated to be bounded at a lower end by the threshold water level due to the anticipated nominal behavior of the water-level sensor (not shown) within the oxygen storage chamber and the consequent and/or resulting opening and closing of the oxygen release valve 248 during the evacuation of hydrogen gas from the hydrogen storage chamber 241, the pressure and volume of oxygen gas within the oxygen storage chamber may also be calculated and/or estimated.

By recording the pressure of the hydrogen gas and water fluid mixture within the hydrogen intake pipe 200 after cessation of the hydrogen gas transfer process, the hydrogen-vessel controller (not shown) may determine and/or estimate the pressure and volume of oxygen gas within the oxygen storage chamber 245, as well as the pressure of hydrogen gas within the hydrogen storage chamber 241 and within the various hoses, pipes, and channels fluidly connecting the hydrogen storage chamber to the hydrogen intake pipe 200. However, because the volume, mass, and/or amount of water within the hydrogen storage chamber, and within the various hoses, pipes, and channels fluidly connecting the hydrogen storage chamber to the hydrogen intake pipe, is not known, the hydrogen-vessel controller needs additional information in order to calculate, estimate, and/or determine the volume, amount, and/or number of moles, of hydrogen gas within the hydrogen storage chamber, and within the various hoses, pipes, and channels fluidly connecting the hydrogen storage chamber to the hydrogen intake pipe.

A flow and/or flow-rate sensor (not shown) reports and/or signals to the hydrogen-vessel controller (not shown) data which enables the hydrogen-vessel controller to calculate the amount of water pumped after any interval of water pumping by the water pump 260. A previous and/or prior calibration of the hydrogen vessel 102 and/or the hydrogen-vessel controller informs the hydrogen-vessel controller of the volume of the fluid flow channel connecting the water pump 260 to the hose connection ROV 103, i.e. the "pump-to-ROV fluid channel."

Before initiating the pumping of water by the water pump 260, the hydrogen-vessel controller (not shown) records the pressure of the hydrogen gas and water fluid mixture within the hydrogen intake pipe 200. And, after pumping a first amount, volume, mass, and/or measure of water equal to the pre-calibrated, known, assumed, and/or measured volume of the fluid flow channel connecting the water pump 260 to the hose connection ROV 103, thereby tending to evacuate from the pump-to-ROV fluid channel, and return to the hydrogen storage chamber 241 of the FWT device 220, any hydrogen gas within the pump-to-ROV fluid channel, thereby tending to ensure that the pump-to-ROV fluid channel is filled only with water, the hydrogen-vessel controller pumps an additional 1 cubic meter of water (an alternate embodiment pumps a different amount of additional water) into the hydrogen intake pipe, which would be expected to cause approximately 1 cubic meter of water to be deposited within, and/or added to, the water 240 already present within the pressurized hydrogen tank 237 of the FWT device 220.

By recoding the pressure of the hydrogen gas and water fluid mixture within the hydrogen intake pipe 200 both before and after pumping the first amount and additional 1 cubic meter of water, the hydrogen-vessel controller (not shown) is able to calculate the volume, amount, mass, and/or number of moles, of hydrogen gas present in the hydrogen storage chamber 241 after the pumping (which assumes that any hydrogen gas present within the various hoses, pipes, and channels fluidly connecting the hydrogen storage chamber to the hydrogen intake pipe has been forced by the pumping of water into the hydrogen storage chamber).

Therefore, after pumping the first amount and the additional 1 cubic meter of water, the hydrogen-vessel controller (not shown) is able to calculate the volumes and pressures of both the oxygen and hydrogen gases within the pressurized hydrogen tank 237 of the FWT device 220. In conjunction with its a prior knowledge of the volume of the pressurized hydrogen tank, this differential-pressure information then allows the hydrogen-vessel controller to calculate the volume of water within the pressurized hydrogen tank after the pumping of the first amount and additional 1 cubic meter of water.

The hydrogen-vessel controller (not shown) possesses, and/or is able to access, the nominal and/or preferred volume of water within the pressurized hydrogen tank 237 given its current pressure of hydrogen gas (e.g. lower hydrogen gas pressures will tend to be associated with greater initial volumes of water). After calculating, determining, and/or estimating, the current volume of water within the pressurized hydrogen tank 237 of the FWT device 220, the hydrogen-vessel controller calculates, determines, and/or estimates, the additional amount of water (if any) needed to increase the amount of water within the pressurized hydrogen tank to the nominal, preferred, required, and/or specified, level associated with the current pressure of the hydrogen gas therein. The hydrogen-vessel controller then reactivates, re-energizes, and/or re-starts, the water pump 260 and continues its operation until the flow and/or flow-rate sensor (not shown) reports and/or signals to the hydrogen-vessel controller data which indicates that the desired, nominal, requisite, and/or preferred, additional volume, mass, measure, amount, and/or portion of water has been added to the pressurized hydrogen tank of the FWT device.

After the desired, requisite, and/or preferred, additional volume, mass, measure, amount, and/or portion of water has been added to the pressurized hydrogen tank 237 of the FWT device 220, the hydrogen-vessel controller (not shown) deactivates, de-energizes, and/or stops, the water pump 260, and closes the water-pump effluent valve 264.

Most, if not all, electrical power consumed on the hydrogen vessel 102 is generated by a fuel cell 211 which receives a supply of hydrogen gas from a pressurized hydrogen storage tank 108 through a fuel-cell hydrogen intake pipe 212. As the fuel cell consumes hydrogen in order to generate electrical power, it tends to also generate heat. The fuel cell is able to conductively transfer a portion of the heat that it generates to a distillation chamber 265 where that added heat tends to promote the evaporation and/or boiling of desalinated water 266 therein.

The water vapor (indicated by squiggly lines above the water 266) tends to rise within the distillation chamber 265 and enter a cooling and/or condensation pipe 267 wherein the vapor tends to cool and condense into liquid water. The condensed liquid water, and/or condensate, tends to flow from the open end 267 of the condensation pipe and into the water/hydrogen sump tank 255/256 where it increases the volume, mass, and/or amount of water 256 therein.

When the water level sensor 258 signals to the hydrogen-vessel controller (not shown) that the level of fresh and/or solute-free water 256 within the water/hydrogen sump tank 255/256 is above a threshold level, then the hydrogen-vessel controller opens the water-pump discharge valve 259 and activates, actuates, energizes, and/or starts, the water pump 260 causing a portion of the water 256 within the water/hydrogen sump tank 255/256 to be discharged and/or ejected 263 into the body of water 101 on which the hydrogen vessel 102 floats.

When the hydrogen vessel 102 is not removing hydrogen gas from an FWT device 220, and a water level sensor 268 signals to the hydrogen-vessel controller (not shown) that the level of desalinated water 266 within the distillation chamber 265 is below a threshold level, then the hydrogen-vessel controller opens a desalinated-water valve 269, and starts, energizes, and/or activates a desalination module 270. The desalination module draws 271 in water (e.g. seawater) from the body of water 101 on which the hydrogen vessel 102 floats through a desalination intake pipe 272. It then desalinates that water and pumps the desalinated water into the distillation chamber 265 through the desalination effluent pipe 273 and through the desalinated-water valve connected thereto, thereby increasing the volume, mass, level, and/or amount of desalinated water within the distillation chamber 265.

When the water level sensor 268 signals to the hydrogen-vessel controller (not shown) that the level of desalinated water 266 within the water/hydrogen sump tank 255 is at or above a threshold level, then the hydrogen-vessel controller closes the desalinated-water valve 269, and it sends to the desalination module 270 a signal instructing the desalination module to purge the brine produced during its desalination operation by pumping that brine through desalination intake pipe 272 and ejecting it back into 271 the body of water 101 from which it was drawn, and after the desalination module has disposed of any such brine, to then signal the hydrogen-vessel controller which will then stop, halt, de-energize, and/or deactivate the desalination module.

After restoring the nominal volume, and/or amount of water to the pressurized hydrogen tank 237 of the FWT device 220, the hydrogen-vessel controller (not shown) signals the hose connection ROV 103 to detach from the hull of the FWT device, which passively closes both the male dry disconnect valve 252 within the hydrogen port (228 in FIG. 31) of the FWT device 220 and the female dry disconnect valve (177 in FIG. 20) within the hose connection ROV 103 thereby preventing the escape of hydrogen gas from the hydrogen storage chamber 241, as well as from the pressurized hydrogen tank 237, of the FWT device, and also preventing the escape of residual fresh water from the hydrogen transfer hose 104.

After the hose connection ROV 103 has detached from the FWT device 220, the hydrogen-vessel controller (not shown) activates the vessel's forward thrusters (114 and 115 in FIG. 6), and, as needed for steering, the through-hull thrusters 112, 113, and 116 so as to cause the hydrogen vessel 102 to move away from the FWT device, and thereafter to cruise toward and/or to the location of another FWT device from which it will remove hydrogen gas and increase the reservoir of hydrogen stored within its plurality of pressurized hydrogen storage tanks 108; or thereafter to cruise toward and/or to to a port or vessel to which it will offload and/or transfer a portion of its stored hydrogen gas.

When the hydrogen vessel reaches, and/or arrives at, a destination port or vessel to which it will dispense, offload, transfer, and/or provide an amount, measure, portion, volume, and/or mass of hydrogen gas, the receiving port or vessel may connect a transfer hose (not shown) to a connector 274 (e.g. a female dry disconnect connector) after which the hydrogen-vessel controller (not shown) can, in response to an authorized signal, open a hydrogen release valve 275 thereby permitting pressurized hydrogen gas stored within the hydrogen vessel's plurality of pressurized hydrogen storage tanks 108 to flow into and through the transfer hose, connected to the hydrogen release valve, to the recipient port or vessel.

Many, if not all, electrical components, modules, systems, mechanisms, and apparati of which the hydrogen vessel is comprised are energized by electricity generated by fuel cell 211. Some of its electrical connections to some of the hydrogen vessel's electrical components are illustrated in FIG. 36 by dashed lines, e.g., 216, (similar to the dashed-line electrical connectors illustrated in FIG. 30).

Figure 37:
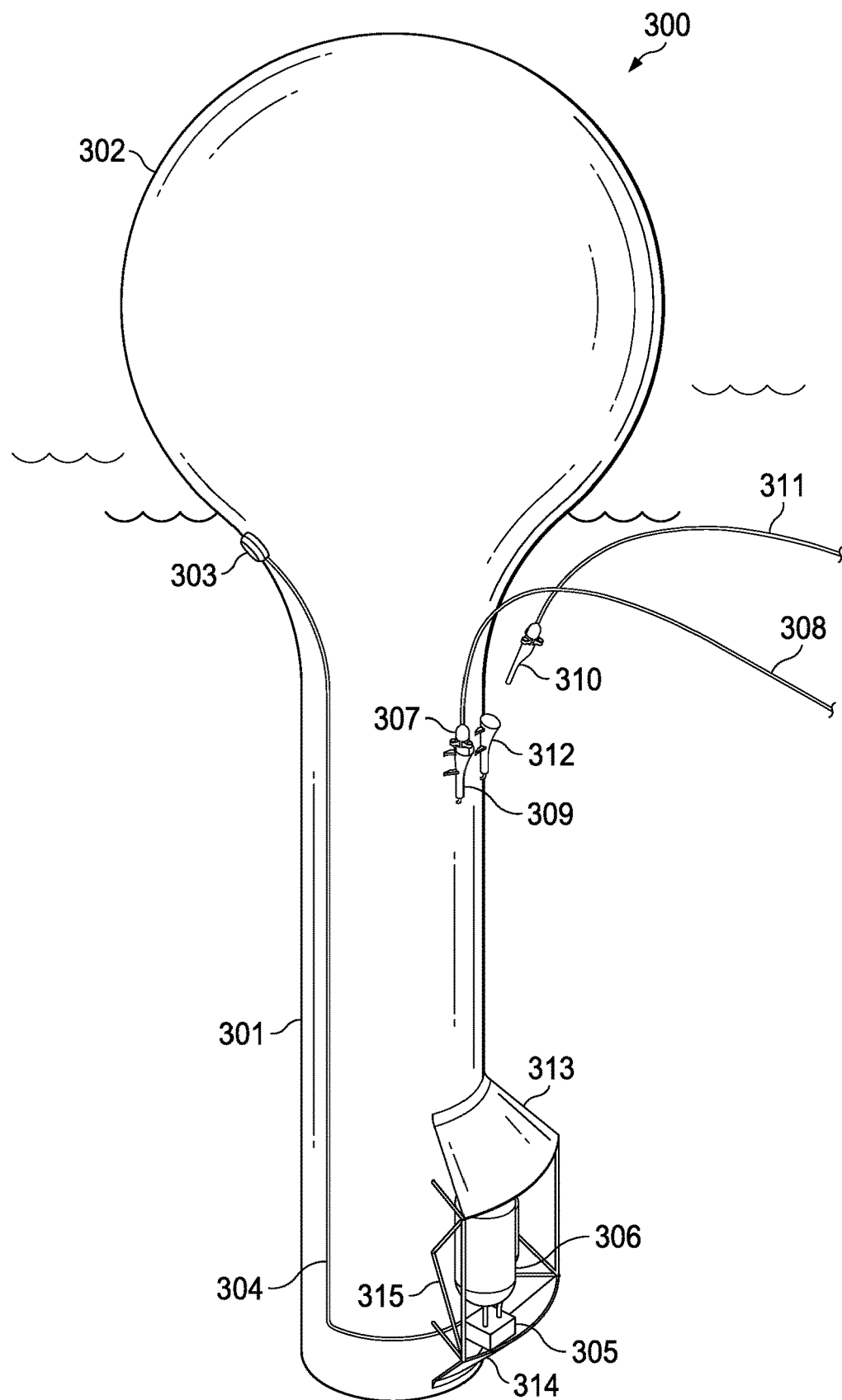
FIG. 37 shows a perspective side view of a hydrogen-synthesizing wave-energy conversion device (WEC device) of an embodiment of the present disclosure that is similar to the WEC device that is illustrated in FIGS. 8-15.

FIG. 37 shows a perspective side view of a hydrogen-synthesizing wave-energy conversion device (WEC device) 300 of an embodiment of the present disclosure which is similar to the WEC device that is illustrated in FIGS. 8-15. The embodiment is part of an assembly of devices and/or mechanisms which together enable the capture of energy from water waves, the conversion of that energy into a chemical fuel such as hydrogen, the delivery of that chemical fuel to a consumption site (such as an onshore facility, an onshore energy utility, or a ship), and the subsequent use of that fuel by a mechanism (e.g. vehicle, or fuel cell) or process (e.g. steel or ammonia production process). Not shown in FIG. 37 is a hydrogen vessel similar to the one illustrated FIGS. 6 and 7 to which the other ends of the hydrogen 308 and water 311 transfer hoses are connected. Also not shown in FIG. 37 is a chemical fuel and/or ingredient consumer such as the ones illustrated in FIGS. 24-28.

With respect to the WEC device illustrated in FIG. 37, the hydrogen vessel associated with this embodiment differs from the hydrogen vessel illustrated in FIGS. 6 and 7 by its inclusion and/or utilization of two separate hoses and hose connection ROVs—one for hydrogen transfer and the other for water transfer—rather than the one (used for the transfer of both hydrogen and water) of the embodiment illustrated in FIGS. 6 and 7.

Similar to the WEC device illustrated in FIGS. 8-15, the WEC device 300 illustrated in FIG. 37 floats at the surface of a body of water and tends to move responsive to impinging waves. As it moves, water partially captured within a constricted tube 301 (for which the constriction is within the outer hull of the device and is therefore not visible in FIG. 37) which depends from the WEC device's hollow spherical buoy 302, tends to oscillate along a longitudinal and/or vertical axis of the tube 301, periodically issuing jets of water from an upper tube mouth (not visible) positioned within the hollow buoy 302. Portions of the ejected jets of water are trapped within the hollow interior of buoy 302 and added to a reservoir of water (not visible) within the hollow buoy. Also inside the hollow buoy, and above the water reservoir, is a gas-filled (e.g. air-filled) pocket. In a preferred embodiment, both air and water reservoirs are pressurized to a pressure exceeding that of the atmosphere outside the WEC device.

Pressurized water from within the water reservoir inside the hollow buoy 302 flows out through a hubless water turbine generator 303 which generates electrical power in response to the outward flow of water from the water reservoir. Electrical power produced by the water turbine generator is applied to, and conducted by, an electrical cable 304 which carries a portion of that electrical power to a water electrolyzer 305, which responds to the provision of electrical power by converting molecules of water (e.g. of hydronium and hydroxide ions arising from the spontaneous dissolution of water molecules) into molecules of hydrogen and oxygen. Hydrogen synthesized by the water electrolyzer is transmitted to a hydrogen reservoir tank 306 where it is stored until retrieved, removed, and/or offloaded by a hydrogen vessel (not shown) similar to the one illustrated in FIGS. 6 and 7.

When a hydrogen vessel, or other retrieval vessel, craft, mechanism, and/or object, is ready to remove hydrogen from the illustrated WEC device 300, it deploys a hydrogen hose connection remotely-operated vehicle 307 (hydrogen hose connection ROV) which is fluidly connected to, and which pulls and positions, a hydrogen transfer hose 308. Upon pulling its attached hydrogen transfer hose to the WEC device, the hydrogen hose connection ROV docks with a hydrogen port receptacle 309, whereupon a hydrogen socket, orifice, valve, and/or aperture (not visible), on and/or within, hydrogen hose connection ROV mates, and/or joins, with a complementary hydrogen penetrator valve and/or plug (not visible) within, and at a base of, the hydrogen port receptacle 309. Following the joining of the hydrogen socket valve of the hydrogen hose connection ROV and the hydrogen penetrator valve of the hydrogen port receptacle, any hydrogen stored, cached, and/or trapped within the hydrogen reservoir tank 306 of the WEC device may flow freely to, into, and through, the hydrogen transfer hose, and therethrough to the respective hydrogen vessel, craft, mechanism, and/or object where it will be stored, e.g. as a pressurized gas, as a liquid, or as an ionically bonded chemical compound and/or slurry.

When a hydrogen vessel, or other retrieval vessel, craft, mechanism, and/or object, is ready to replenish, restore, supplement, augment, and/or replace, fresh water consumed by the illustrated WEC device 300 during its production of hydrogen, it deploys a water hose connection remotely-operated vehicle 310 (water hose connection ROV) which is fluidly connected to, and which pulls and positions, a water transfer hose 311. Upon pulling its attached water transfer hose to the WEC device, the water hose connection ROV docks with a water port receptacle 312, where upon a water socket, orifice, valve, and/or aperture (not visible), on and/or within, water hose connection ROV mates, and/or joins, with a complementary water penetrator valve and/or plug (not visible) within, and at a base of, the water port receptacle 312. Following the joining of the water socket valve of the water hose connection ROV and the water penetrator valve of the water port receptacle, water (e.g. fresh water) is transferred from the hydrogen vessel (not shown) to a water reservoir tank (not visible) via the fluidly connecting water transfer hose.

The water electrolyzer 305, the hydrogen reservoir tank 306, and the water reservoir tank (not visible) of the WEC device 300 are positioned, attached, mounted, and/or affixed, at a lower external portion of the water tube 301 of the WEC device. In order to reduce the drag that these components would create, experience, and/or impose upon the WEC device, they are positioned between upper 313 and lower 314 flow diverters which are structurally supported and/or reinforced by a pair of trusses, e.g. 315. In other embodiments, these components can be internal to the WEC, e.g., mounted within the hollow buoy 302.

The depth at which the water electrolyzer 305 is positioned causes the hydrogen gas to be compressed (relative to atmospheric pressure) at evolution and stored at a pressure approximately equal to the ambient pressure of the water at its depth thereby omitting the need for supplemental compression and a compressor. However, the scope of the present disclosure includes embodiments, and/or variations of the disclosed embodiment, which position their respective water electrolyzers at other locations within and/or about the WEC device, and/or at other depths below the surface of the water on which the device floats. Another embodiment attaches its water electrolyzer below the lower mouth and/or end of the depending water tube 301 by means of struts, trusses, or other mechanical structures in order to passively store the hydrogen at even greater pressure than that afforded by the ambient water depth pressure at the lower end of the water tube.

The scope of the present disclosure, and of the disclosure of the embodiment illustrated in FIGS. 37-46, is not limited by and/or to the type, size, and/or number of water turbines of which it is comprised. Embodiments of the present disclosure include, but are not limited to, those which comprise: axial water turbines rotationally connected to respective generators by respective turbine shafts; hubless water turbines; and magnetohydrodynamic generators.

The scope of the present disclosure, and of the disclosure of the embodiment illustrated in FIGS. 37-46, is not limited by and/or to the number, type, design, and/or configuration of fluid transfer hoses used to transfer fluids between a WEC device and a vessel.

The scope of the present disclosure, and of the disclosure of the embodiment illustrated in FIGS. 37-46, is not limited by and/or to the number, type, design, and/or configuration of ROVs used to convey, position, and/or secure fluid transfer hoses to a WEC device. The scope of the present disclosure includes embodiments which utilize remotely-operated as well as autonomous vehicles to convey, position, and/or secure fluid transfer hoses to a WEC device, including vehicles capable of submerged propulsion, climbing the outer hull of a WEC device (e.g. into the atmosphere), and/or flying to a WEC device.

The scope of the present disclosure, and of the disclosure of the embodiment illustrated in FIGS. 37-46, is not limited by and/or to the type, variety, and/or number of chemical fuels produced and/or synthesized by a WEC device. An embodiment of the present disclosure is able to generate two or more varieties of chemical fuels wherein the absolute and/or relative amount of each variety of chemical fuel produced is specified and/or dictated by a control system onboard the respective WEC device and/or by a remote signal received by the WEC device, e.g. from a hydrogen vessel and/or from a satellite transmission. An embodiment of the present disclosure creates a chemical fuel, e.g. hydrogen, which tends to be gaseous at standard temperature and pressure (STP). An embodiment of the present disclosure creates a chemical fuel, e.g. ammonia, which tends to be liquid at STP or at pressures only slightly higher than STP.

The scope of the present disclosure, and of the disclosure of the embodiment illustrated in FIGS. 37-46, is not limited by and/or to by the type, method, manner, system, and/or mechanism by which a synthesized chemical fuel is stored on a WEC device and/or on a chemical-fuel harvesting, collection, and/or retrieving vessel. Embodiments of the present disclosure include, but are not limited to, those which comprise WEC devices, and/or chemical-fuel harvesting vessels, that store a synthesized chemical fuel as: a compressed and/or pressurized gas; a liquid; and a chemical intermediate and/or complex such as one in which a respective gaseous chemical fuel is ionically bonded to a substrate such that the combination is a solid, liquid, or slurry.

The scope of the present disclosure, and of the disclosure of the embodiment illustrated in FIGS. 37-46, is not limited by and/or to the type and/or variety of energy consumers which consume the chemical fuel synthesized by the WEC device and collected and transported by the chemical-fuel harvesting vessel.

The scope of the present disclosure, and of the disclosure of the embodiment illustrated in FIGS. 37-46, is not limited by and/or to the type, kind, variety, and/or source, of the water utilized in the synthesis of the hydrogen (or other chemical fuel). Embodiments of the present disclosure include, but are not limited to, in which the water used to produce hydrogen is: obtained from a hydrogen vessel; is produced by distillation on, within, and/or by the respective WEC device; is produced on a hydrogen vessel (e.g. during transit to a WEC device); is produced on land and transferred to a docked hydrogen vessel; and seawater.

Figure 38:
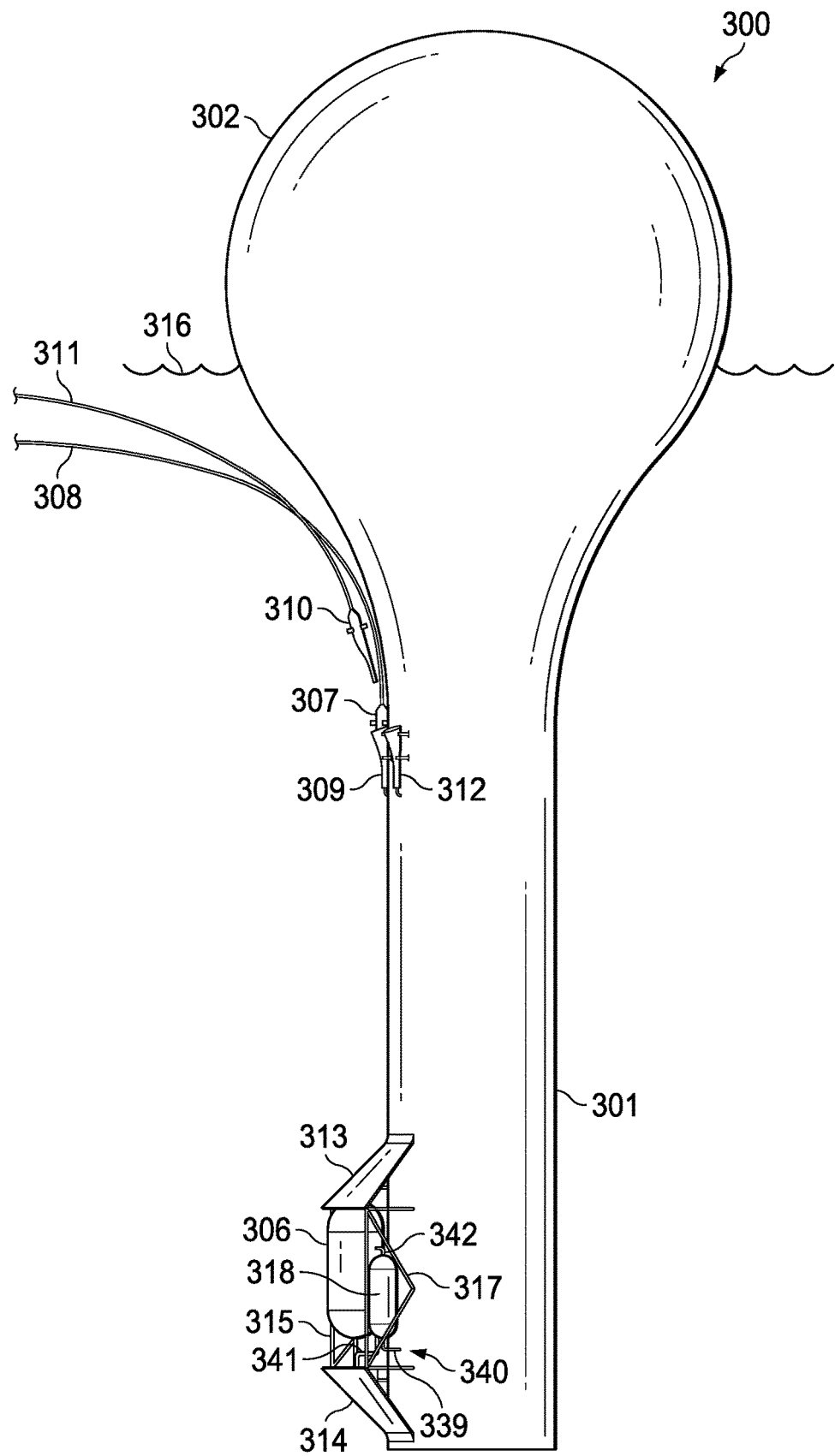
FIG. 38 shows a side view of the hydrogen-synthesizing wave-energy conversion device (WEC device) of an embodiment of the present disclosure that is illustrated in FIG. 37.

FIG. 38 shows a side view of the same hydrogen-synthesizing wave-energy conversion device (WEC device) 300 of an embodiment of the present disclosure that is illustrated in FIG. 37. The WEC device nominally floats adjacent to an upper surface 316 of a body of water over which waves pass.

The water electrolyzer 305, the hydrogen reservoir tank 306, and the water reservoir tank (not visible) of the WEC device 300 are positioned, attached, mounted, and/or affixed, at a lower external portion of the water tube 301 of the WEC device, and positioned between upper 313 and lower 314 flow diverters which are structurally supported and/or reinforced by a pair of trusses 315 and 317.

Water (e.g. fresh water) consumed by the water electrolyzer (305 in FIG. 37) is stored in, and dispensed from, a water reservoir tank 318. Water is added to the water reservoir tank, e.g. to replace water consumed by the water electrolyzer, through water replacement pipe 339, which passes through the hull of the water tube 301 at 340 and thereafter fluidly connects the water reservoir tank with a water penetrator valve within the water port receptacle 312 from where it may receive water from a water hose connection ROV (310 in FIG. 37) and/or from a water transfer hose (311 in FIG. 37).

Water from the water reservoir tank 318 flows into the water electrolyzer (305 in FIG. 376) through water supply pipe 341. Oxygen produced by the water electrolyzer flows into and up through the water supply pipe thereby becoming trapped within and pressurizing the water reservoir tank. At a threshold pressure (e.g. relative to the pressure outside the water reservoir tank, and/or relative to the depth-pressure of the water at the depth of the water reservoir tank) a pressure relief valve 342 atop the water reservoir tank opens thereby tending to discharge oxygen until the pressure within the water reservoir tank falls below the threshold discharge pressure. While oxygen is discharged from the water reservoir tank, it is possible that small amounts of water (e.g. fresh water) may also be discharged.

In an alternate embodiment of the WEC device illustrated in FIGS. 37 and 38, the pressure relief valve 342 through and/or by which oxygen is periodically released from the water reservoir tank 318 is fluidly connected to an interior of the hollow buoy (e.g. by a pipe) so that oxygen released by the pressure relief valve, or a portion thereof, is added to the air pocket within the WEC device's hollow buoy 302. In this embodiment, a pressure relief valve on an upper portion of the hollow buoy's outer hull releases gas from the pressurized interior of the buoy whenever a threshold pressure is exceeded, or whenever a WEC-device control system determines that an optimal gas-pocket pressure is lower than a current gas-pocket pressure.

Figure 39:
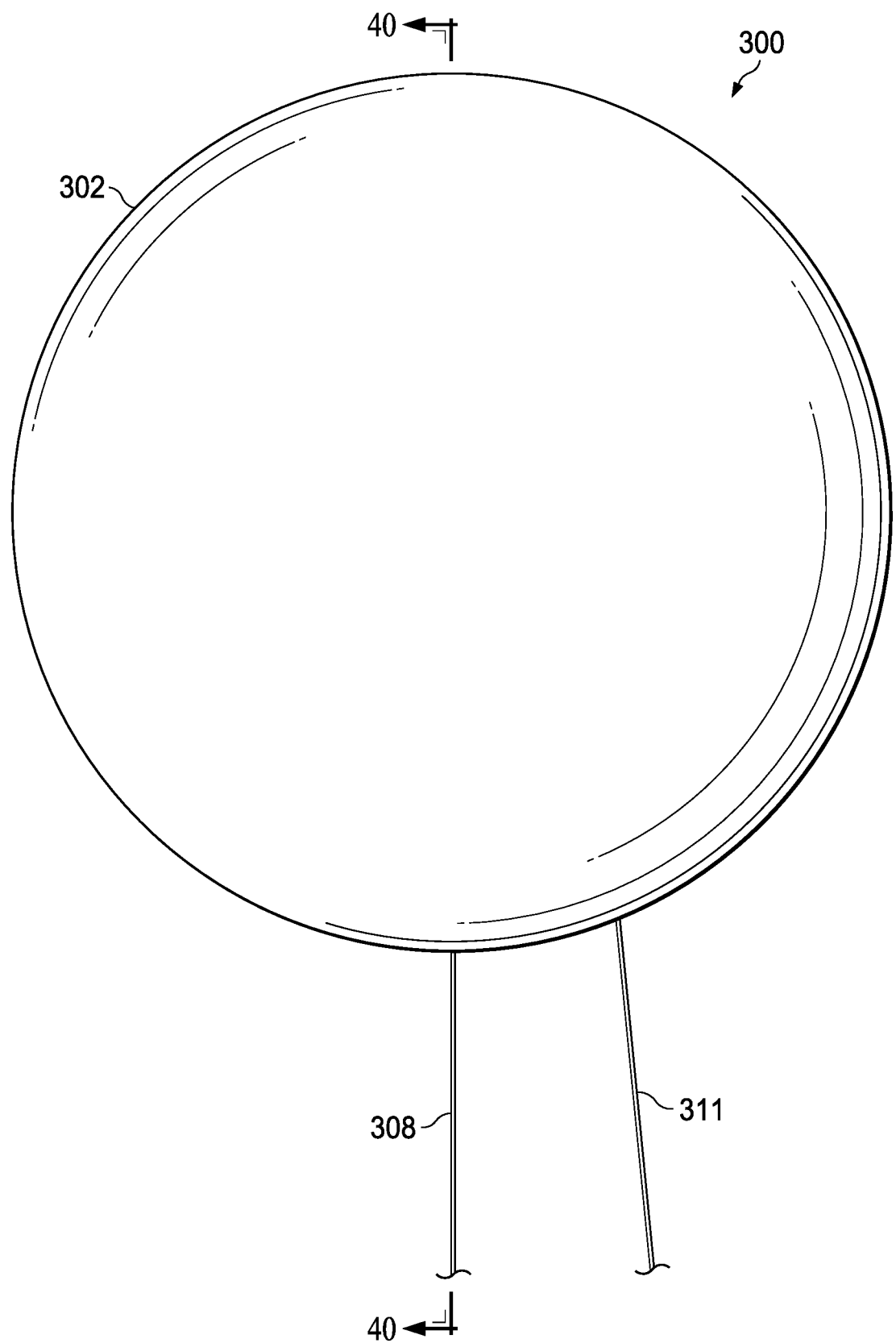
FIG. 39 shows a top-down view of the hydrogen-synthesizing wave-energy conversion device (WEC device) of an embodiment of the present disclosure that is illustrated in FIGS. 37 and 38.

FIG. 39 shows a top-down view of the same hydrogen-synthesizing wave-energy conversion device (WEC device) 300 of an embodiment of the present disclosure that is illustrated in FIGS. 37 and 38.

Figure 40:
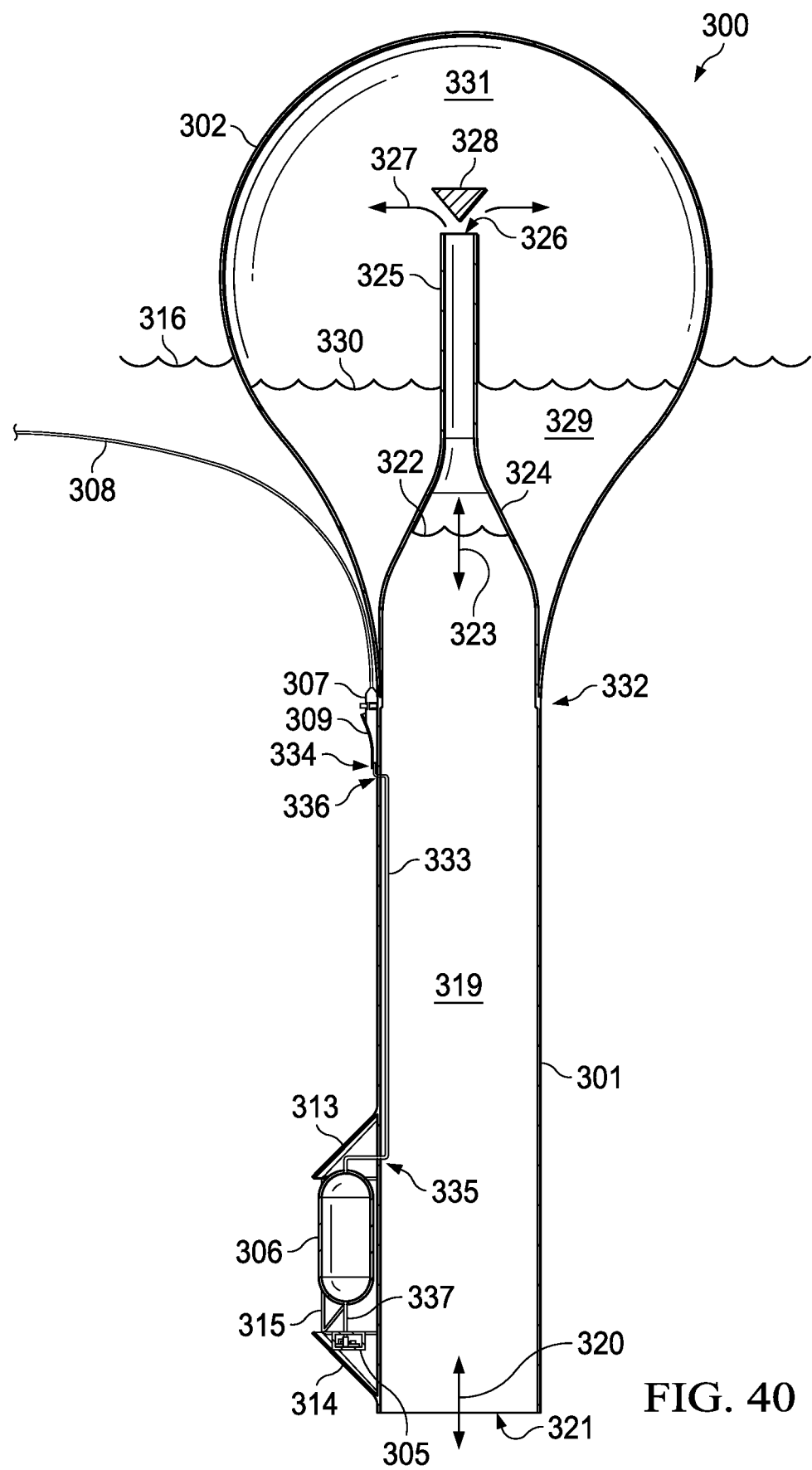
FIG. 40 shows a side sectional view of the hydrogen-synthesizing wave-energy conversion device (WEC device) of an embodiment of the present disclosure that is illustrated in FIGS. 37-39, and wherein the vertical section plane is specified in FIG. 39 with the section taken across line 40-40.

FIG. 40 shows a side sectional view of the same hydrogen-synthesizing wave-energy conversion device (WEC device) 300 of an embodiment of the present disclosure that is illustrated in FIGS. 37-39, and wherein the vertical section plane is specified in FIG. 39 with the section taken across line 40-40.

As the WEC device moves up and down in response to the passage of waves across the surface 316 of the body of water on which it floats, water 319 partially trapped and/or constrained within the WEC device's water tube 301 tends to move up and down. As the water within the water tube moves up and down, water tends to move 320 in and out through a lower mouth and/or aperture 321 at a lower end of the water tube, i.e. an end of the water tube most distal to the WEC device's hollow buoy 302. And, as the water within the water tube moves up and down, an upper surface 322 of that water 319 tends to move 323 up and down as well.

Periodically, as the water within the water tube moves up and down, it moves upward through a constricted portion 324 of the water tube 301, which tends to accelerate the upward velocity and/or momentum of that water. Occasionally, an upwardly accelerated flow of water flows up and through an upper portion 325 of the water tube 301, and up and through an upper mouth and/or aperture of the water tube, thereby resulting in an ejection 327 of a portion of that upwardly accelerated water.

An approximately conical diverter 328 positioned above the upper mouth 326 of the water tube tends to laterally divert the flow of ejections of water from that upper mouth, which tends to cause some or all of such ejected water to remain trapped within the interior of the hollow buoy thereby creating and/or augmenting a reservoir of water 329 therein. Water ejected 327 from the upper mouth 326 of the water tube tends to fall into an upper surface 330 of the water reservoir thereby tending to raise that upper surface and increase the depth of the water reservoir 329.

A pocket of pressurized air 331 pressurizes the interior of the hollow buoy, and water ejected 327 into the hollow buoy is pressurized to at least the same degree. And water within the water reservoir is pressurized to a pressure approximately equal to the pressure of the air pocket 331 and the depth-pressure at any particular point within the water reservoir.

The hull comprising the hollow buoy 302 joins, merges, and/or connects, with the hull comprising the water tube 301 at a seam, union, weldment, and/or junction 332.

Upon successfully docking with the hydrogen port receptacle 309, the hydrogen hose connection ROV, and its fluidly connected hydrogen transfer hose 308, are fluidly connected to a hydrogen export pipe 333 through a connection, and/or interconnection, between them 334. The fluid connection of the hydrogen hose connection ROV and the hydrogen export pipe is achieved by means of a connecting of their respective hydrogen socket valve and hydrogen penetrator valve.

The WEC device's hydrogen export pipe 333 is fluidly connected to an upper end of the WEC device's hydrogen reservoir tank 306, and to a lower end to the hydrogen penetrator valve positioned within a lower end of the hydrogen port receptacle 309. The hydrogen export pipe penetrates the water tube wall at 335 where it passes from the exterior of the water tube to the interior, and at 336 where it passes from the interior of the water tube to the exterior, and thereafter passes into a lower portion 334 of the interior of the hydrogen port receptacle. The positioning, routing, placement, and/or paths, of the various cables, pipes, port receptacles, water electrolyzer, hydrogen reservoir tank, and water reservoir tank, are arbitrary, with the exception that the particular type of ROV utilized in the embodiment illustrated in FIGS. 37-39 requires a port receptacle that is submerged. Embodiments incorporating, comprising, and/or utilizing any and all variations to the illustrated WEC device design are included within the scope of the present disclosure.

Hydrogen gas produced, synthesized, evolved, and/or created, in and/or by the water electrolyzer 305 enters a lower end of hydrogen effluent pipe 337 wherethrough it flows into, and is trapped and/or stored within hydrogen reservoir tank 306.

Figure 41:
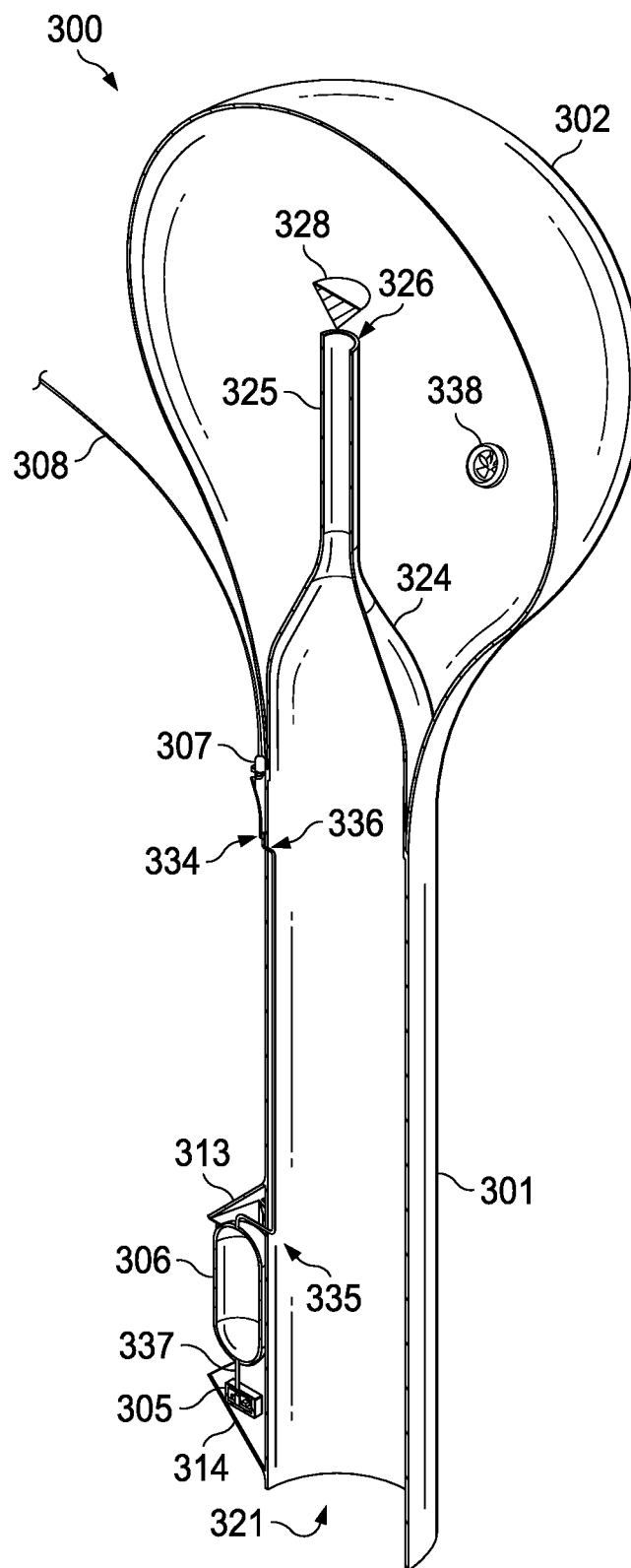
FIG. 41 shows a perspective view of the side sectional view of the hydrogen-synthesizing wave-energy conversion device (WEC device) of an embodiment of the present disclosure that is illustrated in FIG. 40 and is the same WEC device illustrated in FIGS. 37-40.

FIG. 41 shows a perspective view of the side sectional view of the hydrogen-synthesizing wave-energy conversion device (WEC device) 300 of an embodiment of the present disclosure that is illustrated in FIG. 40 and is the same WEC device illustrated in FIGS. 37-40.

Obscured from view in FIG. 40, but visible in the perspective view of FIG. 41, is the WEC device's 300 water turbine 338 through which water flows from the inside of the WEC device's hollow buoy to the outside. Pressurized water (e.g. water whose pressure exceeds 1.5 ATM absolute) within the water reservoir (not shown) of the WEC device flows out, and back to and/or into the body of water on which the WEC device floats, through the water turbine, thereby causing the water turbine to produce electrical power, at least a portion of which is transmitted to the water electrolyzer 305 which enables the water electrolyzer's production of hydrogen gas from the WEC device's store of fresh water (fresh water stored in the WEC device's water reservoir tank (318 in FIG. 38).

Figure 42:
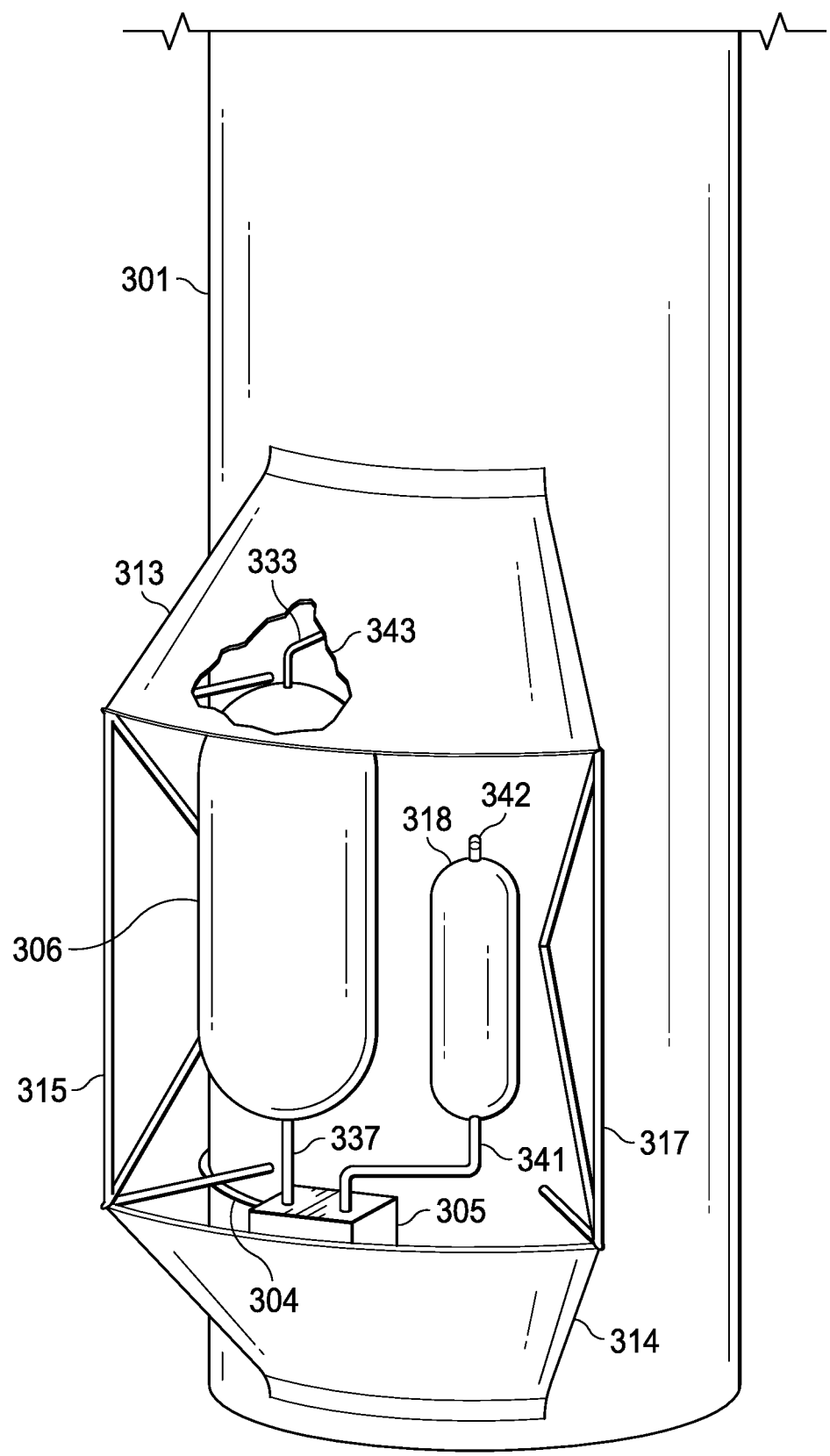
FIG. 42 shows a perspective closeup view of the water electrolyzer assembly attached and/or connected to an exterior position outside a lower end of the water tube of the hydrogen-synthesizing wave-energy conversion device (WEC device) of an embodiment of the present disclosure that is illustrated in FIGS. 37-41.

FIG. 42 shows a perspective closeup view of the water electrolyzer assembly attached and/or connected to an exterior position outside a lower end of the water tube 301 of the hydrogen-synthesizing wave-energy conversion device (WEC device) 300 of an embodiment of the present disclosure that is illustrated in FIGS. 37-41.

Fresh water is received from a hydrogen vessel and transmitted to the WEC device via a water hose connection ROV (310 in FIG. 37) and/or from a water transfer hose (311 in FIG. 37). When received at the water penetrator valve from a hydrogen vessel's water hose connection ROV, received water flows through a water replacement pipe (339 in FIG. 38) and into the water reservoir tank 318. As it is needed, and/or on demand, water from the water reservoir tank flows into and through water supply pipe 341 and into the water electrolyzer 305 where a portion of that water is decomposed into hydrogen and oxygen atoms which are then recombined to synthesize hydrogen gas and oxygen gas, respectively.

The oxygen gas generated within the water electrolyzer 305 travels back up the water supply pipe 341 and into the water reservoir tank 318 where it tends to accumulate at the top of the tank. When the contents, and/or interior, of the water reservoir tank reach or exceed a threshold pressure (e.g. relative to the ambient outside body of water on which the WEC device floats) then a pressure relief valve 342 opens permitting a portion of the contents of the water reservoir tank to be discharged into the body of water surrounding the WEC device. Since the electrolytically-generated oxygen tends to accumulate at the top of the water reservoir tank adjacent to the pressure relief valve, it will tend to be the case that the pressure within the water reservoir tank will be restored through a discharge comprised primarily of oxygen gas and not fresh water. However, some fresh water may also occasionally and/or inadvertently be discharged during this pressure-relieving process.

The hydrogen gas generated within the water electrolyzer 305 travels up the hydrogen effluent pipe 337 wherethrough it flows into, and is trapped and/or stored within, the hydrogen reservoir tank 306.

When a hydrogen hose connection ROV (307 in FIG. 37) of a hydrogen vessel connects, and/or docks with, the WEC device's hydrogen port receptacle 309, and thereby fluidly connects its attached hydrogen transfer hose (308 in FIG. 37) to the WEC device's hydrogen penetrator valve within, and at a base of, the hydrogen port receptacle, then pressurized hydrogen within the hydrogen reservoir tank 306 flows through the WEC device's hydrogen export pipe 333 (visible in FIG. 42 through cutout 343) and through the hydrogen transfer hose to the fluidly connected hydrogen vessel.

Figure 43:
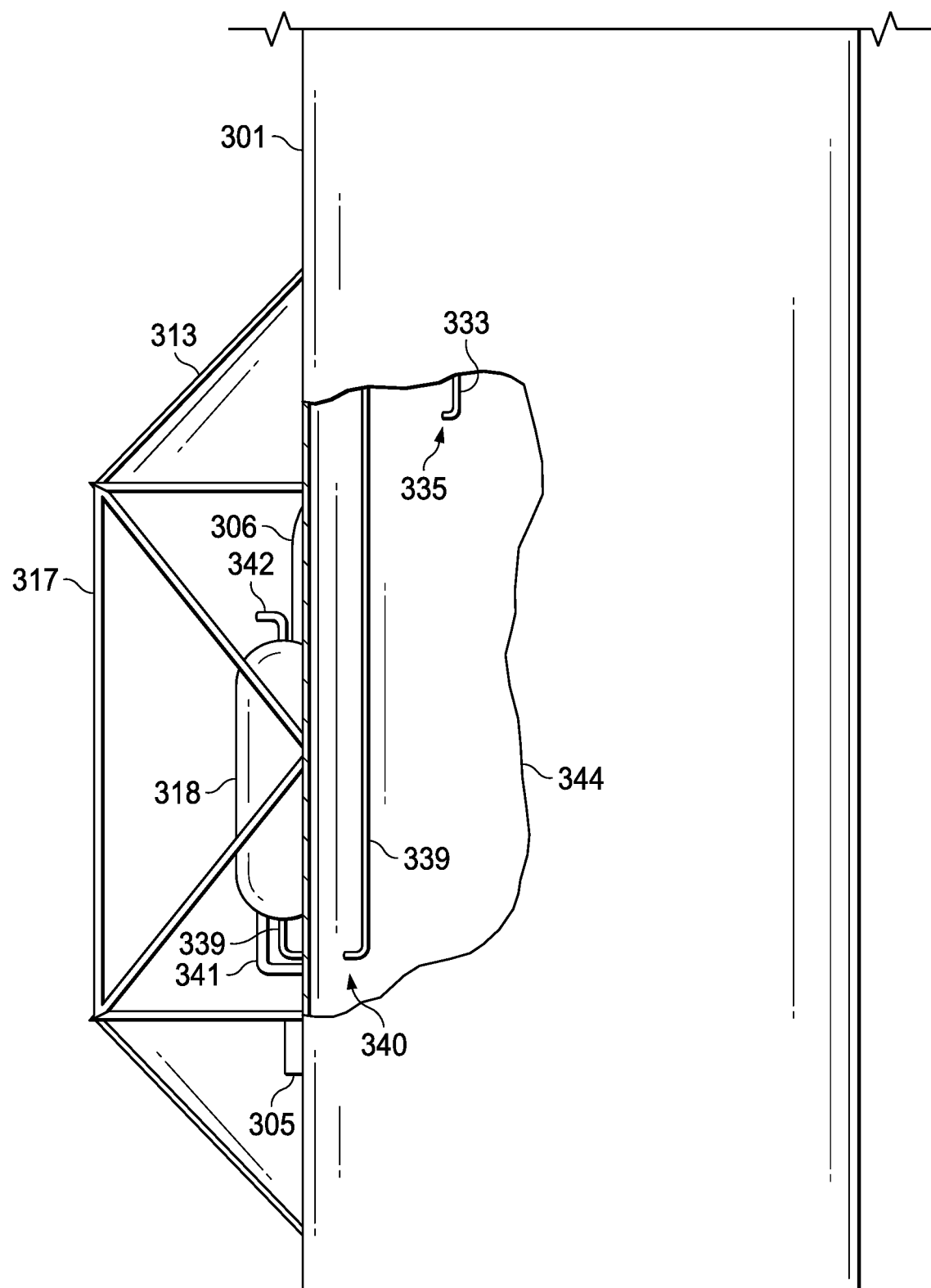
FIG. 43 shows a closeup side view of the water electrolyzer assembly attached and/or connected to an exterior position outside a lower end of the water tube of the hydrogen-synthesizing wave-energy conversion device (WEC device) of an embodiment of the present disclosure that is illustrated in FIGS. 37-42.

FIG. 43 shows a closeup side view of the water electrolyzer assembly attached and/or connected to an exterior position outside a lower end of the water tube 301 of the hydrogen-synthesizing wave-energy conversion device (WEC device) 300 of an embodiment of the present disclosure that is illustrated in FIGS. 37-42.

Water received by the WEC device at and/or through its water penetrator valve located within the water port receptacle (312 in FIG. 37) flows down to, and into, water reservoir tank 318 through water replacement pipe 339 which penetrates the hull of the water tube 301 at 340 (visible in FIG. 43 through cutout 344). Water within the water reservoir tank flows into the water electrolyzer 305 through water supply pipe 341.

Figure 44:
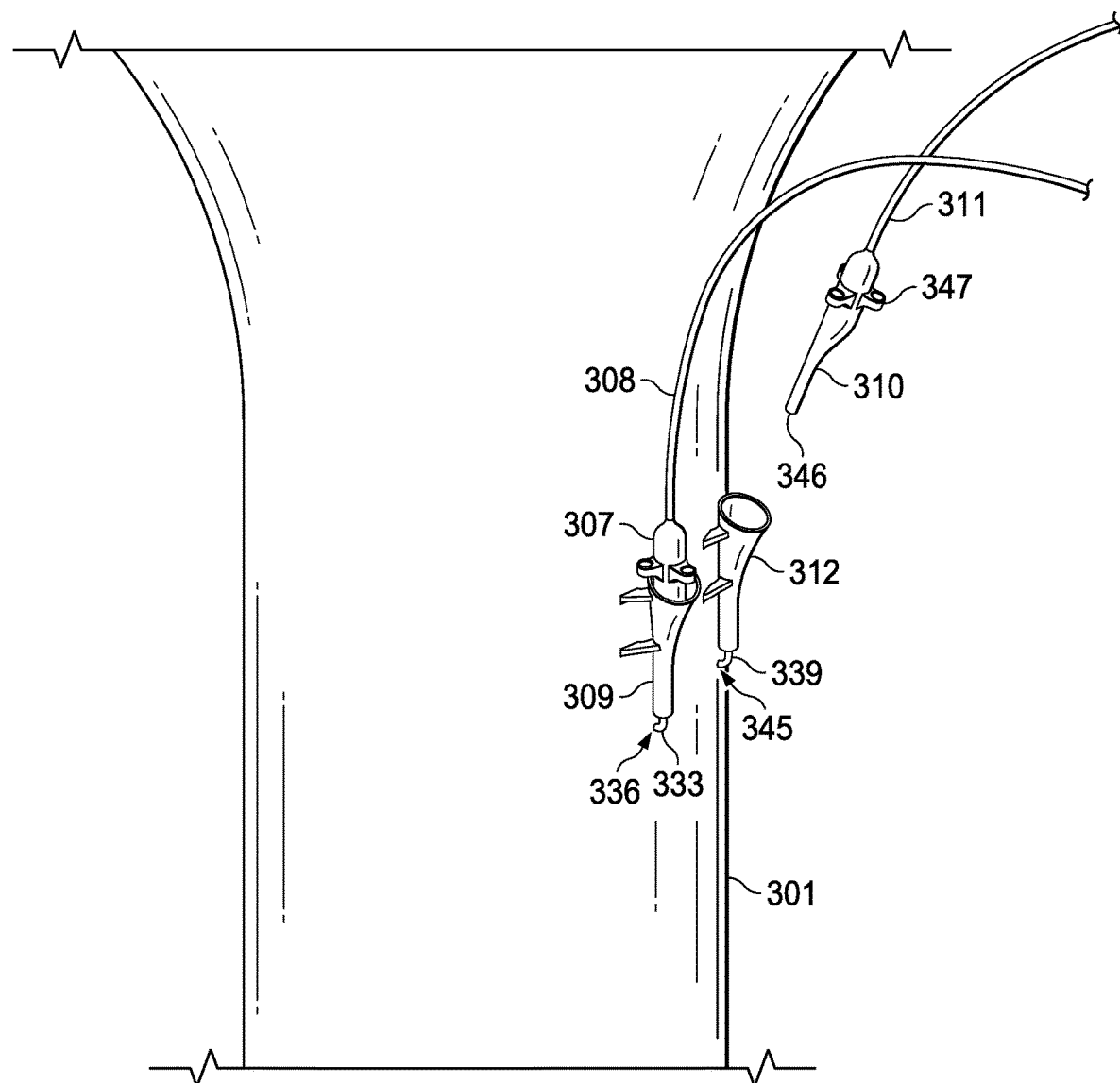
FIG. 44 shows a closeup perspective side view of the hydrogen and water port receptacles that are attached to, and/or incorporated within, a middle exterior portion of the water tube of the hydrogen-synthesizing wave-energy conversion device (WEC device) of an embodiment of the present disclosure that is illustrated in FIGS. 37-43.

FIG. 44 shows a closeup perspective side view of the hydrogen 309 and water 312 port receptacles that are attached to, and/or incorporated within, a middle exterior portion of the water tube 301 of the hydrogen-synthesizing wave-energy conversion device (WEC device) 300 of an embodiment of the present disclosure that is illustrated in FIGS. 37-43.

The hydrogen port receptacle 309 incorporates within a lower end a hydrogen penetrator valve (not visible) which provides fluid connectivity to a docked hydrogen hose connection ROV, e.g. 307. The hydrogen penetrator valve is fluidly connected to the hydrogen export pipe 333 which passes from the exterior of the water tube 301 to the interior at 336.

The water port receptacle 312 incorporates within a lower end a water penetrator valve (not visible) which provides fluid connectivity to a water hose connection ROV, e.g. 310, when it is properly docked with the water port receptacle. The water penetrator valve is fluidly connected to the water replacement pipe 339 which passes from the exterior of the water tube 301 to the interior at 345.

Each hydrogen hose connection ROV, e.g. 307, as well as each water hose connection ROV, e.g. 310, includes, incorporates, and/or comprises a socket valve (not shown) complementary to the respective penetrator valve to which it mates, connects, and/or joins. Each hose connection ROV's respective socket valve is located at its leading end, e.g. 346.

Each hydrogen hose connection ROV, e.g. 307, as well as each water hose connection ROV, e.g. 310, includes, incorporates, and/or comprises a set of three thrusters, e.g. 347, which acting together provide forward or backward thrust as needed to control the orientation, direction, speed, and position, of their respective hose connection ROV. Each thruster may comprise an electrical-motor driven propeller or turbine to achieve thrust. Each thruster may comprise a water-jet with an electrically-controlled nozzle controlling the direction and rate of water flow through the respective jet, as well as the degree of nozzle constriction. Each thruster may comprise a magnetohydrodynamic pump and nozzle to control the direction and rate of water flow through the respective thruster. The scope of the present disclosure includes hose-connection-ROV thrusters which provide thrust and/or positional control to their respective hose connection ROVs by means of any mechanism, device, apparatus, and/or technology.

Figure 45:
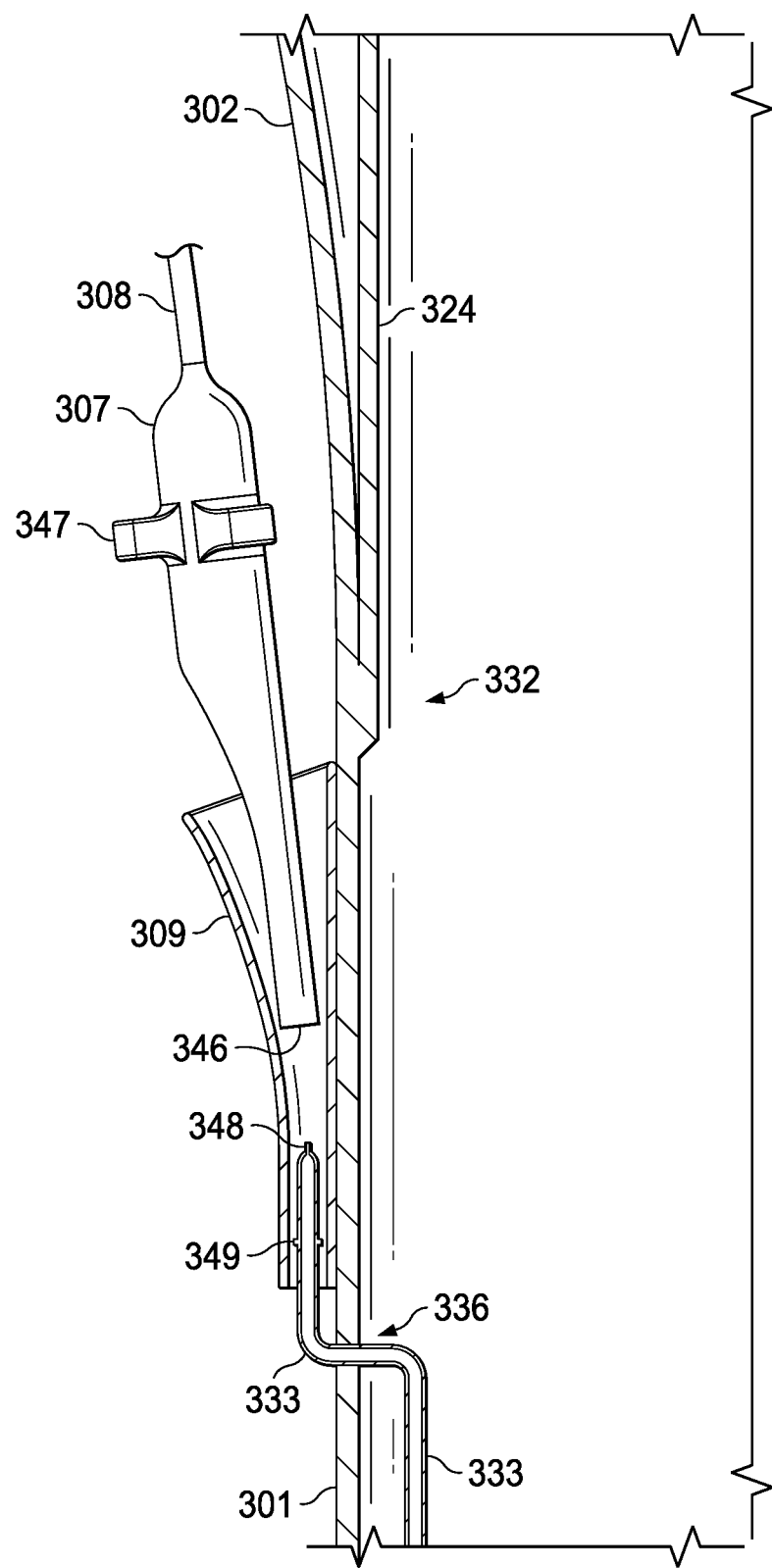
FIG. 45 shows a closeup sectional view of the hydrogen port receptacle that is attached to, and/or incorporated within, a middle exterior portion of the water tube of the hydrogen-synthesizing wave-energy conversion device (WEC device) of an embodiment of the present disclosure that is illustrated in FIGS. 37-44.

FIG. 45 shows a closeup sectional view of the hydrogen port receptacle 309 that is attached to, and/or incorporated within, a middle exterior portion of the water tube 301 of the hydrogen-synthesizing wave-energy conversion device (WEC device) 300 of an embodiment of the present disclosure that is illustrated in FIGS. 37-44. The closeup sectional view of FIG. 45 is a closeup view taken from the full sectional view illustrated in FIG. 40. However, in FIG. 45 the hydrogen hose connection ROV 307 is not yet fully seated within the respective hydrogen port receptacle. And, as in FIG. 40, the hydrogen hose connection ROV is not sectioned.

At a leading, forward, and/or distal end 346 of the illustrated hydrogen hose connection ROV 307 is included, incorporated, and/or utilized a hydrogen socket valve (not visible) complementary to a respective hydrogen penetrator valve 348 positioned at a lower and/or bottommost end of the respective hydrogen port receptacle 309. At the base of the hydrogen penetrator valve 348 is a stop, and/or annular ring, 349 which facilitates the seating and/or positional stability of a docking, mating, and/or connected, hydrogen hose connection ROV, e.g. by providing a pedestal and/or structural support upon which the hydrogen hose connection ROV may rest while docked.

The water port receptacle 312, and the water hose connection ROV 310, share the same design which characterizes the hydrogen port receptacle 309 and the hydrogen hose connection ROV 307.

Figure 46:
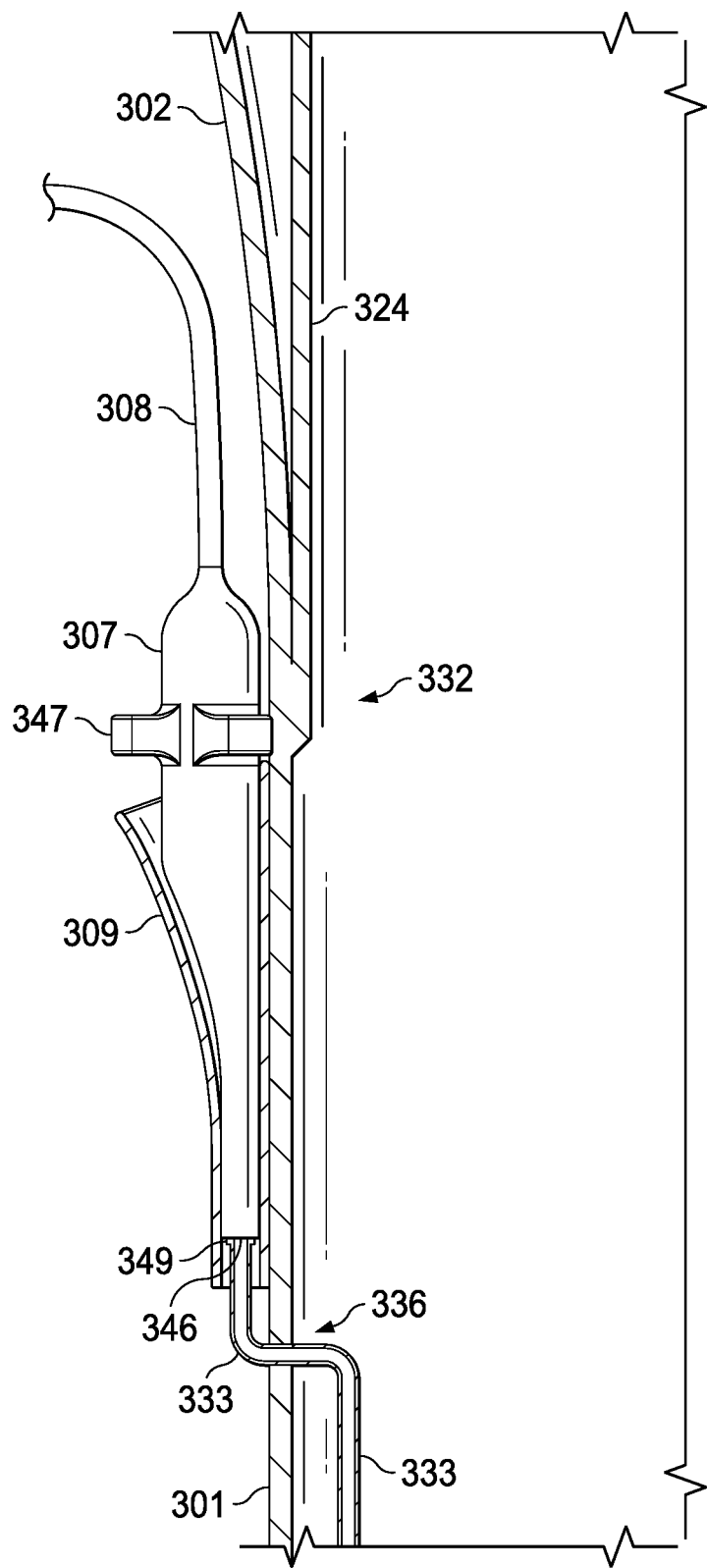
FIG. 46 shows a closeup sectional view of the hydrogen port receptacle that is attached to, and/or incorporated within, a middle exterior portion of the water tube of the hydrogen-synthesizing wave-energy conversion device (WEC device) of an embodiment of the present disclosure that is illustrated in FIGS. 37-45.
Figure 47:
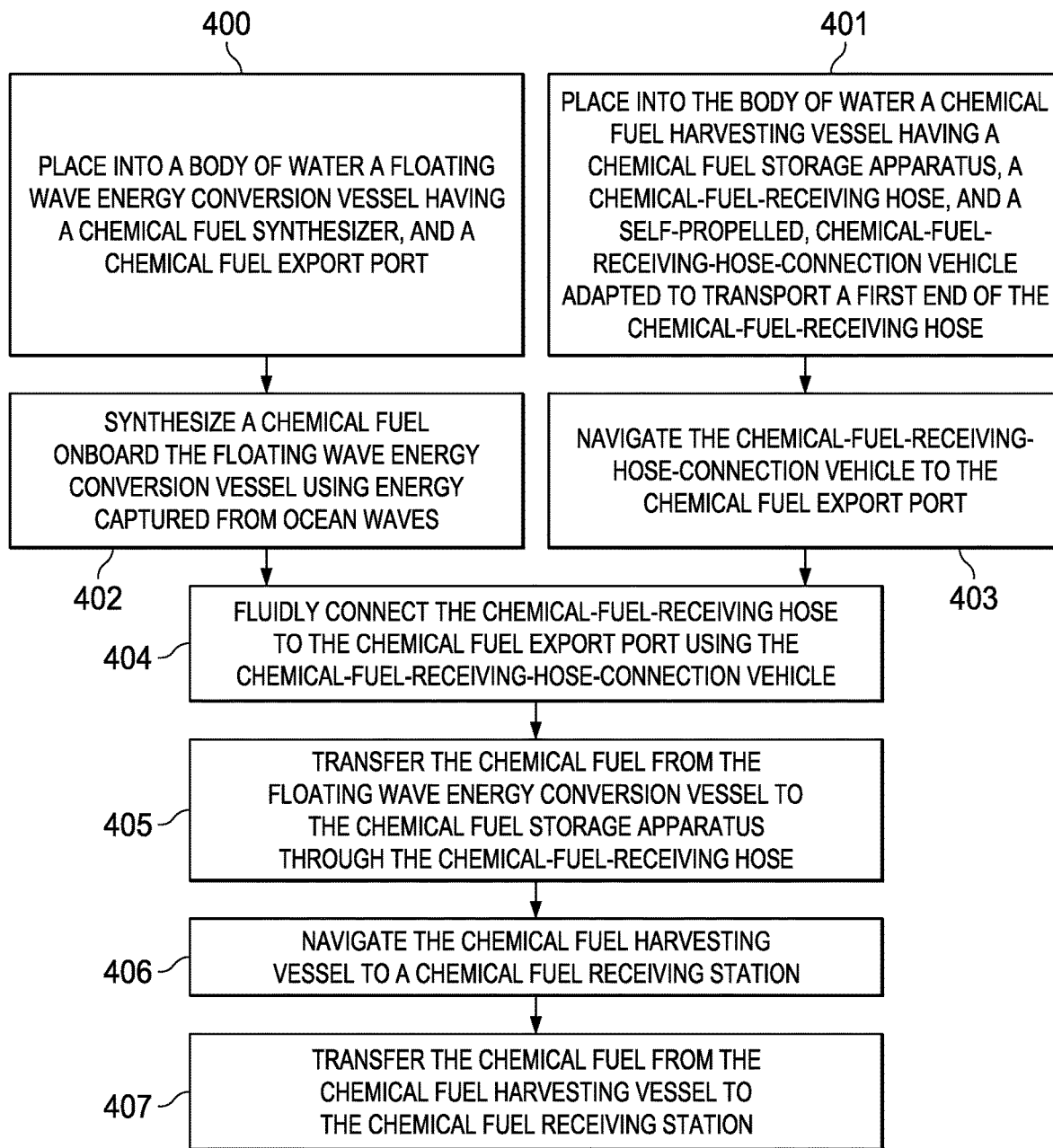
FIG. 47 is a flow chart of a first preferred method for transporting generated chemical fuel of the present invention.

FIG. 46 shows a closeup sectional view of the hydrogen port receptacle 309 that is attached to, and/or incorporated within, a middle exterior portion of the water tube 301 of the hydrogen-synthesizing wave-energy conversion device (WEC device) 300 of an embodiment of the present disclosure that is illustrated in FIGS. 37-45. The closeup sectional view of FIG. 45 is a closeup view taken from the full sectional view illustrated in FIG. 40. In FIG. 46, the hydrogen hose connection ROV 307 is not sectioned. And, unlike the closeup sectional illustration of FIG. 45, the illustration in FIG. 46 shows the hydrogen hose connection ROV fully seated within its complementary and/or respective hydrogen port receptacle.

Note that the leading end 346 of the hydrogen hose connection ROV 307 is resting on, and/or stopped at, the annular ring 349 positioned just below the hydrogen penetrator valve (348 in FIG. 45). The hydrogen transfer hose 308 is now fluidly connected to the WEC device's hydrogen export pipe 333, and the hydrogen vessel (not shown) to which the other end of the hydrogen transfer hose is connected is now able to remove hydrogen from the WEC device.

The variety of mechanisms, systems, designs, and/or architectures, by which a hydrogen vessel 102 may harvest, retrieve, remove, transfer, and/or capture hydrogen gas from a WEC device and/or an FWT device is virtually without limit. The examples illustrated in FIGS. 30 and 36 are provided for the purposes of explanation and illustration and are in no way limiting as to the types, variety, and/or specific mechanisms, systems, designs, and/or architectures which are included within the scope of the present disclosure. Variations, modifications, and different versions, of the exemplar mechanisms, systems, designs, and/or architectures illustrated in FIGS. 30 and 36 will be obvious to those skilled in the art and all such possible variations, and modifications, are included within the scope of the present disclosure.

Mundane, commonplace, and/or typical, elements of the disclosed hydrogen vessel, e.g. types of propulsive thrusters, their number and placement, etc., are not limiting to the scope of the present disclosure. All variations, modifications, alternative, and/or different hydrogen vessel 102 designs, architectures, and/or configurations, in so far as those variations, modifications, alternatives, and/or differences, are known to the prior art, and/or involve and/or relate to typical and/or commonplace elements of self-propelled floating vessels are not outside the scope of the present disclosure.

The scope of the present disclosure includes embodiments that comprise not only wave-energy devices and floating wind turbine devices, but also any other kind, category, and/or type of device which directly or indirectly produces hydrogen gas or any other chemical—liquid or gaseous—including, but not limited to those which generate electrical power which is then used to energize an electrolyzer to convert water into hydrogen, or to energize another mechanism, apparatus, or device to convert any first chemical substance, whether gaseous or liquid, into any second chemical substance, whether gaseous or liquid. The scope of the present disclosure is not limited to which type, category, and/or variety of chemical is produced, stored, and transferred to a vessel; nor is it limited to the manner, method, mechanism, and/or technique by which such a chemical is produced, generated, synthesized, and/or manufactured.

The scope of the present disclosure is not limited to the type of energy and/or chemical producing device by which a chemical is produced, generated, synthesized, and/or manufactured, nor from which a chemical is transferred to a vessel. The scope of the present disclosure includes, but is not limited to, embodiments that comprise, incorporate, and/or include energy and/or chemical producing devices which comprise, incorporate, and/or include any variety, type, design, and/or number of: solar panels, tidal turbines (whether at the surface or submerged), ocean current turbines (whether at the surface or submerged), wind turbines (whether anchored at a seafloor, moored to a seafloor, or free-floating), ocean wave energy devices (whether anchored at a seafloor, moored to a seafloor, or free-floating), direct sunlight to hydrogen converters, and ocean thermal energy converters.

The scope of the present disclosure includes, but is not limited to, embodiments that comprise, incorporate, and/or include energy and/or chemical producing devices which comprise, incorporate, and/or include wave-energy converters of any variety, type, design, and/or number, including, but not limited to: point absorbers, overtopping devices, oscillating water columns, wave attenuating devices, oscillating wave surge converters (e.g. rocking paddles), wave terminators, inverted-pendulum devices, submerged pressure differential devices, hydraulic flapping devices, bulge wave devices, and rotating mass devices.

The scope of the present disclosure includes, but is not limited to, embodiments that comprise, incorporate, and/or include energy and/or chemical producing devices which comprise, incorporate, and/or include wind-energy converters and/or wind turbines of any variety, type, design, and/or number, including, but not limited to: horizontal-axis wind turbines, and vertical-axis wind turbines.

The scope of the present disclosure includes, but is not limited to, embodiments that comprise, incorporate, and/or include energy and/or chemical producing devices that are free-floating, self-propelled, moored to a seafloor, moored to a river bottom, moored to a platform, moored to a ship or vessel, moored to other devices, as well as those which are positioned adjacent to an ocean, river, or other body of water.

The scope of the present disclosure includes any design, size, type, category, and/or variety of hose-ferrying, hose-guiding, and/or hose-pulling, vessels that draw an end of a chemical transmitting hose, tube, channel, cable, and/or pipe to an energy and/or chemical producing device floating on or in, moored in, anchored in, and/or positioned adjacent to, a body of water and facilitate a connection of that hose end to the chemical producing device and/or to a repository of chemical into which a chemical producing device transmits its chemical products. The scope of the present disclosure includes hose-ferrying vessels in which those hose-ferrying vessels constitute, comprise, and/or are of a type possessing features, characteristics, and/or operational attributes, consistent with vessels denoted, and/or referred to as, remotely-operated vehicles (ROVs), autonomous surface vessels (ASVs), autonomous underwater vessels (AUVs), unmanned underwater vessels (UUVs), manually-operated vessels, remote-controlled vessels, and/or remotely-operated vessels.

The scope of the present disclosure is not limited to or by any particular variety of hose-ferrying vessel, and the scope of the present disclosure includes any and all varieties of such hose-ferrying vessels.

The scope of the present disclosure includes hydrogen vessels which are autonomous and automatically locate and approach energy and/or chemical producing devices. The scope of the present disclosure includes hydrogen vessels which incorporate, include, and/or utilize hose-ferrying vessels which pull a chemical transmitting, conducting, and/or transfer hose from the hydrogen vessel to an energy and/or chemical producing device. The scope of the present disclosure includes hydrogen vessels which incorporate, include, and/or utilize tethered vessels, as well as those which incorporate, include, and/or utilize untethered and/or self-propelled vessels, which facilitate, actuate, execute, complete, and/or achieve the connection of a respective chemical transmitting, conducting, and/or transfer hose to an energy and/or chemical producing device.

The scope of the present disclosure includes hydrogen vessels which incorporate, include, and/or utilize tethered connection-facilitation vessels, as well as those which incorporate, include, and/or utilize untethered and/or self-propelled connection-facilitation vessels, which facilitate, actuate, execute, complete, and/or achieve the movement of a hose-ferrying and/or connection-facilitation vessel to a complementary hose connector at, on, and/or in an energy and/or chemical producing device, and/or facilitate, actuate, execute, complete, and/or achieve the connection of a respective chemical transmitting, conducting, and/or transfer hose to an energy and/or chemical producing device through the utilization, application, execution, and/or realization of any method, algorithm, and/or process, whether embedded within a computing circuit on a connection-facilitation vessel, onboard a hydrogen vessel, onboard an energy and/or chemical producing device, within a remotely-controlling computer, and/or at a remote control station.

The scope of the present disclosure includes energy and/or chemical producing devices, as well as hose-ferrying and/or connection-facilitation vessels, that incorporate, include, and/or utilize any type, size, design, variety, category, and/or number of chemical-transfer hose connector, as well as any type, size, design, variety, category, and/or number of chemical-transfer hoses.

The scope of the present disclosure includes embodiments that incorporate, include, and/or utilize energy and/or chemical producing devices that use energy that they produce to generate and/or synthesize hydrogen, ammonia, methane, methanol, and/or any other gaseous or liquid chemical substance, material, and/or fuel.

The scope of the present disclosure includes embodiments that incorporate, include, and/or utilize energy and/or chemical producing devices that incorporate, include, and/or utilize any type of electrical generator and/or electrical generation system, any type of magnetohydrodynamic electrical generator, any type of homopolar generator, and/or any type of electricity producing and/or generating mechanism, apparatus, component, part, module, and/or system.

The scope of the present disclosure includes embodiments that incorporate, include, and/or utilize energy and/or chemical producing devices that incorporate, include, and/or utilize chemical (e.g. hydrogen) storage chambers rated to any maximum pressure, able to store any maximal volume of a respective chemical product at any specific pressure, as well as any mechanism, method, apparatus, connector, connection scheme, interconnection scheme, fluid connector, valve, conduit, regulator, and/or other system, component, module, or sub-system, that enables, facilitates, allows, permits, and/or supports, the exchange, transfer, offloading, movement, and/or outflow, of a respective chemical product to a vessel, receiver, and/or repository, not rigidly connected to, and/or severable from, the vessel, buoy, platform, and/or housing in which the respective chemical product is manufactured, synthesized, produced, and/or stored.

The scope of the present disclosure includes embodiments that incorporate, include, and/or utilize energy and/or chemical producing devices, and/or chemical offloading and/or transfer vessels, which incorporate, include, and/or utilize any means, method, and/or type of propulsion, including, but not limited to those which incorporate, include, and/or utilize propellers, sails, rigid sails, Flettner rotors, water jets, ducted fans, and drogues (e.g. for moving with, and/or being dragged by, ocean currents).

The scope of the present disclosure includes embodiments that incorporate, include, and/or utilize energy and/or chemical producing devices, and/or chemical offloading and/or transfer vessels, which incorporate, include, and/or utilize any means, method, and/or type of energy storage mechanism, apparatus, component, part, module, and/or system (in addition to the potential energy storage afforded, and/or provided, by the respective chemical product produced and/or harvested by the respective devices and/or vessels) including, but not limited to: batteries, lead-acid batteries, lithium-ion batteries, liquid fossil fuels, ethanol, hydrocarbons, alcohols, gasoline, and diesel.

The scope of the present disclosure includes embodiments that incorporate, include, and/or utilize energy and/or chemical producing devices which incorporate, include, and/or utilize: any design, size, type, category, and/or variety of electrolysis mechanism, apparatus, component, part, module, and/or system; any design, size, type, category, and/or variety of water reservoir and/or electrolytic water provision and/or supply mechanism, apparatus, component, part, module, and/or system; and/or any design, size, type, category, and/or variety of hydrogen (or chemical product) storage, caching, and/or compression, apparatus, component, part, module, and/or system.

The scope of the present disclosure includes embodiments that transfer from, and/or transfer to, any chemical energy storage and/or storing vessel, object, platform, mechanism, apparatus, and/or system, whether such and/or said energy storage and/or storing vessel, object, platform, mechanism, apparatus, and/or system is free-floating, self-propelled, moored, attached to, and/or resting on, a seafloor, lake bottom, and/or river bottom, and/or attached to, and/or resting on, a body of land (e.g. adjacent to a body of water).

The scope of the present disclosure includes embodiments that transfer chemicals from, and/or transfer chemicals to, any chemical energy storage and/or storing vessel, object, platform, mechanism, apparatus, and/or system, whether the respective chemicals are generated on and/or by the respective vessel, object, platform, mechanism, apparatus, and/or system, or are transferred to the vessel, object, platform, mechanism, apparatus, and/or system, and generated, produced, and/or synthesized on another, and/or different, vessel, object, platform, mechanism, apparatus, and/or system.

The electrolysis and/or chemical production mechanisms illustrated in FIGS. 14, 15, 30 and 36 are "closed" in the sense that without, and/or in the absence of, the opening of a valve, or other conduit of alterable and/or configurable fluid continuity and/or connection, the chemical contents of such an electrolysis and/or chemical production mechanism, such as contents including, but not limited to, water, hydrogen, and oxygen, within the mechanisms cannot escape, and any chemical precursors cannot be added. With respect to the electrolysis and/or chemical production mechanisms illustrated in FIGS. 14, 15, 30 and 36, the mechanisms serve as both the chambers in which chemical production occurs, and the chambers in which at least a portion of the chemical products, e.g. hydrogen, are trapped, stored, accumulated, and/or cached, until such time as they are transferred to another vessel in response to, and/or in conjunction with, the opening of a valve or other conduit of alterable and/or configurable fluid continuity and/or connection.

However, an embodiment of the present disclosure comprises an "open" electrolysis and/or chemical production mechanism, such as might convert seawater naturally and/or passively flowing into an open-bottomed enclosure, in to hydrogen or another gaseous chemical which would then passively rise, e.g. bubble up, and gather in an upper portion of such an open-bottomed, e.g. the same open-bottomed, enclosure and therein remain trapped and/or stored until transferred to another vessel.

An embodiment of the present disclosure comprises a seawater electrolysis apparatus positioned in a lower portion of an open-bottomed cylindrical enclosure wherein the open bottom end of the cylindrical tube is positioned at a depth of several tens of meters (any and all such bottom tube depths are included within the scope of the present disclosure) such that hydrogen electrolyzed from seawater in and/or adjacent to the lower portion of the tube tends to rise and collect in an upper portion of the tube, and due to the depth of the open-bottomed end of the tube, the hydrogen collected at the upper end tends to be pressurized to a pressure approximately equal to that of the pressure of the water adjacent to the open-bottomed mouth of the tube.

Another embodiment of the present disclosure comprises an electrolyzer positioned within the water ballast of a wave energy converter device, similar to the one illustrated in FIGS. 14, 15, and 30. The hydrogen (or other gaseous chemical) produced and/or generated by the electrolyzer then tends to rise from the water ballast and be collected, gathered, and/or stored, within the pocket of gas (e.g. 136 of FIG. 14) where it remains until transferred to another vessel by means of an ROV-controlled hydrogen (or other chemical) transfer hose.

The scope of the present disclosure includes embodiments having electrolyzers of any size, any number, any generation capacity, any rate of generation, any nominal voltage, any nominal current, and/or any position within a buoy, vessel, platform, and/or apparatus. The scope of the present disclosure includes, but is not limited to: embodiments having electrolyzers positioned within the buoy, vessel, platform, or apparatus to which they are connected; positioned and/or attached to an outer hull or surface of the buoy, vessel, platform, or apparatus; positioned within secondary buoys, vessels, platforms, or apparati, to which they are connected by a tether, electrical cable, and/or mooring line, chain, or linkage; as well as those positioned at any depth and/or within any ambient water or gas pressure.

The scope of the present disclosure includes embodiments comprising, incorporating, including, and/or utilizing, hydrogen-producing devices in which the hydrogen and oxygen gases produced are separated at the time of their production (such as the embodiment illustrated in FIG. 14); those in which the hydrogen and oxygen gases are collected, accumulated, and/or stored together within the respective hydrogen-producing devices, and separated at the time, and/or as a part of the process by which, the hydrogen is transferred to a respective collection vessel; those in which the hydrogen and oxygen gases are collected, accumulated, and/or stored together within the respective hydrogen-producing devices, and are both transferred to a respective collection vessel as a mixture, and are thereafter separated at the time, and/or as a part of the process by which, the hydrogen is added to tanks and/or pressurized chambers within the respective collection vessel; as well as those in which the hydrogen and oxygen gases are collected, accumulated, transferred, and/or stored together within the respective hydrogen-producing and hydrogen collecting and transfer devices, and are both transferred to a respective receiving vessel, port, and/or other consumer as a mixture.

The scope of the present disclosure includes embodiments comprising, incorporating, including, and/or utilizing, hydrogen-producing devices in which the hydrogen and oxygen gases are collected, stored, accumulated, and/or captured within respective hydrogen and oxygen storage chambers in which the hydrogen and oxygen are stored at approximately equal pressures; those in which the hydrogen and oxygen are stored at different pressures; those in which the pressure of the hydrogen is greater than the pressure of the oxygen; and those in which the pressure of the hydrogen is less than the pressure of the oxygen.

The scope of the present disclosure includes embodiments comprising, incorporating, including, and/or utilizing, electrolysis chambers, mechanisms, modules, and/or systems, in which the pressure of the water on the hydrogen-generating side, surface, and/or portion of the electrolyzer is greater than the pressure of the water on the oxygen-generating side, surface, and/or portion of the electrolyzer; those in which the pressure of the water on the hydrogen-generating side, surface, and/or portion of the electrolyzer is less than the pressure of the water on the oxygen-generating side, surface, and/or portion of the electrolyzer; and those in which the pressure of the water on the hydrogen-generating side, surface, and/or portion of the electrolyzer is approximately equal to the pressure of the water on the oxygen-generating side, surface, and/or portion of the electrolyzer.

The scope of the present disclosure includes embodiments comprising, incorporating, including, and/or utilizing, hydrogen-producing devices in which the electrical energy and/or power used to energize a respective electrolyzer is conditioned by any variety, type, design, and/or number of power-conditioning circuits, modules, mechanisms, and/or systems.

The scope of the present disclosure includes embodiments that incorporate, include, and/or utilize energy and/or chemical producing devices, and/or chemical offloading and/or transfer vessels, which incorporate, include, and/or utilize any types, numbers, positions, varieties, and/or kinds of sensors in order to monitor, adjust, regulate, and/or control the processes of chemical generation, chemical transfer, chemical storage, and/or chemical transportation.

The scope of the present disclosure includes embodiments that incorporate, include, and/or utilize energy and/or chemical producing devices of any size, mass, volume, waterplane area, displacement, design, type, variety, and/or category. The scope of the present disclosure includes embodiments that incorporate, include, and/or utilize floating energy and/or chemical producing devices comprising, incorporating, including, and/or utilizing any type, weight, mass, placement, distribution, number, and/or relative position of ballast material, including, but not limited to ballasts comprised at least in part of: water, seawater, rocks, cementitious materials, sand, gravel, metal, calcium carbonate, and iron.

The scope of the present disclosure includes embodiments that incorporate, include, and/or utilize chemical offloading and/or transfer vessels which incorporate, include, and/or utilize any arrangement, design, system, network, and/or architecture of valves, pipes, conduits, and/or tanks with and/or in which to store offloaded chemicals, and/or with and/or in which to distribute the storage of offloaded chemicals within and/or among different storage tanks, chambers, enclosures, and/or vessels.

The scope of the present disclosure includes embodiments that incorporate, include, and/or utilize chemical offloading and/or transfer vessels which produce their own desalinated water for provision to the energy and/or chemical producing devices to which they connect. The scope of the present disclosure includes embodiments that incorporate, include, and/or utilize chemical offloading and/or transfer vessels which produce their own desalinated water, and subsequently steam distill that desalinated water into water of greater purity, and/or a reduced density and/or concentration of solutes, than that afforded by, and/or characteristic of, desalinated water, for provision to the energy and/or chemical producing devices to which they connect. The scope of the present disclosure includes embodiments that incorporate, include, and/or utilize chemical offloading and/or transfer vessels which produce their own purified water, at least in part through the collection of the water produced by a fuel cell during the course of the fuel cell's consumption of hydrogen and production of electrical power, water which it then provides to the energy and/or chemical producing devices to which they connect. The scope of the present disclosure also includes embodiments that incorporate, include, and/or utilize chemical offloading and/or transfer vessels which obtain desalinated and/or purified water from port facilities and/or other vessels, which they subsequently store, transport, and disburse to the energy and/or chemical producing devices to which they connect.

An embodiment of the present disclosure comprises a chemical generating, producing, and/or synthesizing device which comprises, incorporates, includes, and/or utilizes a connector to which a self-propelled chemical transfer hose, channel, pipe, and/or tube, can attach, and/or connect, thereby enabling the transfer of a portion of the generated, produced, and/or synthesized chemical through the connector and through the chemical transfer hose, channel, pipe, and/or tube.

An embodiment of the present disclosure comprises a vessel which comprises, incorporates, includes, and/or utilizes a self-propelled chemical transfer hose, channel, pipe, and/or tube which can attach, and/or connect, to a complementary and/or compatible connector on a chemical-storing device, and which can thereafter transfer from the chemical-storing device, through the connected transfer hose, channel, pipe, and/or tube, a portion of the chemical stored within the chemical-storing device.

An embodiment of the present disclosure comprises a chemical transfer hose, channel, pipe, and/or tube, one end of which is attached and/or connected to vessel, and another end which is self-propelled and configured to move through a body of water to a chemical-storing device, and to then attach, and/or connect to the chemical-storing device, thereby fluidly connecting the vessel to which the one end is attached and/or connected, and the chemical-storing device to which the other end is attached and/or connected.

An embodiment of the present disclosure comprises a vessel which comprises, incorporates, includes, and/or utilizes a self-propelled chemical transfer hose, channel, pipe, and/or tube, to which the chemical transfer hose is connected and/or attached at a first end, and a chemical-storing device to which the chemical transfer hose is connected and/or attached at a second end, and wherein a chemical fluid (gas or liquid) is transferred from the chemical-storing device to the vessel through the chemical transfer hose.

An embodiment of the present disclosure comprises a chemical-transfer vessel which transfers, directly or indirectly, to a chemically-fueled vessel a portion of a chemical fuel stored within it, and which was obtained, at least in part, from a chemical generating, producing, and/or synthesizing device, wherein the chemically-fueled vessel thereafter consumes a portion of the energy stored within the transferred chemical fuel in order to generate propulsive forces and/or to propel itself.

An embodiment of the present disclosure comprises a chemical-transfer vessel which transfers, directly or indirectly, to a chemically-fueled autonomous vessel or vehicle a portion of a chemical fuel stored within it, and which was obtained, at least in part, from a chemical generating, producing, and/or synthesizing device, wherein the chemically-fueled autonomous vessel or vehicle thereafter consumes a portion of the energy stored within the transferred chemical fuel in order to generate propulsive forces and/or to propel itself.

An embodiment of the present disclosure comprises a chemical-transfer vessel or vehicle which transfers, directly or indirectly, to a chemically-fueled submarine a portion of a chemical fuel stored within it, and which was obtained, at least in part, from a chemical generating, producing, and/or synthesizing device, wherein the chemically-fueled submarine thereafter consumes a portion of the energy stored within the transferred chemical fuel in order to generate propulsive forces and/or to propel itself.

An embodiment of the present disclosure comprises a chemical-transfer vessel or vehicle which transfers, directly or indirectly, to a chemically-fueled aircraft a portion of a chemical fuel stored within it, and which was obtained, at least in part, from a chemical generating, producing, and/or synthesizing device, wherein the chemically-fueled aircraft thereafter consumes a portion of the energy stored within the transferred chemical fuel in order to generate propulsive forces and/or to propel itself.

An embodiment of the present disclosure comprises a chemical-transfer vessel or vehicle which transfers, directly or indirectly, to a chemically-fueled automobile a portion of a chemical fuel stored within it, and which was obtained, at least in part, from a chemical generating, producing, and/or synthesizing device, wherein the chemically-fueled automobile thereafter consumes a portion of the energy stored within the transferred chemical fuel in order to generate propulsive forces and/or to propel itself.

An embodiment of the present disclosure comprises a chemical-transfer vessel or vehicle which transfers, directly or indirectly, to a chemically-fueled truck a portion of a chemical fuel stored within it, and which was obtained, at least in part, from a chemical generating, producing, and/or synthesizing device, wherein the chemically-fueled truck thereafter consumes a portion of the energy stored within the transferred chemical fuel in order to generate propulsive forces and/or to propel itself.

An embodiment of the present disclosure comprises a chemical-transfer vessel which transfers, directly or indirectly, to a chemical-fuel storage facility a portion of a chemical fuel stored within it, and which was obtained, at least in part, from a chemical generating, producing, and/or synthesizing device, wherein the chemical-fuel storage facility thereafter consumes, and/or transfers for consumption, a portion of the energy stored within the transferred chemical fuel.

An embodiment of the present disclosure comprises a chemical-transfer vessel which transfers, directly or indirectly, to a chemical synthesis factory, such as one comprising and/or operating an iron-reducing furnace, a portion of a chemical agent stored within it, and which was obtained, at least in part, from a chemical generating, producing, and/or synthesizing device, wherein the chemical synthesis factory, such as one comprising and/or operating an iron-reducing furnace, thereafter consumes, a portion of the transferred chemical agent.

We claim:

1. A method for producing and transporting chemical fuel, comprising:
- navigating a chemical fuel harvesting vessel to a floating wave energy conversion vessel, wherein the floating wave energy conversion vessel has a chemical fuel synthesizer and a chemical fuel export port, wherein the chemical fuel harvesting vessel has a chemical fuel storage apparatus, a chemical fuel receiving hose, and a chemical fuel receiving hose transport vehicle, wherein the chemical fuel receiving hose transport vehicle is an unmanned vehicle that includes at least one thruster and is adapted to transport a portion of the chemical fuel receiving hose;
- steering the chemical fuel receiving hose transport vehicle to the floating wave energy conversion vessel;
- connecting the chemical fuel receiving hose to the chemical fuel export port;
- transferring a chemical fuel from the floating wave energy conversion vessel to the chemical fuel storage apparatus on the chemical fuel harvesting vessel through the chemical fuel receiving hose, the chemical fuel synthesized onboard the floating wave energy conversion vessel by the chemical fuel synthesizer with energy captured from ocean waves;
- transferring water from the chemical fuel harvesting vessel to the floating wave energy conversion vessel via the chemical fuel receiving hose;
- navigating the chemical fuel harvesting vessel to a shore-based facility; and
- offloading the chemical fuel from the chemical fuel harvesting vessel to the shore-based facility.

2. The method of claim 1, wherein the chemical fuel is hydrogen gas.

3. The method of claim 1, wherein the chemical fuel receiving hose transport vehicle is remotely steered to the chemical fuel export port.

4. The method of claim 1, wherein the chemical fuel receiving hose transport vehicle is steered to the chemical fuel export port autonomously by an onboard computer system.

5. The method of claim 1, wherein the chemical fuel receiving hose transport vehicle is steered to the chemical fuel export port by electromagnetic control signals received by satellite.

6. The method of claim 1, wherein the chemical fuel receiving hose transport vehicle is steered to the chemical fuel export port by electrical control signals transmitted over a tether.

7. The method of claim 6, wherein the tether includes the chemical fuel receiving hose.

8. The method of claim 1, wherein the chemical fuel synthesizer is an electrolyzer for evolving hydrogen gas.

9. A method for producing and transporting chemical fuel, comprising:
- navigating a chemical fuel harvesting vessel to a floating wave energy conversion vessel, wherein the floating wave energy conversion vessel has a chemical fuel synthesizer and a chemical fuel export port, wherein the chemical fuel harvesting vessel has a chemical fuel storage apparatus, a chemical fuel receiving hose, and a chemical fuel receiving hose transport vehicle, wherein the chemical fuel receiving hose transport vehicle is an unmanned vehicle that includes at least one thruster and is adapted to transport a portion of the chemical fuel receiving hose;
- steering the chemical fuel receiving hose transport vehicle to the floating wave energy conversion vessel;
- connecting the chemical fuel receiving hose to the chemical fuel export port;
- transferring a chemical fuel from the floating wave energy conversion vessel to the chemical fuel storage apparatus on the chemical fuel harvesting vessel through the chemical fuel receiving hose, the chemical fuel synthesized onboard the floating wave energy conversion vessel by the chemical fuel synthesizer with energy captured from ocean waves;
- transferring water from the chemical fuel harvesting vessel to the floating energy conversion vessel via the chemical fuel receiving hose;
- navigating the chemical fuel harvesting vessel to an ocean-based facility; and
- offloading the chemical fuel from the chemical fuel harvesting vessel to the ocean-based facility.

10. The method of claim 9, wherein the chemical fuel is hydrogen gas.

11. The method of claim 9, wherein the chemical fuel receiving hose transport vehicle is remotely steered to the chemical fuel export port.

12. The method of claim 9, wherein the chemical fuel receiving hose transport vehicle is steered to the chemical fuel export port autonomously by an onboard computer system.

13. The method of claim 9, wherein the chemical fuel receiving hose transport vehicle is steered to the chemical fuel export port by electromagnetic control signals received by satellite.

14. The method of claim 9, wherein the chemical fuel receiving hose transport vehicle is steered to the chemical fuel export port by electrical control signals transmitted over a tether.

15. The method of claim 14, wherein the tether includes the chemical fuel receiving hose.

16. The method of claim 9, wherein the chemical fuel synthesizer is an electrolyzer for evolving hydrogen gas.

17. A method for producing and transporting chemical fuel, comprising:
- navigating a chemical fuel harvesting vessel to a floating wind energy conversion platform, wherein the floating wind energy conversion platform has a chemical fuel synthesizer and a chemical fuel export port, wherein the chemical fuel harvesting vessel has a chemical fuel storage apparatus, a chemical fuel receiving hose, and a chemical fuel receiving hose transport vehicle, wherein the chemical fuel receiving hose transport vehicle is an unmanned vehicle that includes at least one thruster and is adapted to transport a portion of the chemical fuel receiving hose;
- steering the chemical fuel receiving hose transport vehicle to the floating wind energy conversion platform;
- connecting the chemical fuel receiving hose to the chemical fuel export port;
- transferring a chemical fuel from the floating wind energy conversion platform to the chemical fuel storage apparatus on the chemical fuel harvesting vessel through the chemical fuel receiving hose, the chemical fuel synthesized onboard the floating wind energy conversion platform by the chemical fuel synthesizer with energy captured from wind;

transferring water from the chemical fuel harvesting vessel to the floating wind energy conversion platform via the chemical fuel receiving hose;

navigating the chemical fuel harvesting vessel to a shore-based facility; and offloading the chemical fuel from the chemical fuel harvesting vessel to the shore-based facility.

18. The method of claim 17, wherein the chemical fuel is hydrogen gas.

19. The method of claim 17, wherein the chemical fuel receiving hose transport vehicle is remotely steered to the chemical fuel export port.

20. The method of claim 17, wherein the chemical fuel receiving hose transport vehicle is steered to the chemical fuel export port autonomously by an onboard computer system.

21. The method of claim 17, wherein the chemical fuel receiving hose transport vehicle is steered to the chemical fuel export port by electromagnetic control signals received by satellite.

22. The method of claim 17, wherein the chemical fuel receiving hose transport vehicle is steered to the chemical fuel export port by electrical control signals transmitted over a tether.

23. The method of claim 22, wherein the tether includes the chemical fuel receiving hose.

24. The method of claim 17, wherein the chemical fuel synthesizer is an electrolyzer for evolving hydrogen gas.

25. A method for producing and transporting chemical fuel, comprising:

navigating a chemical fuel harvesting vessel to a floating wind energy conversion platform, wherein the floating wind energy conversion platform has a chemical fuel synthesizer and a chemical fuel export port, wherein the chemical fuel harvesting vessel has a chemical fuel storage apparatus, a chemical fuel receiving hose, and a chemical fuel receiving hose transport vehicle, wherein the chemical fuel receiving hose transport vehicle is an unmanned vehicle that includes at least one thruster and is adapted to transport a portion of the chemical fuel receiving hose;

steering the chemical fuel receiving hose transport vehicle to the floating wind energy conversion platform;

connecting the chemical fuel receiving hose to the chemical fuel export port;

transferring a chemical fuel from the floating wind energy conversion platform to the chemical fuel storage apparatus on the chemical fuel harvesting vessel through the chemical fuel receiving hose, the chemical fuel synthesized onboard the floating wind energy conversion platform by the chemical fuel synthesizer with energy captured from wind;

transferring water from the chemical fuel harvesting vessel to the floating wind energy conversion platform via the chemical fuel receiving hose;

navigating the chemical fuel harvesting vessel to an ocean-based facility; and offloading the chemical fuel from the chemical fuel harvesting vessel to the ocean-based facility.

26. The method of claim 25, wherein the chemical fuel is hydrogen gas.

27. The method of claim 25, wherein the chemical fuel receiving hose transport vehicle is remotely steered to the chemical fuel export port.

28. The method of claim 25, wherein the chemical fuel receiving hose transport vehicle is steered to the chemical fuel export port autonomously by an onboard computer system.

29. The method of claim 25, wherein the chemical fuel receiving hose transport vehicle is steered to the chemical fuel export port by electromagnetic control signals received by satellite.

30. The method of claim 25, wherein the chemical fuel receiving hose transport vehicle is steered to the chemical fuel export port by electrical control signals transmitted over a tether.

31. The method of claim 30, wherein the tether includes the chemical fuel receiving hose.

32. The method of claim 25, wherein the chemical fuel synthesizer is an electrolyzer for evolving hydrogen gas.

33. A method for producing and transporting chemical fuel, comprising:

navigating a chemical fuel harvesting vessel to a floating wave energy conversion vessel, wherein the floating wave energy conversion vessel has a chemical fuel synthesizer and a chemical fuel export port, wherein the chemical fuel harvesting vessel has a chemical fuel storage apparatus, a chemical fuel receiving hose, and a chemical fuel receiving hose transport vehicle, wherein the chemical fuel receiving hose transport vehicle is an unmanned vehicle that includes at least one thruster and is adapted to transport a portion of the chemical fuel receiving hose;

steering the chemical fuel receiving hose transport vehicle to the floating wave energy conversion vessel;

connecting the chemical fuel receiving hose to the chemical fuel export port;

transferring a chemical fuel from the floating wave energy conversion vessel to the chemical fuel storage apparatus on the chemical fuel harvesting vessel through the chemical fuel receiving hose, the chemical fuel synthesized onboard the floating wave energy conversion vessel by the chemical fuel synthesizer with energy captured from ocean waves;

navigating the chemical fuel harvesting vessel to an ocean-based facility; and offloading the chemical fuel from the chemical fuel harvesting vessel to the ocean-based facility;

wherein the chemical fuel receiving hose transport vehicle is steered to the chemical fuel export port by electrical control signals transmitted over a tether; and wherein the tether includes the chemical fuel receiving hose.

34. A method for producing and transporting chemical fuel, comprising:

navigating a chemical fuel harvesting vessel to a floating wind energy conversion platform, wherein the floating wind energy conversion platform has a chemical fuel synthesizer and a chemical fuel export port, wherein the chemical fuel harvesting vessel has a chemical fuel storage apparatus, a chemical fuel receiving hose, and a chemical fuel receiving hose transport vehicle, wherein the chemical fuel receiving hose transport vehicle is an unmanned vehicle that includes at least one thruster and is adapted to transport a portion of the chemical fuel receiving hose;

steering the chemical fuel receiving hose transport vehicle to the floating wind energy conversion platform;

connecting the chemical fuel receiving hose to the chemical fuel export port;
transferring a chemical fuel from the floating wind energy conversion platform to the chemical fuel storage apparatus on the chemical fuel harvesting vessel through the chemical fuel receiving hose, the chemical fuel synthesized onboard the floating wind energy conversion platform by the chemical fuel synthesizer with energy captured from wind;
navigating the chemical fuel harvesting vessel to a shore-based facility; and
offloading the chemical fuel from the chemical fuel harvesting vessel to the shore-based facility;
wherein the chemical fuel receiving hose transport vehicle is steered to the chemical fuel export port by electrical control signals transmitted over a tether; and
wherein the tether includes the chemical fuel receiving hose.

\* \* \* \* \*